US008109852B2

(12) United States Patent
Lee

(10) Patent No.: US 8,109,852 B2
(45) Date of Patent: *Feb. 7, 2012

(54) VARIABLE SPEED TRANSMISSION WITH ROTATING AND ORBITING DRIVE GEARS

(75) Inventor: Gary D. Lee, Spanish Fork, UT (US)

(73) Assignee: VMT Technologies LLC, Spanish Fork, UT (US)

( * ) Notice: Subject to any disclaimer, the term of this patent is extended or adjusted under 35 U.S.C. 154(b) by 1066 days.

This patent is subject to a terminal disclaimer.

(21) Appl. No.: 11/759,206

(22) Filed: Jun. 6, 2007

(65) Prior Publication Data

US 2008/0090690 A1    Apr. 17, 2008

Related U.S. Application Data

(60) Provisional application No. 60/804,273, filed on Jun. 8, 2006.

(51) Int. Cl.
*F16H 35/02* (2006.01)
(52) U.S. Cl. ......................................................... 475/16
(58) Field of Classification Search .................. 475/255, 475/267, 17, 14, 190, 205, 16, 207, 211, 475/215, 218, 219, 302, 330, 343, 162, 163, 475/169–171, 177
See application file for complete search history.

(56) References Cited

U.S. PATENT DOCUMENTS

| 762,062 | A | 6/1904 | Judd |
| 958,061 | A | 5/1910 | Adams |
| 1,383,159 | A | 6/1921 | Slater |
| 1,817,819 | A | 8/1931 | Healey |
| 2,376,429 | A | 5/1945 | Harry |
| 2,926,538 | A | 3/1960 | Schafer |
| 2,936,641 | A | 5/1960 | Voelkl |
| 3,058,365 | A | 10/1962 | Gerchow |
| 3,082,632 | A | 3/1963 | Vulliez |

(Continued)

FOREIGN PATENT DOCUMENTS

EP    0 379 847    8/1990

(Continued)

OTHER PUBLICATIONS

U.S. Appl. No. 11/759,207, Mail Date Jan. 15, 2010, Restriction Requirement.

(Continued)

*Primary Examiner* — Justin Holmes
(74) *Attorney, Agent, or Firm* — Workman Nydegger

(57) ABSTRACT

The present invention relates to transmission systems and changing gear ratios within power transmission systems. In particular, the present invention relates to a positive displacement variable speed transmission. The transmission includes one or more drive gears which orbit, rotate, and which translate radially to change the size of the orbital path. The change in the orbital path increases or decreases the linear velocity of the drive gears which engage one or more driven gears and transfer the changed linear velocity in the form of a gear ratio change. The driven gears are also radially movable and movement of the driven gears is synchronized with the radial movement of the drive gears to maintain substantially constant engagement between gear ratios change. Thus, as the drive and driven gears can slide or step radially to any location within a range of positions, gear ratio changes can be made in very small increments.

24 Claims, 12 Drawing Sheets

U.S. PATENT DOCUMENTS

| | | | |
|---|---|---|---|
| 3,702,571 A | 11/1972 | Sainz | |
| 4,373,926 A | 2/1983 | Fullerton | |
| 4,457,186 A | 7/1984 | Brozovich et al. | |
| 4,660,427 A | 4/1987 | Fenton | |
| 4,836,046 A | 6/1989 | Chappel | |
| 4,843,899 A | 7/1989 | Braunschweiler | |
| 4,962,590 A | 10/1990 | Ambrose | |
| 5,013,288 A | 5/1991 | Parsons | |
| 5,352,162 A | 10/1994 | Coronel | |
| 5,425,689 A | 6/1995 | Genise | |
| 5,516,132 A | 5/1996 | Simkins | |
| 5,674,144 A | 10/1997 | Wiley | |
| 5,885,178 A | 3/1999 | Luh | |
| 6,024,664 A | 2/2000 | Shaffner | |
| 6,044,718 A | 4/2000 | Lester | |
| 6,044,719 A | 4/2000 | Reed, Jr. et al. | |
| 6,338,692 B1 | 1/2002 | Magyari | |
| 6,595,084 B2 | 7/2003 | Park | |
| 6,938,589 B2 | 9/2005 | Park | |
| 6,964,630 B1 | 11/2005 | Magyari | |
| 7,892,129 B2 * | 2/2011 | Lee | 475/16 |
| 2006/0128514 A1 | 6/2006 | Glockler | |
| 2006/0160657 A1 | 7/2006 | Magyari | |
| 2008/0236332 A1 | 10/2008 | Hoose | |

FOREIGN PATENT DOCUMENTS

| | | |
|---|---|---|
| GB | 561067 | 2/1946 |
| IT | 1303048 | 10/2000 |
| JP | 09-089055 | 3/1997 |
| JP | 2002104276 | 4/2002 |
| JP | 2002523711 | 7/2002 |
| JP | 2007092846 | 4/2007 |
| WO | 95-24989 | 9/1995 |
| WO | 01/44693 | 6/2001 |

OTHER PUBLICATIONS

U.S. Appl. No. 11/759,207, Mail Date May 26, 2010, Office Action.
EP07873838, Oct. 16, 2009, Office Action.
EP07873838, Jul. 27, 2009, Written Opinion.
PCT/US07/070595, Oct. 28, 2008, Written Opinion.
PCT/US09/057012, Apr. 22, 2010, Written Opinion.
John Deere. (2006). DF150 Series Powershift Transmission. [World Wide Web page]. Available: http://www.deere.com/en_US/rg/productsequipment/productcatalog/tms/powershift/dfseries/df150/features/index.html (Sep. 1, 2006).
U.S. Appl. No. 12/876,862, filed Sep. 7, 2010, Lee.
U.S. Appl. No. 12/559,421, filed Sep. 14, 2009, Gary D. Lee.
G. Danieli, Analytical Description of Meshing of Constant Pressure Angle Teeth Profiles on a Variable radius Gear and its Applications, Journal of Mechanical Design, Mar. 2000, vol. 122, pp. 123-129, copyright by ASME.
Hindersmann M. et al: "Unrunde Zahnraeder—Ein Wiederentdecktes Maschinenelement" Konstruktion, DE, Springer-Verlag. Berlin, vol. 48, No. 9, 1996, pp. 256-262, XP000195424.
U.S. Appl. No. 11/759,207, Mail Date Dec. 9, 2010, Notice of Allowance.
CN200780025143.6, Aug. 25, 2011, Office Action.
KR 10-2009-7000333, Feb. 8, 2011, Preliminary Rejection.
JP 2009-514529, May 31, 2011, Notification of Rejection.
PCT/US2010/0481126, Jul. 1, 2011, International Search Report.
PCT/US2010/0481126, Jul. 1, 2011, Written Opinion.

* cited by examiner

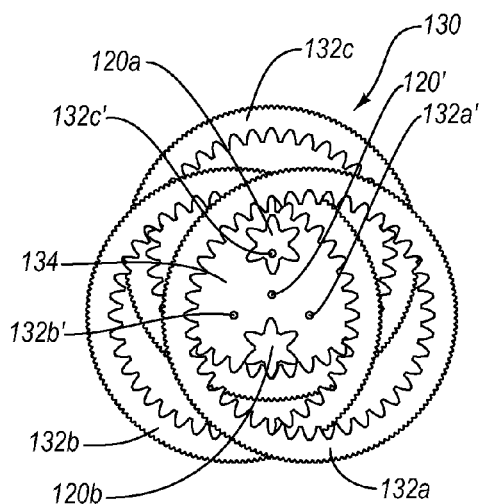
Fig. 2A
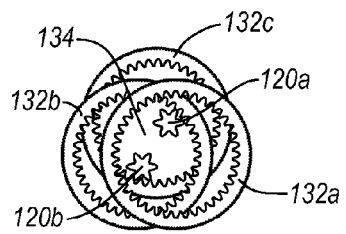   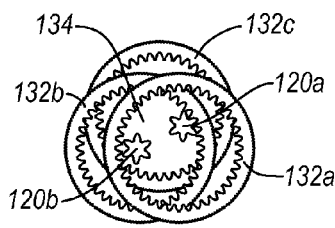   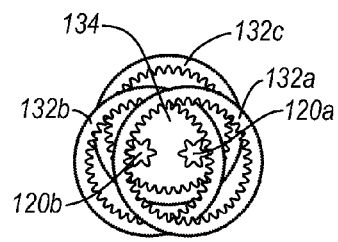
Fig. 2B            Fig. 2C            Fig. 2D
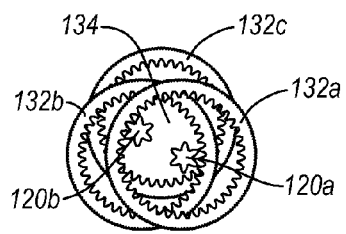   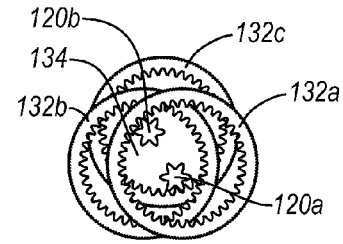   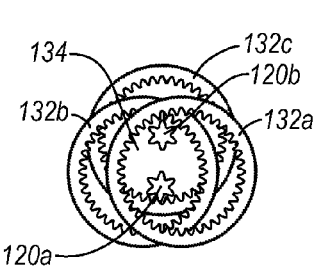
Fig. 2E            Fig. 2F            Fig. 2G

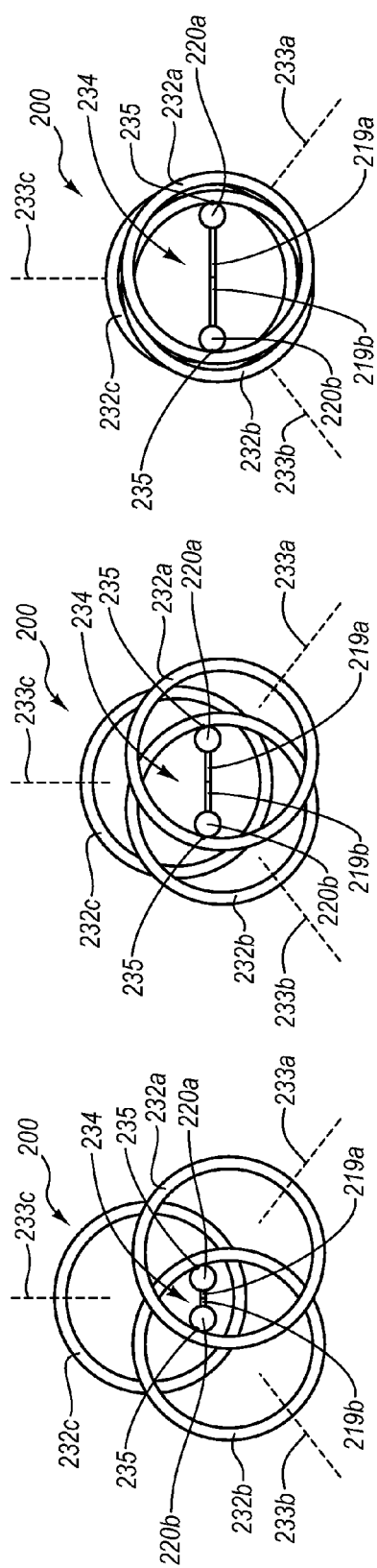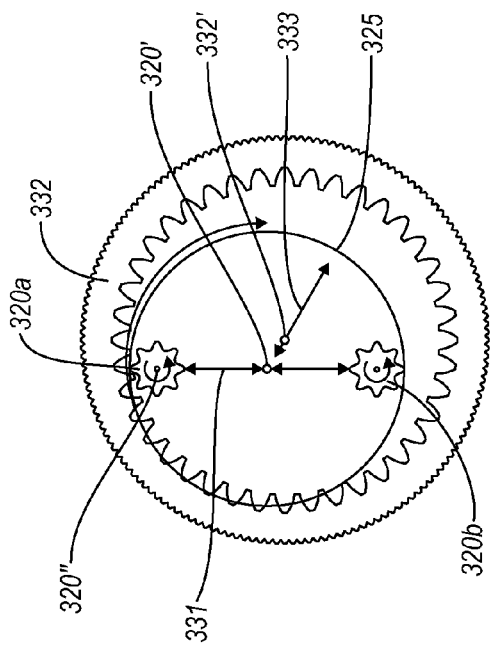
Fig. 3A  Fig. 3B  Fig. 3C  Fig. 4

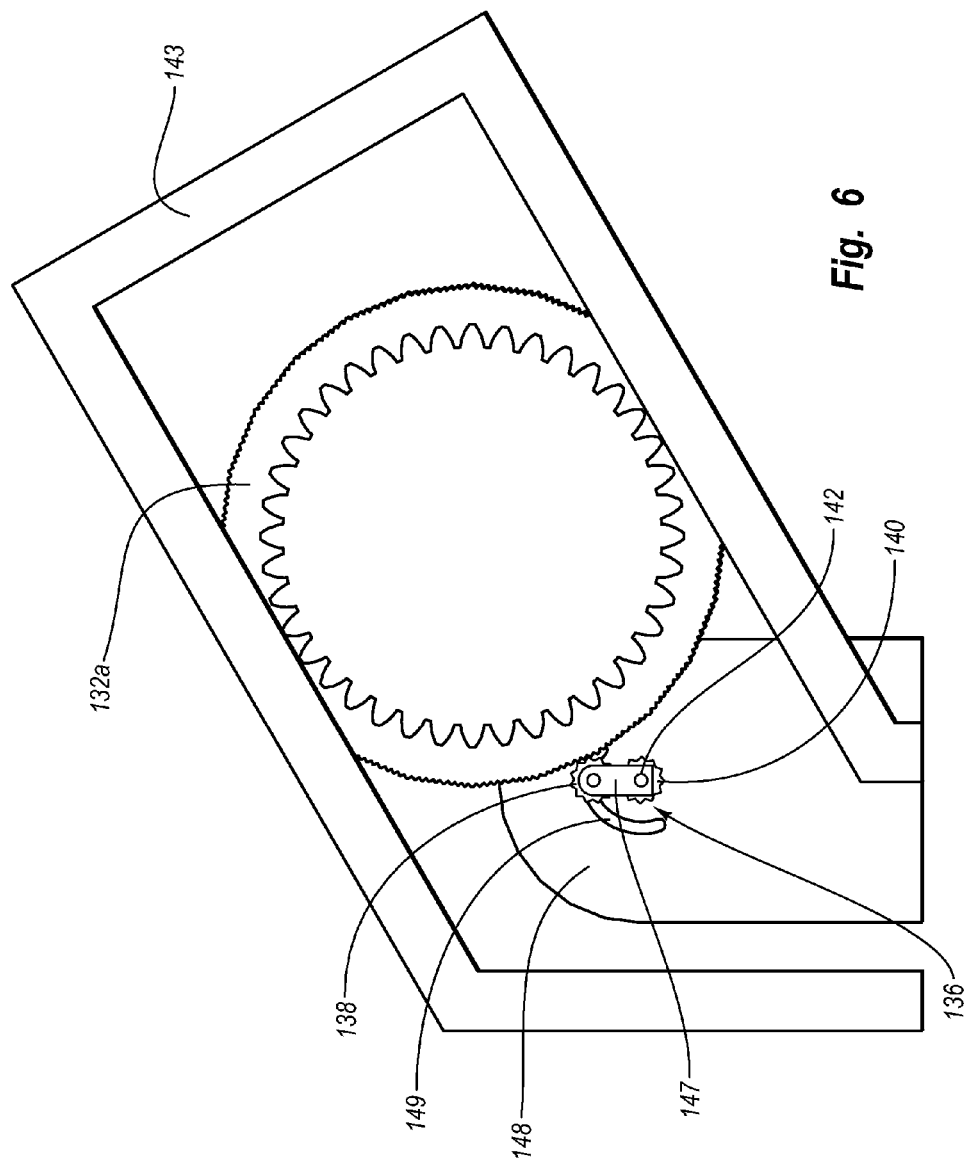

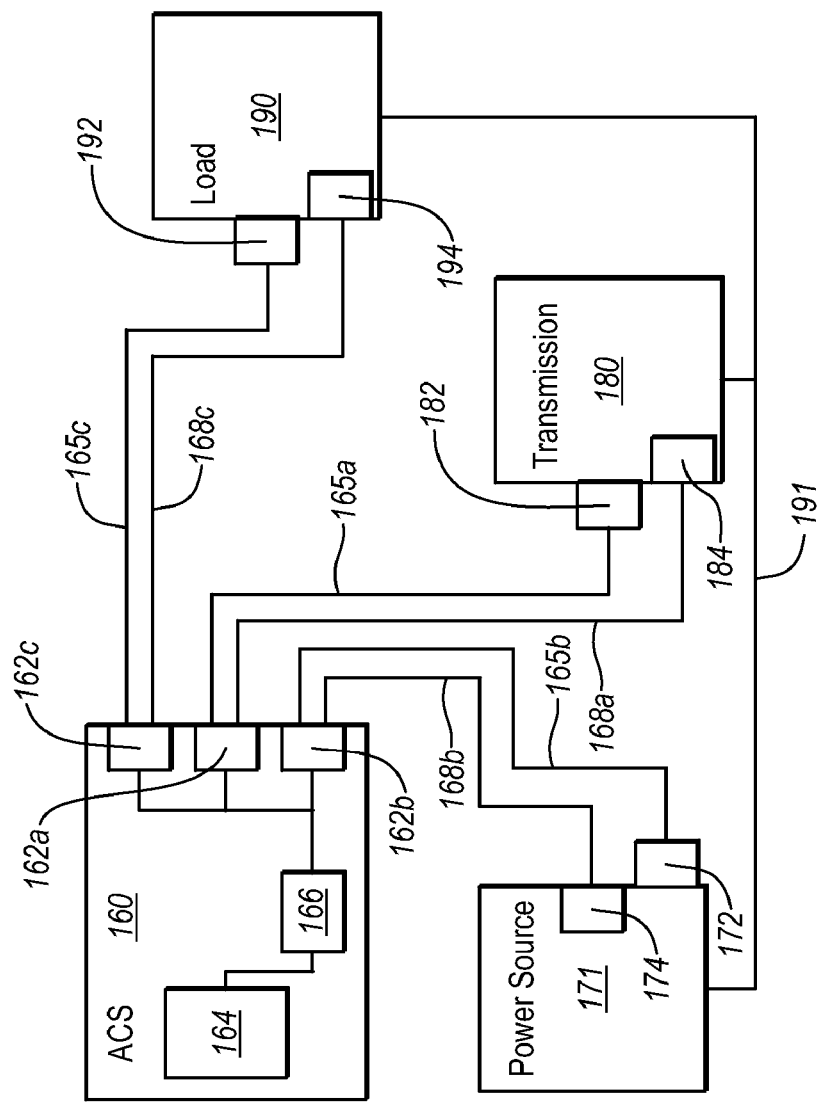

VARIABLE SPEED TRANSMISSION WITH ROTATING AND ORBITING DRIVE GEARS

RELATED APPLICATIONS

This application claims the benefit of U.S. Provisional Patent Application Ser. No. 60/804,273, entitled POSITIVE DISPLACEMENT INFINITELY VARIABLE TRANSMISSION, filed Jun. 8, 2006, and incorporated herein in its entirety by this reference.

This application is also related to U.S. patent application Ser. No. 11/759,207, entitled VARIABLE SPEED TRANSMISSION WITH VARIABLE ORBITAL PATH, filed Jun. 6, 2007, which is incorporated herein in its entirety by this reference.

BACKGROUND OF THE INVENTION

1. The Field of the Invention

Exemplary embodiments of the invention generally concern a transmission that is capable of defining, and operating over, a large range of gear ratios.

2. Related Technology

From nearly the beginning of mechanical engines, the purpose and design of an engine has been focused, to at least some degree, on allowing a small engine to move a large load. As engines evolved and technology became more sophisticated, engines were developed having transmissions with multiple ratios to allow the engine to start moving the load with a low ratio and to incrementally step up to higher ratios as the load began moving. In this manner, a transmission can make more effective use of the engine's torque and keep the engine operating near an appropriate speed. Moreover, an engine can operate within a narrow range of speeds while providing a wider range of output speeds.

To effect an incremental change in gear ratio, a manual transmission uses various separate driven gears of different sizes in connection with one or more drive gears. As a gear ratio change is made, a drive gear disengages from the driven gear and re-engages with a different gear. For example, a clutch may disengage a drive gear from a driven gear and then re-engage the same or a different drive gear with a second driven gear having a different radius. As the newly engaged gears have different radii—or levers—the gear ratio is changed. To effect this gear ratio change, however, the drive gear must be temporarily disconnected from all driven gears, such that the power source is also temporarily disconnected from the load while the gear ratio change is made. While temporary, the disconnection between the drive and driven gears generally lasts long enough to be perceived by an operator of machinery utilizing the transmission, and long enough that when the drive and driven gears are reconnected, a potentially damaging torque spike may occur.

Automatic transmissions also make incremental changes in gear ratio by disconnecting the engine from the load. To do so, automatic transmissions typically use one or more planetary gear sets which are used in connection with a series of clutches and bands that are controlled by a hydraulic system. To change between gear ratios, valves within the hydraulic system are used to control hydraulic pressure which activates various clutches and bands so as to connect and disconnect the carriers and various gears of the automatic transmission from the engine. Based on the specific clutches and bands that engage and disengage, the transmission achieves a predetermined gear ratio change.

When the power source is disconnected or disengaged from the load, the load must coast until the power source is reconnected. For anything more than disconnection over a negligible amount of time, the load then coasts and significant momentum can be lost. For instance, a semi-tractor trailer or other moving vehicle may be moving uphill when a gear change is required. By pushing in the clutch or otherwise disconnecting the power source of the semi-tractor trailer, the engine RPMs are decreased, turbos may be dumped, and torque can no longer be applied in the movement of the load. As a result, the driver often must shift two or three gears down because re-engaging the power source will not occur fast enough to maintain the engine RPMs at a drop of only one or two gears down. This results in an inefficient use of the engine horsepower and fuel.

Similarly, where a tractor is pulling a load such as a plow, temporarily disconnecting the engine from the load so as to change gear ratio reduces the momentum of the tractor and the plow. While the tractor may be able to coast, the plow is less likely to coast. For example, when the plow loses enough momentum, it may catch on the ground being plowed and thereby drag against and stop the tractor from coasting. The plow may catch and stop with a sudden movement that can damage the tractor and potentially injure the operator. Therefore, to avoid damage and injury, the tractor operator may drive the tractor and plow in a low gear to avoid the need to shift gears although a higher gear would allow the tractor to more quickly plow the field, consume fuel more efficiently, and make use of the momentum to obtain a draft of the plow.

In addition, many other applications have previously been unable to take advantage of the benefits of a variable speed transmission because disconnection of the power source from the load makes the application unsafe or impractical. For example, an elevator could benefit from gear ratio changes to change the speed of its ascent or descent. However, disconnecting the power source during ascent or descent would cause the elevator carriage to coast, or free-fall, and could make the variable speed transmission unsafe for the elevator passengers.

A conveyor system such as those used in manufacturing or mining operations could also benefit from variable speeds. For example, as the system starts up the conveyor belt could be started at a slow speed and the speed then increased for full operation. Many conveyor belts are, however, loaded with material and/or are miles long, thereby creating a large load that must be moved. If a gear ratio change were to be made by even temporarily disconnecting the power source, the material and conveyor belt would lose momentum and prevent an effective gear ratio change. Consequently, materials often have to be removed from the belt just to get the conveyor moving, and/or the conveyor system must be operated at a constant speed.

While variable speed transmissions provide many benefits, the significant disconnection of the power source from the load in these traditional transmissions has caused engine and transmission designers to search for methods and systems that minimize the time the power source is disconnected and a drive gear is disengaged. To at least some degree, automatic engines have reduced this time by automating the shifting between gears and changing gear ratios, thereby also reducing the time between disconnection and reconnection of the power supply to the load. However, even automatic engines disconnect the engine from the drive gears for a time long enough to cause a potentially significant loss in torque, thereby failing to make an efficient use of the available horsepower. Moreover, by operating with only a very limited number of discrete gear ratios, that may be relatively widely spaced, the engine operates mostly in an inefficient range. Consequently, the engine must be capable of providing more horsepower, and must thus be larger, than would otherwise be required if an engine was more frequently running at an efficient speed. The inefficient use of these engines, in turn, burns more fuel than would an engine run at more efficient speeds.

While decreasing the time needed to change between gear ratios also decreases the time during which the load and the power source are disconnected, it can also create greater torque spikes which may damage the drive train. In particular, as a gear ratio change is made from one discrete gear ratio to another discrete gear ratio, engagement of the drive and driven gear may produce a torque spike such that as the drive and driven gears engage, the torque produced momentarily spikes. The torque spike can be reduced by feathering the clutch so as to cause the drive and driven gears to gradually re-engage. If, however, the shift is made too quickly, the torque spike can produce an output torque large enough to damage a drive shaft, chassis, or an axle.

Accordingly, some efforts have been made to reduce a torque spike so as to reduce the likelihood that the torque spike will cause damage. For example, a torque spike anticipator may be used to artificially lower the torque as a gear ratio change is made. In particular, as a gear ratio change is made, the torque spike anticipator may lower the engine RPMs during the gear ratio change, such that as the gears re-engage to produce the new gear ratio, less torque is produced during the torque spike. Such a system adds, however, additional complexities to a transmission and prevents operation at a constant velocity so as to make an efficient use of the available power.

In low torque applications, the problems associated with disconnecting the power source from the load have been reduced, to some extent, by continuously variable transmissions (CVT) and infinitely variable transmissions (IVT). A CVT typically uses two pulleys which are connected by a belt. The pulleys can include two cones that face each other and which can be pulled together or pushed further apart by hydraulic pressure, centrifugal force or spring tension. As one pulley increases its radius, the other decreases its radius to keep the belt tight. As the two pulleys change their radii relative to one another, they create various gear ratios. A similar concept is embodied in an infinitely variable transmission (IVT) which also makes use of similar, complementary pulleys and cones. Instead of a belt, however, the IVT uses a rolling member that is sandwiched between the cones.

Regardless of whether a CVT (wrapping member) or IVT (rolling member) is used, however, the system relies on friction to adjust gear ratios and provide power output. Friction introduces heat into the system, however, and, as a result, the wrapping member and rolling members heat up and are susceptible to wear damage, thereby requiring that the user repair or replace the parts. To reduce the frequency of repair, the frictional wrapping or rolling members can be toughened, such as through the use of a thicker belt or impregnation of the belt with metals or other tougher materials. However, as the belt strength is increased, the part costs increase. Moreover, sufficiently tough materials can cause the cones within the transmission to wear and fail.

Moreover, because these systems are friction-based, they are typically only suitable for low torque applications, as high torque applications could cause excessive heating within the transmission, thereby causing even greater wear and failure of the transmission components. As a result, CVT and IVT transmissions are not scalable for a wide variety of low and high torque applications. In fact, the application of torque to a CVT or IVT in a high torque or high horsepower system may cause near immediate failure as the rolling member or wrapping member can melt or otherwise deteriorate due to the friction-induced heat.

Because the CVT and IVT have been seen as unacceptable alternatives in high-torque applications, additional efforts have been made within high-torque applications so as to provide little to no time gap between disconnection and reconnection of the power source and load. For example, John Deere produces tractors with a PowerShift transmission that uses a complex design which is purported to automatically do the clutching and disconnect a load and reconnect the load at about the same time such that there is no real time gap and little to no torque loss. The transmission is, however, much larger than a standard transmission, and can house a large number of hydraulic lines inside the transmission. As a result, maintenance of the lines may be difficult, and the size of the engine further increases the size of the equipment and the weight or load that must be carried. Moreover, because of the complexity and size of the transmission, it can be cost prohibitive for certain applications, and it is not scalable for low torque or smaller applications.

Accordingly, a need exists for an improved transmission which is scalable and which can switch between any of various gear ratios without requiring disconnection of the power source from the load.

BRIEF SUMMARY OF EXAMPLE EMBODIMENTS OF THE INVENTION

Briefly stated, exemplary embodiments of the present invention are directed to a transmission capable of operating over a large, possibly infinite, number of gear ratios.

In at least some implementations, the transmission maintains substantially constant engagement between at least one drive gear and at least one driven gear at various gear ratios, and can also maintain such engagement even while the transmission is in a neutral output state. By maintaining a substantially constant engagement between at least one drive gear and at least one driven gear, the transmission is able, when a load is being driven, to implement changes to an associated gear ratio while maintaining the connection of the power to the load, or with disconnections to the load which produce only negligible losses of momentum or efficiency.

In the immediately following discussion, information is presented concerning various possible example embodiments of the invention and various optional aspects that can be implemented in connection with such embodiments. It should be understood that such example embodiments do not constitute, nor are intended to constitute, an exhaustive list of possible embodiments or aspects thereof. It should further be understood that yet additional embodiments can be defined by combining one or more of the aspects disclosed herein in connection with such example embodiments.

According to one example embodiment of the present invention, a transmission employs multiple gear ratios which are changeable in small increments over a range of gear ratios. The transmission may include a power input interface and at least one drive gear coupled to the power input and configured to rotate and orbit such that the orbital path enables power transmission through various gear ratios. In this example embodiment, one or more driven gears may engage the drive gears and receive a torque input from one or more of the drive gears. A power output interface may also be coupled to the one or more driven gears and can provide a power output to a power sink or to one or more loads. Additionally, the orbital path of the drive gears may be changeable such that the length of the orbital path can be increased or decreased so that by increasing or decreasing the length of the orbital path, the drive gears implement various gear ratios. The changing of the length of the orbital path may allow the gear ratio associated with the transmission to be changed between a plurality of discrete gear ratios, in very small increments.

In another example embodiment, the transmission can include a power transform system that is able to transmit a torque from a torque input to a torque output. In this example, the transmission power output system includes a set of one or more first power transmission members that are adapted to have an associated orbit of a size that is selectably variable. Additionally, this example of the power transform system can include second power transmission members that are collectively in engagement with the first power transmission members and that are configured to maintain engagement with the first transmission members notwithstanding any changes in gear ratio that may be effected. In this example of a power transform system, the first and second power transmission members can receive a power input to either set of power transmission members such that torque can be transmitted through the transmission in either of two different directions. That is, the set of first transmission members can act as either drive or driven members, and the set of second transmission members can similarly act as driven or drive members, respectively.

Another example embodiment of a transmission may include a power input interface for receiving a torque output of another device. This embodiment of the transmission may also include one or more radially movable input members coupled to the power input interface such that the movable input members receive the torque output by the other device. The input members may be engaged with output members to which the torque is transmitted from the input members. The output members maintain engagement with the input members at various discrete locations as the input members move also radially. A power output interface may also be coupled to the output members and transmit a torque output to another device or devices.

In another example embodiment of a transmission, a power input interface of the transmission receives a torque input and is connected to a plurality of drive members which receive the torque input from the power input interface and which can provide a large and potentially infinite number of gear ratios within a range of gear ratios. The drive members are engaged with a plurality of driven members that each move radially along a predetermined path from a first position to a second position, and such that each predetermined path is angularly offset with respect to the predetermined paths of the other driven members. For example, the driven members may be spaced around a circle and move along straight or curved predetermined paths that are each offset at equal angular intervals around the circle. The driven members may further be connected to a power output interface which transmits a torque output of the transmission.

In still another example embodiment of the present invention, a transmission includes a power input interface coupled to a plurality of radially movable drive gears which are also engaged with a plurality of driven gears. This example embodiment of the transmission may include a means for synchronization which, among other things, can maintain substantially constant engagement between the drive and driven gears over a large range of gear ratios associated with the transmission. This example embodiment of the transmission may also include a power output coupled to the driven gears. The means for synchronization can be embodied as, for example, a reference gear which aligns the teeth of the drive gears and/or synchronization gears for each drive gear, and which travels around the reference gear as an input torque is received, so as to cause the drive gears to both rotate and orbit. The number of teeth on the reference gear, synchronization gears, drive gears, and/or driven gears may be divisible by the number of driven gears in the transmission so as to facilitate attainment of a desired alignment of the teeth of the drive gears with the teeth of the driven gears regardless of the radial positioning of the drive gears.

In still another embodiment, a transmission includes a power input interface that receives a first torque, sets of one or more movable drive and driven gears, and a power output interface coupled to the driven gears and which transmits a second torque. The sets of drive and driven gears may have at least one particular positioning within the transmission that results in the second torque being negligible, possibly as low as zero or nearly zero. However, the drive and driven gears maintain engagement with each other, even with zero output, such that an engaged neutral is implemented where the power source remains connected to the load. When the drive gears are at the particular position, the drive gears may have rotational and orbital motions which substantially, or completely, cancel each other out so that while the drive gears may continue to rotate and orbit, the motion of the drive gears does not cause any rotation of the driven gears. In this embodiment, the drive gears may alternatively produce an intermediate output torque which is input into a secondary gear set. The secondary gear set may also receive the input torque and place the input torque in conflict with the intermediate output torque to produce a final, net output torque. At the particular position of the drive and driven gears, the secondary gear set may receive an intermediate output torque which, when placed in conflict with the input torque, substantially cancels the input torque such that the secondary gear set provides negligible, possibly zero or nearly zero, output torque.

Embodiments of the transmission can be employed in connection with various other systems and devices, examples of which may include various types and implementations of drive systems. In one example, a drive system may include a power source, such as an engine for example. A transmission may be coupled to the power source to receive an input torque from the power source. The transmission may correspondingly include a power input interface for receiving the input torque, one or more drive gears coupled to the power input interface, and one or more driven gears engaged with the drive gears. Each of the drive and driven gears may be adapted to synchronously, or near synchronously, translate in a radial direction, while also maintaining substantially constant engagement between the drive and driven gears so as to provide a large number of gear ratios within a range of available gear ratios. The transmission may also include a power output interface coupled to the driven gears so that an output torque can be transmitted by the transmission. In this example, the drive system may also include a drive train coupled to the power output interface of the transmission so as to receive the output torque. The drive system may also include a power sink to which some or all of the output torque is directed.

Additionally, some example embodiments are concerned with a method for providing power transmission. Example implementations of the method may be performed in connection with the disclosed embodiments of the transmission and/or with other embodiments of the transmission. In one example, an input is provided and the input is transformed into an output for one or more gear ratios of a range of gear ratios. The output may comprise a desired amount of torque. Additionally, or alternatively, the output may be zero or nearly zero, notwithstanding that the input is simultaneously being provided. Further, the one or more gear ratios in connection with which the output is provided may comprise a large number of gear ratios which are optionally a large number of discrete gear ratios which step between whole integer, virtual gears.

These and other aspects of the present invention will become more fully apparent from the following description and appended claims.

BRIEF DESCRIPTION OF THE FIGURES

To further clarify various aspects of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope, nor are the figures necessarily drawn to scale. The invention will be described and explained with additional specificity and detail through the use of the accompanying drawings in which:

FIGS. 2A-2G are front views of the drive and driven gears of the transmissions of FIGS. 1A and 1B in various stages of a partial orbital cycle of the drive gears;

FIGS. 3A-3C schematically disclose three gear ratios of an exemplary positive displacement, variable speed transmission having three offset ring gears and two moon gears, and in which the two moon gears and the three ring gears are each radially movable to engage each other over a range of very small gear ratio changes;

FIG. 4 schematically discloses the rotational and translational movements of various drive and driven gears of an exemplary transmission according to one embodiment of the present invention;

FIG. 6 is a rear view of exemplary linkage and gear track systems for controlling radial movement of a ring gear in the transmissions of FIGS. 1A and 1B;

FIG. 7 schematically discloses an exemplary control system for controlling a transmission according to exemplary embodiments of the present invention;

DETAILED DESCRIPTION OF SOME EXAMPLE EMBODIMENTS

Figure 1A:
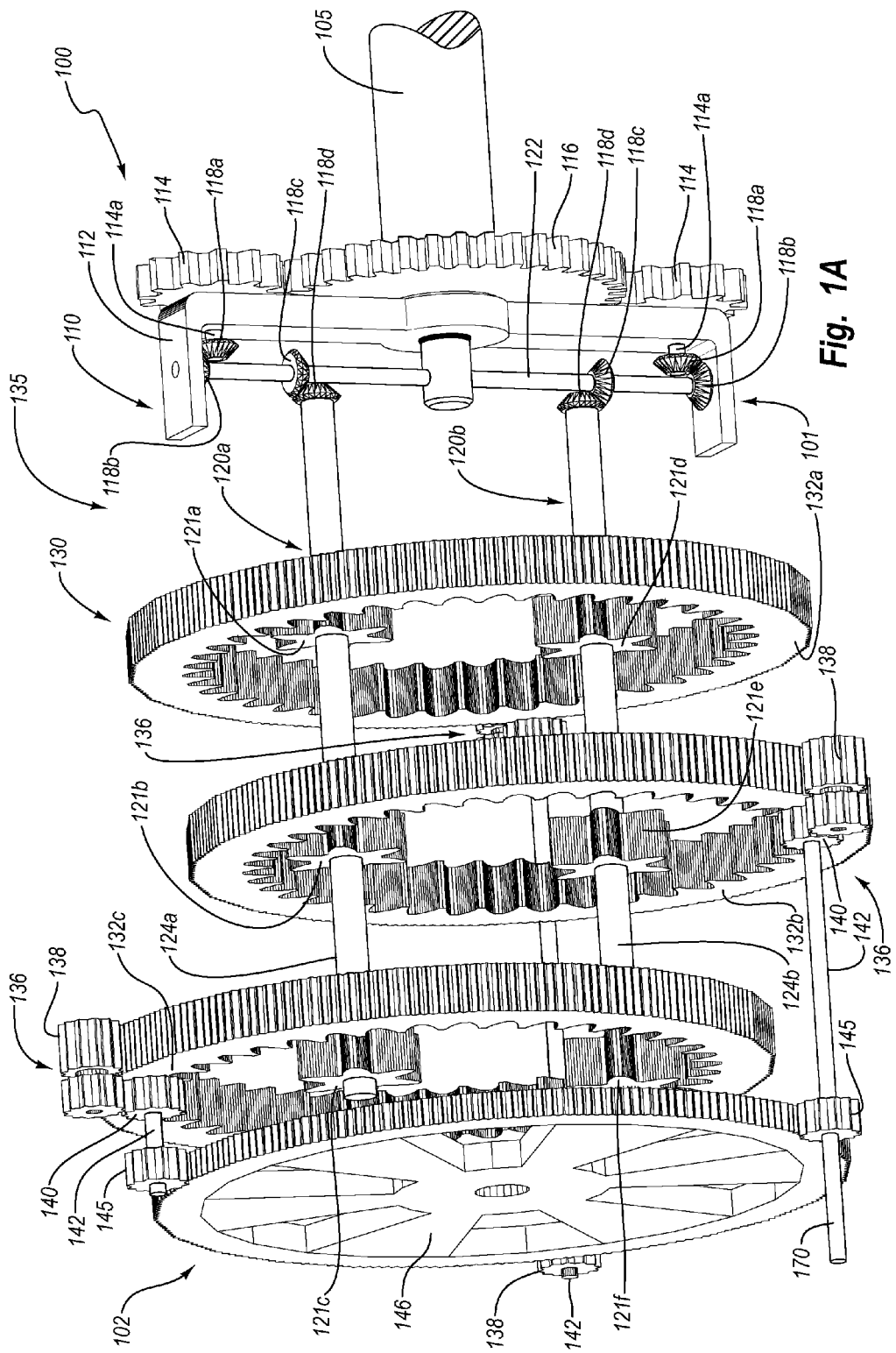
FIG. 1A is a perspective view of an exemplary positive displacement variable speed transmission according to one embodiment of the present invention in which multiple drive and driven gears are configured to remain constantly engaged throughout gear ratios changes which can occur in very small, and possibly non-discrete, increments.

Example embodiments of the present invention are directed to a transmission capable of operating over a large, or possibly infinite, number of gear ratios. The transmission maintains substantially constant engagement between at least one drive gear and at least one driven gear during gear ratio changes, and can maintain such engagement even while the transmission is in a neutral output state. By maintaining a substantially constant engagement between at least one drive gear and at least one driven gear, the transmission is able, when a load is being driven, to implement changes to an associated gear ratio while simultaneously maintaining the connection of the power to the load.

As noted earlier, information is disclosed throughout this application concerning various possible example embodiments of the invention and various optional aspects that can be implemented in connection with one or more of such example embodiments. It should further be understood that yet additional embodiments are contemplated as being within the scope of the invention, and can be defined by combining one or more aspects disclosed herein. Accordingly, the disclosed embodiments are examples only and are not intended to limit the scope of the invention in any way. As well, nothing herein is intended, nor should be construed, to constitute either an implicit or explicit assertion that any particular disclosed aspect(s) of any embodiment of the invention constitutes a critical or essential element of one or more embodiments of the invention.

As set forth below, various terms are used in this disclosure. The use of such terms is made with the recognition and understanding that these and other terms employed herein do not constitute the sole manner in which a particular idea, concept or aspect may be expressed or embodied.

As used herein, the phrase "constant engagement" embraces, but is not limited to, substantially continuous engagement between at least one drive gear and at least one driven gear which are used to effect changes to the overall gear ratio of a transmission, and such that the drive and driven gears have a substantially constant mesh. Stated another way, in a constant engagement transmission, two or more gears are engaged with each other throughout different gear ratios—and the changes therebetween—and during the revolutions of the transmission. With respect to the foregoing however, it will be understood that there is no requirement that any particular drive gear always be engaged with any particular driven gear. For example, a transmission may operate with "constant engagement" where various drive gears alternately engage one or more driven gears such that at least one of the various drive gears is, at any given time, engaged with one or more of the driven gears. The term "constant engagement" also does not require engagement between gears of any particular material. In fact, constant engagement may be maintained between gears of any combination of materials including, by way of example only, metal, composite, wood, or plastics. Where the constant engagement is maintained between one or more drive gear and one or more driven gears which are metal, such that there is constant metal-to-metal engagement is maintained, the engagement may be referred to herein as "positive displacement."

The phrase "constant velocity" is also used herein to describe an aspect of a transmission according to some embodiments of the present invention. As used herein, the term "constant velocity" describes the power transfer from the input to the output by means of gear profiling, such as involute gear profiling, and/or other means which are non-oscillating.

The phrase "infinitely variable" is also used herein to describe an aspect of a transmission according to some embodiments of the present invention. As used herein, the term "infinitely variable" embraces, but is not limited to a transmission which is capable of operating at a plurality of gear ratios and in which the plurality of gear ratios are changeable in very small, possibly infinitely small, increments over a range of gear ratios.

Reference will now be made to the figures to disclose various aspects of exemplary embodiments of the invention. It is understood that the figures are diagrammatic and schematic representations of such exemplary embodiments, and are not limiting of the present invention, nor are they necessarily drawn to scale. No inference should therefore be drawn from the figures as to the dimensions of any invention or element.

As noted above, transmissions having engagement between drive and driven gears have typically relied on the disconnection of the power source from the load in order to effect a change in gear ratio. To overcome the difficulties that arise with such a disconnection, various belt drive, friction shifting, or other methods of maintaining torque have been developed. However, no such designs have allowed an engine to maintain a high level of torque through a gear change, particularly while operating at a constant velocity and while maintaining constant engagement, or at least near constant engagement, between gear teeth so as to main constant, or near constant, connection between the power source and the drive and driven gears.

Accordingly, in high torque applications, transmissions commonly employ multiple gears to provide a ratio change. For example, one or more drive gears of differing sizes can be used to drive one or more driven gears of differing sizes. To change between gear ratios, the transmission disengages a drive gear from a driven gear and then re-engages the same or a different drive gear with another driven gear. The gear ratio is changed inasmuch as the newly engaged drive gear and/or driven gear has a smaller or larger diameter than the previously engaged gears such that the radius—also referred to as the lever—of one engaged gear changes in relation to the radius of another engaged gear.

For example, before a change in gear ratios, the engaged drive and driven gears may operate at a gear ratio of, for example, 4:1. For such a gear ratio, the radius of an engaged driven gear may be four times larger than the radius of the engaged drive gear such that it requires four complete rotations of the drive gear to effect a single rotation of the driven gear. To cause a gear ratio change, the drive gear may be removed from engagement with the driven gear and engaged with a different driven gear of a size which differs from the previously engaged driven gear. As the size of the newly engaged driven gear increases or decreases, the associated gear ratio is correspondingly increased or decreased. As can be seen, multiple driven and/or drive gears are thus useful to change between gear ratios within a range of discrete gear ratios.

1. Example Ring Gear Embodiments

FIG. 1A discloses aspects of an exemplary embodiment of a transmission 100 which can maintain constant engagement during gear ratio changes, and which can change between gear ratios in very small increments, and possibly in infinitely small or substantially non-discrete increments. It should be appreciated that the illustrated embodiment is merely an exemplary embodiment and is presented for illustrative purposes, and should therefore not be considering limiting of the present invention.

In the illustrated embodiment, transmission 100 includes a transmission input interface 105 which can be connected to an external power source. Additionally, transmission input interface 105 may be connected to a power transfer system 110 within transmission 100, such that transmission input interface 105 can transmit power input from the external source to power transfer system 110. Power transfer system 110, in turn, may transfer the input power to a power output system 130 of transmission 100. As disclosed in more detail herein, power transfer system 110 and power output system 130 can be coupled such that a variety of gear ratios associated with transmission 100 can be obtained by synchronizing power transfer system 110 and power output system 130 such that during gear ratio changes, power transfer system 110 maintains substantially constant engagement with power output system 130. Moreover, inasmuch as power transfer system 110 and power output system 130 maintain substantially constant engagement while changing gear ratios, power transfer system 110 and power output system 130 collectively operate as a variable power transform system 135 which maintains substantially constant engagement during gear ratio changes which can be effected in small, and possibly infinitely small, increments.

As disclosed herein, transmission input interface 105 may be adapted to be coupled to a power supply. For example, transmission input interface 105 may be coupled to a power supply that is external to transmission 100. By way of example, transmission input interface 105 may receive power input directly or indirectly from a drive shaft or other rotating shaft that is rotated by an engine. Such engines may be employed in connection with a variety of different vehicles, aircraft and marine craft. In another embodiment, and by way of example only, transmission input interface 105 may be connected to a power supply in a conveyor system, a windmill, a hydroelectric power generation system, an elevator, or in any other suitable application. Moreover, use of transmission 100 with a power supply in a motor vehicle may include, by way of example and not limitation, passenger vehicles, transport vehicles, construction equipment, racing vehicles, all-terrain vehicles, military vehicles and equipment, marine vehicles, aircraft, and agricultural vehicles and equipment.

In the illustrated embodiment, transmission input interface 105 is coupled to power transfer system 110 such that as power is received by transmission input interface 105, the received power is transferred to and through power transfer system 110 to power output system 130. In the illustrated embodiment, power transfer system includes a carrier arm 112 which is connected to transmission input interface 105 and which rotates as a power input is received by transmission input interface 105. As will be appreciated in light of the disclosure herein, as a power input is received, transmission input interface 105 may cause carrier arm 112 to rotate in unison therewith such that for each complete rotation of transmission input 105, carrier arm 112 makes a corresponding complete rotation. In other embodiments, however, it will be appreciated that carrier arm 112 may be coupled to transmission input interface 105 such that carrier arm 112 rotates at a different angular velocity than transmission input interface 105, such that carrier arm 112 may rotate at a greater or lesser speed than transmission input interface 105.

As illustrated, carrier arm 112 may be also coupled to one or more ratio reference gears 114. Ratio reference gears 114 are, in this embodiment, coupled to carrier arm 112 such that as carrier arm 112 rotates, ratio reference gears 114 also orbit around the center of carrier arm 112. Through the orbital motion, ratio reference gears 114 engage and roll around a reference gear 116, and the ratio reference gears 114 also simultaneously rotate about their respective central axes. While two ratio reference gears 114 and a single reference gear 116 are illustrated, it will be appreciated that this arrangement is illustrative only and that in other embodiments, more or fewer ratio reference gears 114 and/or reference gears 116 may be used.

As illustrated in FIG. 1A, ratio reference gears 114 are, in some embodiments, coupled to a set of transfer gears 118a-d which transmit the input power received by transmission input interface 105 to one or more drive gear sets 120a-b. In the embodiment illustrated in FIG. 1A, for example, ratio reference gears 114 are coupled to a series of transfer gears 118a-d which rotate in a one-to-one ratio with ratio reference gear 114, such that for each complete rotation of ratio reference gears 114, each of transfer gears 118a-d also have a single, complete rotation. In particular, in the illustrated embodiment, each ratio reference gear 114 is coupled to a shaft 114a. Shaft 114a passes through carrier arm 112 and is further connected to a transfer gear 118a, such that as ratio reference gears 114 rotate, shafts 114a and transfer gears 118a each maintain the same rotational speed. To allow rotation of shafts 114a within carrier arm 112, it will be appreciated that carrier arm 112 may also be journaled and include, for example, bearings or bushings which allow shafts 114a to rotate within carrier arm 112. Although the illustrated embodiment discloses a one-to-one ratio between ratio reference gears 114 and transfer gear 118a, it should be appreciated that this ratio is only one example, and that one or more of transfer gears 118a-d can rotate at different ratios with respect to ratio reference gears 114.

Transfer gears 118a can also be coupled to second transfer gears 118b which maintain the same or different RPMs. In the illustrated embodiment, for example, transfer gears 118a-b are shown as bevel gears of the same sizes, although it will be appreciated that a variety of sizes and types of gears, or other systems for transferring power, may be used. For example, in other embodiments, one or more of transfer gears 118a-b may be spur gears, worm gears, helical gears, or any other suitable type of gear.

In transmission 100, transfer gears 118b can further be coupled to transfer gears 118c-d which are configured to transfer power to drive gear sets 120a-b. For example, in the illustrated embodiment, transfer gears 118a-b are indirectly coupled to transfer gears 120a-b by transfer shaft 122. In particular, transfer gear 118b is coupled to transfer shaft 122 such that transfer shaft 122 rotates as transfer gears 118b are rotated by transfer gears 118a. In power transfer system 110, transfer gears 118c may further be coupled to transfer shaft 122 such that transfer gears 118c also rotate as transfer shaft 122 and transfer gears 118b rotate. Moreover, transfer gears 118c can mate with and engage transfer gears 118d such that transfer gears 118d are rotated by transfer gears 118c. Consequently, inasmuch as transfer gears 118a are coupled to ratio reference gears 114a and further at least indirectly to each of transfer gears 118b-d, as ratio reference gears 114 rotate, each of transfer gears 118a-d can also rotate. As will be disclosed in greater detail hereafter, in some embodiments, transfer gears 118c-d may further be configured to be movable along transfer shaft 122.

Further, according to some example embodiments, transfer shaft 122 may be coupled to carrier arm 112, such that it is housed within carrier arm 112 while it rotates. In the illustrated embodiment, for example, ends of transfer shaft 122 extend into carrier arm where they are journaled with one or more bearings, bushings or other suitable devices such that they can freely rotate, but wherein they are also substantially fixed to prevent significant axial movement of transfer shaft 122. In other examples, however, transfer shaft 122 may be adapted to rotate and move axially such that the illustrated embodiment is only one example of transfer shaft 122 and is not limiting of the present invention.

In the illustrated embodiment, power transfer system 110 also includes drive rods 124a-b. Drive rods 124a-b are, in this embodiment, used to rotate respective drive gear sets 120a-b which each comprise one or more of drive gears 121a-f. In the illustrated embodiment, for example, drive rods 124a-b are coupled to respective transfer gears 118d such that as transfer gears 118d rotate, drive rods 124a-b also rotate, thereby also rotating drive gears 121a-f of drive gear sets 120a-b.

As disclosed herein and as further illustrated in the example embodiment of FIG. 1A, each of drive gear sets 120a-b can include one or more drive gears 121a-f. In the illustrated embodiment, for example, each drive gear set 120a-b includes three drive gears coupled thereto, although more or fewer drive gears may be employed in one or more drive gear sets. In particular, in the illustrated embodiment, drive gear set 120a includes drive gears 121a-c, and drive gear set 120b includes drive gears 121d-f.

As illustrated, one or more of drive gears 121a-f may further engage power output system 130 so as to transfer the power from power transfer system 110 to power output system 130. In the illustrated embodiment, for example, power output system 130 includes a plurality of driven gears 132a-c which are, in this embodiment, ring gears, and which are each engaged by one or more of drive gears 121a-f. In the illustrated embodiment, for example, drive gear 121f is currently engaged with driven gear 132c.

As disclosed herein, when transmission input interface 105 receives power from a power source, transmission input interface 105 may cause carrier arm 112 to rotate. For example, in the illustrated embodiment, carrier arm 112 is rotated about a central axis that is substantially coaxial with a central axis of transmission input interface 105, although in other embodiments, carrier arm 112 may rotate about an axis that is not coaxial with the central axis of transmission input interface 105. Further, carrier arm 112 is, in some embodiments, coupled to drive rods 124a-b. For example, in the illustrated embodiment, and as disclosed herein, ratio reference gears 114, transfer gears 118a-d and/or transfer shaft 122 may couple drive rods 124a-b to carrier arm 112 in a manner that causes drive rods 124a-b to rotate about their respective central axes as carrier arm 112 is rotated about its central axis. In this manner, as transmission input interface 105 receives a power input, carrier arm 112, drive rods 124a-b and drive gears 121a-f each rotate about their respective central axes.

In addition, in the illustrated embodiment, drive rods 124a-b are further coupled to carrier arm 112 such that as carrier arm 112 rotates about its central axis, drive rods 124a-b follow a similar path and collectively orbit around the central axis of carrier arm 112. Thus, as transmission input interface 105 rotates, drive rods 124a-b, and drive gears 121a-f connected to drive rods 124a-b, each have a rotational motion about their respective, central axes, and further have an orbital motion around the central axis of carrier arm 112. In example embodiments in which drive gears 121a-f are fixed on drive rods 124a-b so as to maintain the same rotational speed as drive rods 124a-b, it will also be appreciated that drive gears 121a-f can thus have both rotational and orbital motions, about different respective axes, and accordingly, may be referred to herein as moon gears.

As drive gears 121a-f rotate and orbit, they engage driven gears 132a-c of power output system 130, thereby transferring power to power output system 130. Moreover, as disclosed herein, power transfer system 110 of FIG. 1A may operate without clutches or bands being used to change between gear ratios, or may otherwise be configured to be substantially constantly connected to an external power source in communication with transmission input interface 105. For example, in some embodiments, each of drive gears 121a-f acts as a moon gear and rotates and orbits within the interior of one of driven gears 132a-c, which are ring gears. Inasmuch as drive gears 121a-f collectively remain in substantially constant connection with transmission input interface 105 as transmission input interface 105 receives a power input, drive gears 121a-f each rotate and orbit.

Moreover, power output system 130 can be configured to be in constant engagement with at least one of drive gears 121a-f at any particular gear ratio, or even possibly during changes between gear ratios, as disclosed herein. For example, as drive gears 121a-f orbit and rotate, at least one of drive gears 121a-f can always be engaged with at least one of driven gears 132a-c of power output system 130. Thus, inasmuch as at least one driven gear 132a-c is always engaged with at least one drive gear 121a-f, and at least one of drive gears 121a-f is always engaged with the power source, at least one driven gear 132a-c is thus constantly connected to the power source. Moreover, in some embodiments, and as disclosed in more detail herein, driven gears 132a-c can be linked such that as any one or more of driven gears 132a-c is engaged and rotated by drive gears 121a-f, such that the engaged one or more of driven gears 132a-c rotate about their respective central axes, all of driven gears 132a-c synchronously rotate about their own respective central axes. In this manner, if any one of driven gears 132a-c is engaged by a drive gear 121a-f, and is thus connected to the power source, each of driven gears 132a-c is also connected to the power source and rotates as well.

To maintain substantially constant engagement between one or more of drive gears 121a-f and one or more driven gears 132a-c, driven gears 132a-c may be configured to alternately engage drive gears 121a-f in a manner such that at least one of drive gears 121a-f is always in engagement with at least one of driven gears 132a-c. FIGS. 2A-G illustrate, for example, driven gears 132a-c and drive gear sets 120a-b in transmission 100 of FIG. 1A as viewed from a frontal perspective taken from proximal end 101 of transmission 100. Specifically, FIGS. 2A-G illustrate drive gear sets 120a-b at various stages of a particular orbital cycle of drive gears 121a-f of drive gear sets 120a-b, and disclose one manner in which constant engagement between power output system 130 and power transfer system 110 can be maintained. As illustrated in FIG. 2A, for example, driven gears 132a-c can, in some embodiments, be offset such that they rotate around offset central axes. For example, in the illustrated embodiment, driven gears 132a-c are offset and driven gear 132a rotates around a central axis passing through center 132a', driven gear 132b rotates around its central axis passing through center 132b', and driven gear 132c rotates around its central axis passing through center 132c'.

In the illustrated embodiment, driven gears 132a-c are offset around a circle at one hundred twenty degree intervals. In particular, it can be seen that if a circle is drawn to circumscribe an equilateral triangle formed by centers 132a'-c', lines passing through the center of the circumscribing circle and each of centers 132a'-c' are each offset one hundred twenty degrees. It should be appreciated, however, that this offset is exemplary only and not limiting of the present invention. For example, in some other embodiments, more or fewer than three ring gears can be used, and each ring gear can be offset at equal intervals other than one hundred twenty degrees. In other embodiments, unequal angular offsets are used, regardless of the number of output gears. In still other embodiments, multiple driven gears can rotate about a common axis.

As shown in FIG. 2A, when three driven gears 132a-c are offset at equal angular intervals of one hundred twenty degrees, a rounded triangular portion is formed which is common to each of driven gears 132a-c, and which has one side formed by each of driven gears 132a-c. Within this common area, drive gear sets 120a-b can orbit and rotate, and individually enter into and out of engagement with driven gears 132a-c, while collectively maintaining engagement with driven gears 132a-c. In this embodiment, for example, drive gear sets 120a-b are offset around a circle at one hundred eighty degrees. However, in other embodiments more or fewer than two drive gear sets may be used, and/or the drive gears or drive gear sets may be spaced at different angular intervals.

As shown in FIG. 1A, each of drive gear sets 120a-b may have at least one drive gear 121a-f corresponding to each driven gear 132a-c. For example, in FIG. 1A, drive gears 121a and 121d lie in the same plane as, and engage, driven gear 132a. Similarly, drive gears 121b and 121e lie in the same plane as, and engage, driven gear 132b, while drive gears 121c and 121f are similarly disposed with respect to driven gear 132c. In other embodiments, more or fewer drive gears are used. For example, a single gear may replace a set of two or more drive gears. For instance, a single drive gear may be sized such that it extends through the planes of each of driven gears 132a-c, thereby allowing it to engage each of driven gears 132a-c. Alternatively, a single drive gear may be adapted to move axially so as to move between the respective planes of each of driven gears 132a-c and engage each of driven gears 132a-c. Accordingly, a drive gear set may include as few as one drive gear.

Returning now to FIG. 2A, it can be seen that drive gear sets 120a-b may orbit within the common area of driven gears 132a-c and around an axis that is offset from the center of one or more of driven gears 132a-c. For example, drive gear sets 120a-b may collectively orbit around an axis passing through center point 120' which is not aligned with any of center points 132a'-c' about which driven gears 132a-c rotate. As drive gear sets 120a-b rotate in this common area, they may alternately engage the three sides of the common area. As is evident from FIG. 2A at least, each of the three curved sides of the common area is the interior profile of one of the respective driven ring gears 132a-c. In this manner, the gear teeth of virtual output gear 132 comprise gear teeth from each of driven ring gears 132a-c. Thus, the driven gears 132a-c collectively define a virtual output gear 134 which is constantly engaged and driven by drive gear sets 120a-b at a particular gear ratio. Moreover, the configuration of virtual gear 134 can change from one gear ratio to another. For instance, the size of virtual gear 134 can change as driven gears 132a-c move inward or outward. As is evident, if the gear teeth of driven gears 132a-c remain a constant size, the number of virtual gear teeth on virtual output gear 134 can therefore also change as virtual output gear 134 changes size. In the example of FIG. 2A, the virtual gear includes gear teeth from each of the three different driven gears, and each driven gear defines approximately one-third of the virtual output gear, although the use of more or fewer driven gears can result in corresponding changes to the number of gear teeth contributed by each driven gear, as well as to the percentage contribution of each driven gear. As further disclosed herein, virtual output gear 134 may also be substantially constantly engaged by drive gear sets 120a-b during changes between gear ratios.

An exemplary manner in which drive gear sets 120a-b can selectively engage driven gears 132a-c, and thereby also engage effective output gear 134 formed by driven gears 132a-c, is illustrated in FIGS. 2A-G, which illustrate various stages of a half orbit of drive gear sets 120a-b around center 120'. In FIG. 2A, for example, drive gear sets 120a-b are aligned in the vertical direction, at zero degrees and one-hundred eighty degrees, respectively. In this position, one or more drive gears from drive gear set 120b may be in dead center engagement with driven gear 132c, while any drive gears in drive gear set 120a are fully disengaged from any of driven gears 132a-c. It should be appreciated in light of the disclosure herein that while the embodiment illustrated in FIG. 2A shows drive gear set 120b in engagement with driven gear 132c, it is not required that each gear in drive gear set 120b be simultaneously engaged. In fact, drive gear set 120b can be engaged when any one or more of drive gears 121d-f of that drive gear set 120b is engaged. As illustrated in the example arrangement of FIG. 1A, for example, drive gear set 120b is engaged with driven gear 132c even when only drive gear 121f is engaged with ring gear 132c.

As drive gear sets 120a-b orbit around a central axis passing through center 120', they can maintain engagement with virtual gear 134 by alternately engaging driven gears 132a-c. For example, FIG. 2B illustrates drive gear sets 120a-b after they orbit clockwise thirty degrees from the position in FIG. 2A. As illustrated, throughout the thirty degrees of clockwise rotation, drive gear set 120b maintains engagement with driven gear 132c. In addition, at thirty degrees rotation, drive gear set 120b is preparing to begin disengagement from driven gear 132c. However, at about the same time, drive gear set 120a is entering into engagement with driven gear 132b. For example, drive gear 121b (FIG. 1A) may be entering into engagement with driven gear 132b.

If drive gear sets 120a-b orbit another thirty degrees in a clockwise direction, drive gear sets 120a-b move to a position such as that illustrated in FIG. 2C. As illustrated in FIG. 2C, drive gear set 120a has now moved into dead center engagement with driven gear 132b, while drive gear set 120b has completely disengaged from effective output gear 134. Dead center engagement can occur in an involute gear profile where, for example, an engaging gear tooth is substantially centered within a root of the mating gear.

As further illustrated in FIG. 2D, with another thirty degrees clockwise orbit around center 120', each of drive gear sets 120a-b again become engaged with virtual gear 134. For instance, drive gear set 120a maintains engagement with driven gear 132b as drive gear set 120b engages driven gear 132a. In one exemplary embodiment, drive gear 121d (FIG. 1) of drive gear set 120b thus engages driven gear 132a. Thereafter, with another thirty degrees clockwise orbit, and as illustrated in FIG. 2E, drive gear set 120b may enter into dead center engagement with driven gear 132a as drive gear set 120a is disengaged from virtual gear 134.

Similar engagement is maintained throughout a continued orbit by drive gear sets 120a-b, as illustrated in FIGS. 2F-G. In particular, with an additional thirty degrees clockwise orbit about center 120' drive gear sets 120a-b can be positioned as illustrated in FIG. 2F, in which drive gear set 120b maintains engagement with driven gear 132a as drive gear set 120a enters into engagement with driven gear 132c. In one example, drive gear 121c (FIG. 1A) of drive gear set 120a enters into engagement with driven gear 132c. Thereafter, an additional thirty degrees clockwise orbit of drive gear sets 120a-b, for a total of one hundred eighty degrees rotation from the position of FIG. 2A, may result in a position similar to that illustrated in FIG. 2G in which drive gear set 120a is in dead center engagement with driven gear 132c and gear set 120b is disengaged from each of driven gears 132a-c.

Thereafter, rotation of drive gear sets 120a-b may continue to complete a full rotation in a manner similar to that illustrated in FIGS. 2A-G, except that the opposite drive gear sets now alternately engage virtual gear 134. In particular, actions of drive gear set 120a in FIGS. 2A-G would be replaced by the actions of drive gear set 120b, and the actions of drive gear set 120b would be replaced by those of drive gear set 120a. Accordingly, drive gear sets 120a-b collectively maintain engagement with virtual output gear 134 as they orbit around an axis passing through center 120'. Moreover, it can be seen that in some embodiments, driven gears 132a-c are alternately engaged by drive gear sets 120a-b and that drive gear sets 120a-b and drive gears 121a-f may also alternately engage driven gears 132a-c and virtual output gear 134 such that at least one of drive gears 121a-f is always engaged with at least one of driven gears 132a-c. Moreover, in embodiments in which driven gears 132a-c are linked to each other so as to maintain synchronous rotations, engagement of any one of one driven gear 132a-c can result in a corresponding rotation of each of driven gears 132a-c, such that all driven gears 132a-c remain connected to drive gear sets 120a-b and the power source.

Although FIGS. 2A-G illustrate a partial orbital cycle of drive gear sets 120a-b in a clockwise direction, and rotation of drive gears 121a-f about their respective centers in a counter-clockwise direction, it should be appreciated that a transmission according to the present invention is not limited to any particular orbital direction, and that, in other embodiments, drive gear sets 120a-b orbit around an axis passing through center 120' or some other reference point in a counterclockwise or other direction. For example, an exemplary illustration of an orbital cycle of drive gear sets 120a-b in a counterclockwise direction can be seen by reversing the order of the cycle illustrated in FIGS. 2A-G. Moreover, while the illustrated embodiment discloses that one drive gear set is disengaged while the other is engaged in dead center engagement, it should also be appreciated that this arrangement is illustrative only and not limiting of the present invention. For example, it is contemplated that in other embodiments one or more drive gear sets are engaged with one or more driven gears at the same time as the same or another drive gear set is in dead center engagement with another driven gear.

As drive gear sets 120a-b engage virtual gear 134 by, for example, alternately engaging driven gears 132a-c as drive gear sets 120a-b follow an orbital path, drive gear sets 120a-b cause driven gears 132a-c to rotate. This is because, as noted earlier, drive gears 121a-f of drive gear sets 120a-b can rotate as well as orbit. For example, each driven gear can be caused to rotate around its own central axis. Returning now to FIG. 1A, it can be seen that in some embodiments, output driven gears 132a-c can be linked together such that they maintain identical rotations while each rotates about its own central axis. In the illustrated embodiment, for instance, power output system 130 includes a linkage system 136 for each driven gear 132a-c. In general, linkage systems 136 link the rotation of each driven gear to the rotation of each of the other driven gears. In this manner, as one driven gear rotates, the other driven gears each have corresponding, synchronous rotations about their own central axes.

According to one example embodiment of the present invention, each linkage system 136 may include an output moon gear 138 which engages one of driven gears 132a-c. In the illustrated embodiment, drive gears 121a-f each have a gear tooth profile that mates with a gear tooth profile on the interior of driven gears 132a-c, such that as drive gears 121a-f rotate and/or orbit, driven gears 132a-c are caused to rotate. Further, driven gears 132a-c may also have an exterior gear tooth profile which mates with a gear tooth profile of output moon gears 138. In this manner, and by way of example only, as drive gears 121a-f engage and drive driven gears 132a-c, driven gears 132a-c cause output moon gears 138 of linkage systems 136 to rotate and thereby transfer power to output moon gears 138 of linkage systems 136.

Linkage systems 136 may further include an output sun gear 140 which mates with output moon gear 138. As illustrated in FIG. 1, for example, output moon gears 138 are elongated such that they can engage a driven gear 132a-c and an output sun gear 140. In other embodiments, however, output moon gear 138 can be separated into different portions which are then connected such that a first gear engages a driven gear 132a-c and a second gear engages output sun gear 140.

Inasmuch as output moon gear 138 mates with output sun gear 140, as output moon gear 138 rotates, the gear teeth on output moon gear 138 engage the gear teeth on output sun gear 140, thereby also causing output sun gear 140 to rotate. In some embodiments, linkage system 136 further includes a linkage shaft 142 which is connected to output sun gear 140 on a distal end of linkage shaft 142. In some embodiments, linkage shaft 142 is also connected to an output transfer gear 145 on a proximal end. Linkage shaft 142, output sun gear 140, and output transfer gear 145 are, in some embodiments, adapted to maintain the same rate of rotation. For example, linkage shaft 142 can be connected to output sun gear 140 and output transfer gear 145 such that as output sun gear 140 rotates, output transfer gear 145 is also rotated. Optionally, output transfer gear 145 is rotated at the same speed as output sun gear 140.

In some example embodiments, transmission 100 may further include elements for connecting linking systems 136 of each driven gear 132a-c in output system 130, such that the output of any one of linkage systems 136 rotates, e.g. by rotating output sun gear 140, the outputs of all other linkage systems 136 have identical, synchronous rotations about their respective axes. In the illustrated embodiment, for example, transmission 100 includes an output gear 146 which engages each output transfer gears 145 of each linkage system 136. In this manner, when any of driven gears 132a-c is rotated, the linkage system 136 corresponding to the engaged and rotating driven gear engages output gear 146 and causes output gear 146 to rotate. As each output transfer gear 145 of each linkage system 136 is engaged with output gear 146, if any one of output transfer gears 145 rotates, output gear 146 is engaged and rotated, and further causes a corresponding rotation of every other output transfer gear. In this manner, rotation of one or more of driven gears 132a-c can transfer the power through its corresponding linkage system 136, to output gear 146, which then causes linkage systems 136 of unengaged gears to synchronously rotate the unengaged gears in a rotation that is identical to, and corresponds with, the rotation of the one or more engaged driven gears. Thus, it can be seen that the connection of any one of driven gears 132a-c to the power source—such as through engagement with one or more of drive gears 121a-c—can result in each of driven gears 132a-c being connected to the power source.

To provide power output from transmission 100, transmission 100 can also include a transmission output interface 170 which can be then be connected to a drive train, a load, or a power sink so as to transmit an output power to the drive train, load, or power sink. In the illustrated embodiment, transmission output interface 170 is connected to the linkage system 136 corresponding to driven gear 132b, although this arrangement is not limiting of the present invention. When transmission output interface 170 is arranged as illustrated in FIG. 1A, as driven gear 132b is engaged by one or more of drive gear sets 120a-b, or is otherwise caused to rotate, linkage system 136 also rotates, thereby rotating transmission output interface 170 and transmitting a power output. As will be appreciated from this disclosure, transmission output interface 170 can also provide a power output when driven gear 132b is not directly engaged by drive gear sets 120a-b. For example, when driven gear 132a or 132c is engaged, linkage systems 136 and output gear 146 can cause the linkage system 136 corresponding to output driven gear 132b to rotate, thereby also providing power output to transmission output interface 170.

While FIG. 1A illustrates transmission output interface 170 as being directly connected to a distal end of the linkage system 136 associated with driven gear 132b, it should also be appreciated that this arrangement is exemplary only. In other embodiments, transmission output interface 170 can be directly connected to any other of linkage systems 136. In still other example embodiments, transmission output interface 170 is not directly connected to any of linkage systems 136. For example, transmission output interface 170 may instead be directly connected to any one or more of driven gears 132a-c or to output gear 146, or indirectly coupled in any suitable manner to any of linkage systems 136, output gear 146, or driven gears 132a-c.

In some embodiments, each of drive gears 121a-f is the same physical size. Moreover, each of output driven gears 132a-c, may also be of the same physical size such that the relationship of the radii of a drive gear 121a-f to an engaged driven gear 132a-c does not change, regardless of which of drive gears 121a-f engages a driven gear 132a-c. Consequently, and as disclosed in more detail herein, transmission 100 can operate at a large number of gear ratios without selectively engaging and disengaging physical gears of differing sizes, and without clutches and bands. Thus, transmission 100 can act as a clutchless transmission inasmuch as it can operate without clutches or bands to engage and disengage drive or driven gears to effectuate a gear ratio change. Accordingly, transmission 100 is clutchless inasmuch as it can operate without clutches or bands on the drive and driven gears and/or to change gear ratios, regardless of whether clutches or bands are otherwise used in transmission 100. In one example embodiment of transmission 100, however, transmission 100 uses no clutches or bands for any purpose.

While embodiments of the present invention can extend to a clutchless transmission in which drive gears 121a-f collectively maintain constant engagement with one or more of driven gears 132a-c, even during gear ratio changes, a clutchless configuration is not necessary in all embodiments of the present invention. In particular, in some applications it may be desirable that a clutch or other mechanism be used to at least temporarily disengage the drive and driven gears such that the power source is disconnected from the load. Even in such embodiments, it will be appreciated, however, that embodiments of the invention can include aspects such as, for example, the ability to change between a very large, and possibly an infinitely large, number of non-discrete gear ratios. Such embodiments of the invention can also include the ability to switch between gear ratios in a very small amount of time, such that if the drive and driven gears are temporarily disconnected from each other, such disconnection has a negligible effect on the momentum of an associated load, and causes little to no torque spike.

Figure 1B:
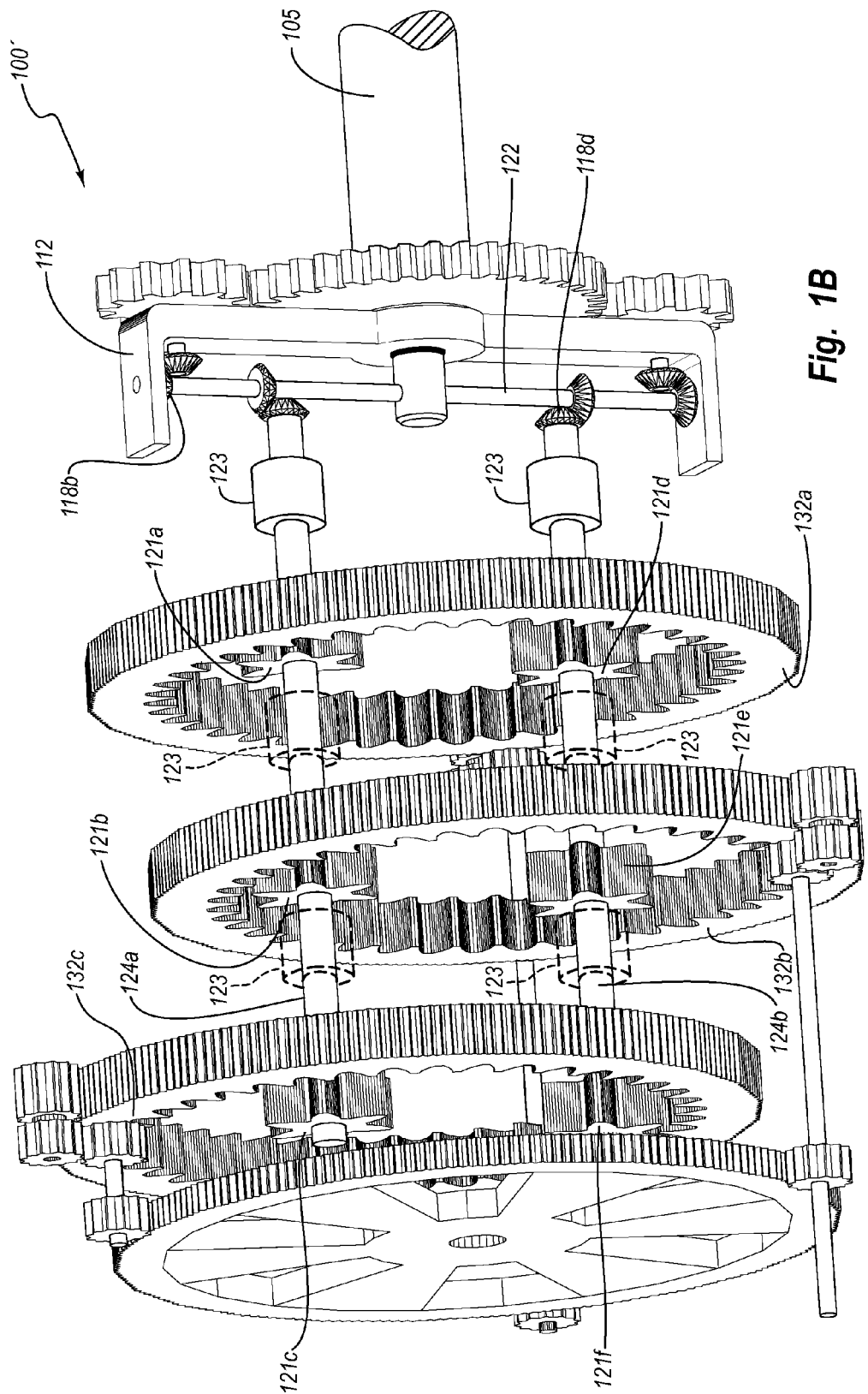
FIG. 1B is a perspective view of another exemplary variable speed transmission according to another embodiment of the present invention, in which multiple drive gears and driven gears are configured to engage each other at multiple discrete gear ratios which can change in very small, discrete increments.

As illustrated in FIG. 1B, for example, an alternative embodiment of a variable speed transmission 100' is disclosed in which one or more clutches 123 can be used in connection with drive gears 121a-f. It will be appreciated that the illustrated embodiment is exemplary only and that clutches of any suitable type and placement may be used in connection with a transmission according to the present invention.

In the embodiment illustrated in FIG. 1B, at least one clutch 123 is located on each of drive shafts 124a-b. For example, on drive shaft 124a, a clutch 123 may be positioned between drive gear 121a and transfer gear 118d, and configured to selectively stop the rotation of drive gear 121a. Specifically, as input shaft 105 rotates, thereby causing drive shafts 124a-b to rotate and orbit, the clutch 123 may be engaged. Engagement of the clutch may, in turn, decouple drive gear 121a from the rotation of input shaft 105, thereby stopping the rotational motion of drive gear 121a. As will be appreciated, due to the placement of clutch 123 between drive gear 121a and transfer gear 118, when clutch 123 is engaged and thereby prevents the rotational motion of drive gear 121a, the rotational motion of drive gears 121b-c is also stopped.

As further shown in FIG. 1B, a clutch 123 may be similarly located on drive shaft 124b, between drive gear 121d and transfer gear 118d. Accordingly, when such a clutch is engaged, thereby decoupling drive gear 121d from the rotation of input shaft 105, drive gears 121d-f each cease to rotate. As will be appreciated in view of the disclosure herein, any other clutch arrangement that affords comparable functionality can be employed. The scope of the present invention is not, therefore, limited to the illustrative embodiments, and other clutch configurations, including the number of clutches, types of clutches, locations of clutches, and the like may be varied. Additionally, a suitable clutch may provide additional functionality, such as moving a drive or driven gear so as to disengage the drive and driven gears. Moreover, the one or more clutches 123 can be controlled in any suitable manner. For instance, a manual or electronic control may be utilized. Accordingly, the clutch can, in one example embodiment, be operated and controlled by a transmission control system, such as electronic control system 180 (FIG. 7), disclosed herein.

As noted above, one or more clutches 123 may be placed in any suitable location which allows the clutch(es) to decouple drive gears 121a-f from the rotation of input shaft 105. For example, while a clutch 123 may be positioned as disclosed above, namely between transfer gear 118a and drive gears 121a, d, a clutch 123 may alternatively, or additionally, be placed in other locations on drive shafts 124a-b. Illustrated in phantom lines, for example, are alternative or additional placements for clutches 123. Specifically, on drive shaft 124a, one or more clutches 123 can be placed between drive gear 121a and drive gear 121b, and/or between drive gear 121b and drive gear 121c. Similarly, one or more clutches 123 can also be placed on drive shaft 124b between drive gear 121d and drive gear 121e and/or between drive gear 121e and drive gear 121f.

While the illustrated clutches 123 are illustrated as being located on drive shafts 124a-b, use of a clutch in this manner is not limited to such positioning. Indeed, in some embodiments, it may be desirable to stop both the orbital and rotational motions of drive gears 121a-f. Accordingly, a clutch may additionally, or alternatively, be used to stop the orbital motion of drive gears 121a-f. By way of example and not limitation, a clutch (not shown) may be placed between input shaft 105 and carrier arm 112. When such a clutch is disengaged, rotation of input shaft 105 will continue to cause carrier arm 112 to rotate as described above with reference to FIG. 1A. However, when such a clutch is disengaged, rotation of input shaft 105 is decoupled from carrier arm 112, such that carrier arm 112 can cease to orbit. As will be appreciated in view of the disclosure herein, by stopping the orbital motion of carrier arm 112, the rotational and orbital motions of drive gears 121a-f can also be stopped, and thus be decoupled from the rotation of input shaft 105.

The one or more clutches 123 may also be implemented in various other manners. For example, in one embodiment, one or more clutches may be consolidated at the end of drive shafts 124a-b. In such an embodiment, the shafts may be arranged to have a shaft within a shaft arrangement, such that a single clutch can control engagement and/or rotation of each of drive gears 121a-f.

As will be appreciated in view of the disclosure herein, clutches 123 may be of a variety of different types which are suitable for coupling and decoupling the rotational and/or orbital motion of drive gears 121a-f from the rotation of input shaft 105, and/or engaging and disengaging drive gears 121a-f from driven gears 132a-c. For example, a clutch 123 may be implemented in various ways, including, but not limited to, a disc clutch, a cone clutch, a jaw clutch, a claw clutch, a spiral claw clutch, a ratchet clutch, a combined conical-disc clutch, a magnetic clutch, a hydraulic clutch, or a centrifugal clutch, as desired for a particular application. Moreover, it will be appreciated that clutches 123 can be positioned such that drive gears 121a-f are implemented within the clutch. For instance, drive gears 121a-f may be positioned within a clutch packet, such that clutches 123 are essentially aligned with driven gears 132a-c.

Further, while the above disclosure of transmission 100' includes the use of one or more clutches 123 to selectively and temporarily disengage drive gears 121a-f from driven gears 132a-c, it should be appreciated that this disclosure is exemplary only. In other embodiments, for instance, a window of time can be defined for re-orienting drive gears 121a-f, and the orientation of drive gears 121a-f determined so as to maintain engagement with driven gears 132a-c for that window. The time window can have a length, for example, that is short enough to avoid a torque spike or to allow for only a negligible torque spike. Additionally, this time window may be connected to the output of the transmission. In one embodiment, this connection expands or contracts the time window, depending on changes to the output speed. The orientation of drive gears 121a-f can therefore be pre-determinable within a window of time. As a result, while engagement or disengagement of a clutch may re-orient drive gears 121a-f for continued engagement with driven gears 132a-c, it may be unnecessary to even clutch the disengagement of drive gears 121a-f and driven gears 132a-c.

While embodiments of the present invention can employ drive gears each of the same physical size, and driven gears each of the same physical size, it should be appreciated that such relationships are not necessary. Moreover, while drive gears and driven gears may, in some embodiments, be of respectively different physical sizes, any particular variation in physical size is not a requirement for a transmission as disclosed herein. In fact, the present invention can be employed using drive and driven gears of about the same physical size, as disclosed herein. Moreover, in some embodiments, the drive and driven gears are spur gears or helical gears which are substantially the same diameter from one axial end to the other axial end, such that they do not have a taper across their width. In other embodiments, however, drive and driven gears may be bevel gears which taper from one axial end to the other, or may otherwise narrow or have a non-uniform size from one axial end to the other. More generally, any gear geometry, size and/or arrangement of gears effective in implementing one or more aspects of the functionality disclosed herein may be employed. Accordingly, the scope of the invention is not limited to the exemplary embodiments disclosed herein.

Now referring to FIGS. 3A-C, which schematically disclose aspects of a transmission 200 that is similar in some regards to transmissions 100 (FIG. 1A) and 100' (FIG. 1B), one manner of varying gear ratios while maintaining a connection between the power source and load, and maintaining a constant or substantially constant engagement between drive and driven gears, is described. In particular, FIGS. 3A-C illustrate transmission 200 at various gear ratios.

In the example embodiment illustrated in FIG. 3A, transmission 200 includes three driven gears 232a-c which are each configured to rotate about an axis passing through a respective center. In addition, transmission 200 includes two drive gears 220a-b, or drive gear sets, which engage and rotate driven gears 232a-c. It should be appreciated that the number of driven gears and drive gears is exemplary only, and that in other embodiments, more or fewer drive gears and/or driven gears may be used. Additionally, in some embodiments, and as disclosed herein, the three driven gears 232a-c can be linked such that they maintain identical rotations as each driven gear rotates about its own central axis. Moreover, while in the illustrated example embodiment, driven gears 232a-c are ring gears and are offset at substantially equal angular intervals of about one hundred twenty degrees, and drive gears 220a-b are offset at about one hundred eighty degrees, it should be appreciated that the disclosed configuration and arrangement of driven gears 232a-c and drive gears 220a-b is exemplary only.

As disclosed herein, driven gears 232a-c can be configured to rotate either when engaged by drive gears 220a-b or when caused to rotate by a linkage system. In addition to their rotational motion, however, ring gears 232a-c may also translate in-and-out. For example, as illustrated in FIGS. 3A-C, each driven gear 232a-c can slide in-and-out along a translation path that is offset some amount from the translation path of one or more of the other driven gears. In the illustrated example embodiment, for example, driven gears 232a-c each translate along a respective translation path 233a-c which extends radially from a respective center of each of driven gears 232a-c. In some instances, the angular offset of each of translation paths 233a-c may be equal. Accordingly, and by way of example only, for three driven gears 232a-c, the angular offset of each of translation paths 233a-c is about one hundred twenty degrees. In this manner each of the driven gears can translate and retain the same angular offset from the other driven gears, regardless of the radial positioning of the driven gears.

As shown in FIG. 3A, drive gears 232a-c create, in this embodiment, a generally triangular portion having curved sides which defines a virtual gear 234 which is in constant engagement with at least one of drive gears 220a-b. As will be appreciated, the size and shape of virtual gear 234 can vary and no particular arrangement, size or shape of virtual gear 234 is necessary. For example, the shape of virtual gear 234 can change depending on the number of driven gears defining virtual gear 234 or, as disclosed herein, the radial position of driven gears 232a-c.

Within virtual gear 234, drive gears 220a-b are positioned at the distal ends of levers 219a-b. In addition, and as discussed above, drive gears 220a-b can be configured to have an orbital motion. Accordingly, in one example embodiment, levers 219a-b are representative of the distance between drive gears 220a-b and the axis about which drive gears 220a-b orbit. Thus, the intersection of levers 219a-b, at their respective proximal ends opposite the distal ends at which drive gears 220a-b are positioned, defines a center through which the axis about which drive gears 220a-b orbit passes. Moreover, in addition or in the alternative to an orbital motion, each of drive gears 220a-b may rotate about its own, respective central axis passing through its respective center.

The illustrated levers 219a-b may be actual or virtual levers in implementing a transmission 200 according to the principles disclosed herein. For example, a physical lever may be attached between a drive gear at the end of the lever and to the center of the intersection between levers 219a-b. Alternatively, the lever may be virtual. For instance, as disclosed in FIGS. 1A-B, axial shafts 120a-b may hold drive gears 121a-f and orbit the drive gears 121a-f about a central, orbital axis, without a physical lever arm maintaining a connection between drive gears 121a-f and the axis around which they orbit.

Levers 219a-b, whether actual or virtual, may be controlled and varied such that their respective lengths can be varied. For example, relative to drive gears 220a-b, drive gears 220a-b at the ends of levers 219a-b in FIG. 3A may slide radially outward, such that length of levers 219a-b changes. As illustrated, for example, drive gears 220a-b may slide in a radial direction from the position in FIG. 3A to the positions illustrated in FIGS. 3B and 3C, or to any position between those illustrated in FIGS. 3A and 3C. It can thus be seen that as radial translation of drive gears 220a-b occurs from FIG. 3A to FIG. 3C, the length of levers 219a-b increases. Similarly, if drive gears 220a-b translate radially from the position of FIG. 3C to the position in FIG. 3B or FIG. 3A, the length of levers 219a-b correspondingly decreases.

As drive gears 220a-b orbit around the center of levers 219a-b, they can engage the various ring gears 232a-c, thereby causing driven gears 232a-c to rotate. Moreover, as the length of levers 219a-b increases, the radius of the orbit of drive gears 220a-b increases, thereby also increasing the length of the orbital path of drive gears 220a-b. For drive gears 220a-b to maintain a constant angular velocity while following a longer orbital path, the linear velocity of drive gears 220a-b is necessarily increased. Similarly, as the length of levers 219a-b decreases, and the radius and length of the orbital path of drive gears 220a-b decrease, the linear velocity of drive gears 220a-b correspondingly decreases.

Accordingly, the linear velocity of any point on drive gears 220a-b is related to the length of levers 219a-b and to the angular velocity at which drive gears 220a-b rotate. For example, in the example embodiment disclosed in FIGS. 3A-C, drive gears 220a-b mate with driven gears 232a-c at engagement points 235. It will be appreciated that at engagement points 235 on drive gears 220a-b, engagement points 235 have a linear velocity which is related with the orbital motion of drive gears 220a-b. In particular, if $v_1$ is the linear velocity of drive gears 220a-b at engagement points 235, $v_1$ is related to the orbital motion of drive gears 220a-b by the equation: $v_1 = \omega_1 \cdot l$, where $\omega_1$ is the angular velocity, i.e. the orbital speed or orbital RPMs, of drive gears 220a-b, and l is the distance from the engagement points 235 to the axis about which drive gears 220a-b orbit. Accordingly, it can be seen that $v_1$ is directly proportional to l, and if $\omega_1$ is held constant, $v_1$ will increase as l increases, and $v_1$ will decrease as l decreases.

Moreover, if driven gears 232a-c rotate about their centers when engaged by drive gears 220a-c, the linear velocity, $v_2$, of the point of engagement on driven gears 232a-c is related to the rotational motion of driven gears 232a-c by the equation $v_2 = \omega_2 \cdot r$, where $\omega_2$ is equal to the angular velocity, i.e. the rotational speed or RPMs, of driven gears 232a-c, and $r$ is the radius of driven gears 232a-c. Thus, it can be seen that $v_2$ is directly proportional to $\omega_2$, such that if r is held constant, as $v_2$ increases $w_2$ increases, and as $v_2$ decreases, $\omega_2$ also decreases.

Additionally, engagement points 235 are common to drive gears 220a-b and driven gears 232a-c, such that at engagement points 235, drive gears 220a-b and driven gears 232a-c have the same linear velocity. Thus, at engagement points 235, $v_1 = v_2$. Accordingly, in a system in which the angular velocity, $\omega_1$, of drive gears 220a-b and radius, r, of driven gears 232a-c are substantially constant, and the orbital distance l of drive gears 220a-b, and the angular velocity, $\omega_2$, of driven gears 232a-c, can vary, the relationship between l and $\omega_2$ can be expressed as $l = k \cdot \omega_2$, where k is a constant equal to $r/\omega_1$. Thus, $\omega_2$ and l are directly proportional and as one increases or decreases, the other will change accordingly. Accordingly, it can be seen as the length of levers 219a-b increase and decrease, thereby increasing or decreasing the linear velocity of the point of engagement of drive gears 220a-b, the angular velocity of driven gears 232a-c correspondingly increases or decreases.

The relationship between the length of levers 219a-b and the angular velocity of driven gears 232a-c can be further illustrated by two simple examples. It will be appreciated that the following examples are not limiting of the present invention and are, instead, presented merely to illustrate certain aspects of the present invention.

In a first example, a transmission, such as transmission 200 of FIG. 3B, can be arranged such that levers are 1 inch in length. In addition, it can also be assumed that the transmission can be arranged or constructed such that the diameter of the drive gears is equal to 1 inch, the radius of the driven gears is equal to 8 inches, and that the drive gears can orbit at a constant angular velocity of 2000 RPM. It will thus be appreciated that in such an example, the linear velocity of an engagement point on the outer edge of the drive gears, at the furthest point from the axis about which the drive gears orbit, is about equal to 4000 inches/minute ($\omega_1$=2000 RPM and l=(1 inch+1 inch)).

Further, inasmuch as the engagement point is shared between the drive gears and the driven gears, the linear velocity, $v_2$, of the driven gears at the engagement point is equal to the linear velocity, $v_1$, of the drive gears at engagement point. Accordingly, $v_2$ is, in this example, also equal to 4000 inches/minute. Moreover, inasmuch as the driven gears rotate about their central axis and have a fixed radius, the angular velocity, $\omega_2$, of the driven gears can be determined and is about equal to 500 RPM ($v_2$=4000 inches/minute and r=8 inches). Thus, the angular velocity, $\omega_2$, of the driven gears is four times less (500 RPM compared to 2000 RPM) than the angular velocity, $\omega_1$, of the drive gears, such that this exemplary arrangement of the drive gears and the driven gears provides a 4:1 gear reduction.

In a second example, however, take a transmission such as transmission 200 from FIG. 3C, and assume, as in the first example, that the drive gears have diameters of 1 inch, the radius of the driven gears is constant and equal to 8 inches, and that the drive gears orbit at a constant angular velocity of 2000 RPM. In this example, however, assume also that the lever length has been increased to, for example, 3 inches. As will be appreciated, if such an increase to the lever length is made, the linear velocity, $v_1$, of an engagement point on the outer edge of the drive gear, at the furthest distance from the axis about which the drive gears rotate, is about 8000 inches/minute ($\omega_1$=2000 RPM and l=(1 inch+3 inches)). As the driven gears have the engagement points in common with the drive gears, the linear velocity, $v_2$, of the driven gears at the engagement points is also about 8000 inches/minute. Moreover, as the linear velocity, $v_2$, has increased, the angular velocity, $\omega_2$, of the driven gears must also necessarily increase over the angular velocity of the driven gears in the first example. For instance, in this second example, the angular velocity, $\omega_2$, of driven gears 232a-c is about 1000 RPM ($v_2$=8000 inches/minute and r=8 inches). Thus, the angular velocity, $\omega_2$, of the driven gears is only two times less (1000 RPM compared to 2000 RPM) than the angular velocity, $\omega_1$, of the drive gears, such that this exemplary arrangement of the drive gears and the driven gears provides a 2:1 gear reduction.

Thus it can be seen that by moving drive gears 220a-b radially so as to increase or decrease the length of levers 219a-b, the angular velocity of driven gears 232a-c can be correspondingly increased or decreased, even if the angular velocity at which drive gears 220a-b remains constant. Consequently, the angular velocity of driven gears 232a-c can change, even for a constant input angular velocity of drive gears 220a-b, thereby providing a gear ratio change in transmission 200. Moreover, it will be appreciated that drive gears 220a-b are not limited to the two positions in the above example. Indeed, in some examples, such as that of transmission 100 illustrated in FIG. 1A and transmission 100' of FIG. 1B, a set of drive gears can be changeable between a large number, and possibly an infinite number, of positions. Each radial position produces a different lever arm, and each gear ratio corresponds to a different lever length. Thus, where drive gears 220a-b can slide along a range of possible positions, drive gears 220a-b can define an infinite number of non-discrete gear ratios. Similarly, even where drive gears 220a-b maintain engagement at only discrete locations, thereby stepping between positions, drive gears 220a-b can step between a finite number of many different, discrete gear ratios.

For example, with reference to FIG. 1A, drive gear sets 120a-b may slide radially inward or outward, while driven gears 132a-b correspondingly slide radially inward or outward. As discussed above, at each location along a radial translation path, the orbital path of drive gear sets 120a-b is of a different length, thereby defining a different gear ratio. In some embodiments, as discussed in greater detail herein, drive gear sets 120a-b may be configured to maintain constant engagement with driven gears 132a-c as drive gear sets 120a-b and driven gears 132a-c translate radially. Inasmuch as drive gear sets 120a-b can thus translate to any location on a linear path, an infinite number of non-discrete gear ratios may be possible.

It will be appreciated in view of the disclosure herein that it is not necessary that an infinite number of non-discrete gear ratios be defined. Indeed, in one embodiment, a large number of discrete gear ratios are defined in such a manner that shifting between adjacent gear ratios is imperceptible, or nearly imperceptible, such that the transmission approximates an infinitely variable transmission. Consider, for example, transmission 100' illustrated in FIG. 1B. As noted above, transmission 100' can include one or more clutches 123 which allow the rotational and/or orbital motions of drive gears 121a-f to be at least temporarily interrupted. Such an interruption may occur by engaging the clutch, which may also coincide with a gear ratio change.

According to one example embodiment, for instance, gear ratio changes in transmission 100' may be of such a small increment that the change is at least nearly imperceptible. For example, according to one embodiment, the length of the orbital path of each available location may increase or decrease by such a small amount that the time needed to engage the clutch, move the drive gears 121a-f and the driven gears 132a-c is so small, that the change can be made in fractions of a second, and even nearly instantaneously. To further decrease the time, such controls may be performed automatically, by an electronic control system. Nothing disclosed herein prevents, however, clutches 123 and/or movement of drive gears 121a-f and driven gears 132a-c from being controlled by a human operator.

According to one embodiment, various discrete orbital paths are available, and at each discrete location, the virtual gear is a whole integer virtual gear. In particular, that is to say that if the virtual gear is circular, the length of the circumference of the virtual gear can divided into a whole number of gear teeth the size of those on driving gears 121a-f or inside driven gears 132a-c. By way of example, in an illustrative case where the tooth width is one-quarter inch, a virtual gear having a circumference of twelve inches is a whole integer virtual gear inasmuch as its circumference is divisible into exactly forty-eight whole teeth. Accordingly, for the same tooth width, a virtual gear having a circumference of twelve and a third inches is not a whole integer virtual gear inasmuch as it is divisible into forty-nine whole gear teeth plus one-third of a fiftieth gear tooth.

By varying the orbital paths of drive gears 121a-f between discrete paths which each have lengths that are fully divisible by the width of the gear teeth of drive gears 121a-f, an additional complexity can be reduced. For example, as noted above, if drive gears 1221a-f slide to a radial position where the virtual gear defined by driven gears 132a-c has a circumference which is not a whole integer virtual circle, drive gears 121a-f may not properly align with the gear teeth of driven gears 132a-c as drive gears 121a-f rotate and orbit. Instead, the partial tooth in the virtual gear can cause misalignment which lessens the effectiveness of the transmission.

It will also be apparent to one of ordinary skill in the art that a very large number of discrete gear ratios can be provided over even a relatively small translational distance. For instance, it will be appreciated that in order to change from one whole integer virtual circle to the next whole integer virtual circle, the circumference needs to only increase or decrease by an amount equal to the tooth width. Inasmuch as drive gears 121a-f and driven gears 132a-c move radially and the radius and circumference of the virtual gear are related by the equation $c = 2 \cdot \pi \cdot r$, it can thus be deduced that where $t_w$ is equal to the tooth width, a radial change equal to $t_w/(2\pi)$ will change the size of the orbital path of drive gears 121a-f, as well as the virtual gear defined by drive gears 132a-c, to the next whole integer virtual gear. Moreover, the transmission may be controlled to ensure that drive gears 121a-f engage driven gears 132a-c only at locations where the defined virtual gear is a whole integer virtual gear. To control engagement in this manner, a mechanical or electrical control may be used. For instance, a lock-step mechanical shifting mechanism may be utilized. Alternatively, or in addition thereto, an electronic control system may control the movement, engagement, and disengagement of drive gears 121a-f and driven gears 132a-c.

In embodiments in which the mating gear teeth of drive gears 121a-f and driven gears 132a-c are of a relatively small size, it will be appreciated that the discrete gear ratios can be effected with very little radial translation of drive gears 121a-f and driven gears 132a-c. For instance, in an illustrative example, a drive gear may have a gear tooth profile in which gear teeth are one-half inch wide. Consequently, drive gears 121a-f and driven gears 132a-c would need to move radially a distance of only $1/(4\pi)$ inches, or approximately 0.08 inches, to move between gear ratios. Accordingly, by drive gears 121a-f and driven gears 132a-c translating a radial distance of only two inches, more than twenty-five discrete gear ratios can be obtained.

Additionally, inasmuch as the radial distance required to move between gear ratios is so small, there is also very little time needed to make the change. As a result, a change from one gear ratio to the next can, in some embodiments, occur nearly instantaneously. For instance, in the example of transmission 100' of FIG. 1B, the time needed to engage clutch 123, radially translate drive gears 121a-f and driven gears 132a-c to the next whole integer virtual circle and orbital path, and then disengage the clutch to re-start the rotational and/or orbital motions of drive gears 121a-f can be only a fraction of a second. Indeed, where such control of transmission 100' is controlled by a control system, the time to complete the change can be on the order of hundredths or tenths of a second.

While the foregoing discussion discloses a stepped transmission which steps between discrete gear ratios spaced at one-tooth increments to the size of the virtual gear, it will be appreciated that this feature is not limiting, and that other embodiments are contemplated. For example, as noted above, in embodiments such as transmission 100 (FIG. 1A), the transmission may not be stepped at all, but may instead slide between gear ratios. In other embodiments of stepped gear changes, however, other increments other than one-tooth may be used. For instance, in other embodiments steps between gear ratios may be made at two, three, four, or more gear tooth increments. In still other embodiments, the steps between gear ratios may be dependent on the number of drive or driven gears, or drive and driven gear positions, in the transmission. For example, a transmission having five drive gears, or five drive gear positions, may step between gear ratios in five tooth increments. Similarly, a transmission having three driven gears, or three driven gear positions, may step between gear ratios in three tooth increments.

As noted previously, changes to the gear ratio can be effected while the input to the transmission continues rotating, such that the transmission is connected to the power source while gear ratio changes are made. It will be appreciated that in other embodiments, however, a transmission according to the present invention may be disconnected from the power source, or the power source may be shut down while a gear ratio changes is made. For instance, in one embodiment a transmission according to the present invention may be implemented in a gear box connected to a conveyor. To change between gear ratios, the power to the conveyor system may be turned off. A user may then radially translate the drive and driven gears, whether it be manually, electronically, or in some other fashion, to a desired gear ratio, and re-engage the power. In such a case, it will also be appreciated that clutches 123 (FIG. 1B) may also be unnecessary and can be omitted.

Although some of the foregoing examples make certain assumptions about the number, size, positioning, angular velocities, and gear teeth of drive gears 220a-b and driven gears 232a-c, it should be appreciated that these assumptions have been made for the above examples only and are in no way limiting of the present invention. Instead, they are merely identified to more clearly indicate the manner in which a transmission according to a particular example embodiment of the present invention changes between gear ratios. In fact, it will be appreciated that one aspect of a transmission such as transmission 100 (FIG. 1A), transmission 100' (FIG. 1B) and transmission 600 (FIGS. 11A-B), is that they are scalable for use in a wide variety of applications. Thus, it is contemplated that the drive and driven gears can be any of various sizes, have any of various numbers of gears and gear teeth with any suitable size, and can operate at any of various angular velocities, as necessitated by the application in which the transmission is implemented. For example, an example transmission of the present invention may be implemented in connection with an aircraft carrier or other large marine craft, and may employ very large drive and driven gears which are many feet, if not yards, in diameter. Alternatively, another example transmission of the present invention may be implemented in, for example, a model car, and may employ very small drive and driven gears with diameters measured in centimeters, if not millimeters, in diameter.

As disclosed previously with regard to FIGS. 3A-C, as levers 219a-b increase in length, and the orbital paths of drive gears 220a-b change, driven gears 232a-c must also move so as to maintain engagement with drive gears 220a-b. Thus, as illustrated in FIGS. 3A-C, as driven gears 232a-c move, for example along a respective translation path 233a-c, the size of virtual gear 234 changes. Accordingly, gear ratio changes within transmission 200 can occur even without causing drive gears 220a-b to engage differently sized sets of physical, driven gears. Instead, as disclosed herein, gear ratio changes can be made by changing the size of the orbital path of drive gears 220a-b as well as the size of virtual gear 234 engaged with drive gears 220a-b.

To maintain constant or substantially constant engagement between drive gears 220a-b and driven gears 232a-c over gear ratio changes in which the size of virtual gear 234 is changed, the translational movement of driven gears 232a-c along translation paths 233a-c can be synchronized with changes to the length of levers 219a-b which correspondingly cause the radial movement of drive gears 220a-b. In particular, as drive gears 232a-c are moved outward or inward, the length of levers 219a-b can be substantially simultaneously increased or decreased a corresponding amount, thereby allowing driven gears 232a-c and drive gears 220a-b to remain substantially constantly engaged throughout their respective orbits and rotations, and, as discussed above, optionally even during an increase or decrease in the length and/or diameter of the orbital path of drive gears 220a-b. In this manner, substantially constant engagement is maintained at various gear ratios. Moreover, even in embodiments in which an exemplary transmission uses stepped gear ratio changes, such changes may be effected by such small movements in drive gears 220a-b and driven gears 232a-c that the time during which drive gears 220a-b are disconnected from a transmission input interface and/or external power source can be negligible and imperceptible, or almost imperceptible. In such an embodiment, drive gears 220a-b and driven gears 232a-c can effectively provide the same desired effects as a transmission which slides between gear ratios. Where multiple steps are provided, a stepped transmission as described herein can therefore effectively operate in a sliding fashion in which the transmission maintains an effective connection between the drive gears 220a-b and driven gears 232a-c throughout a change in gear ratios.

For instance, at about the same time that driven gears 232a-c slide in or out on their respective translation paths 233a-c, thereby varying the size of virtual gear 234 and the length of the orbital path of drive gears 220a-b, the length of levers 219a-b can be adjusted. Consequently, even where a transmission according to the present invention engages a clutch to stop or prevent the rotational and/or orbital motion of drive gears 220a-b, when the clutch disengages, the drive gears 220a-b and driven gears 232a-c are in position to continue engagement at the new lever length. As engagement is thus maintained when drive gears 220a-b again start rotating and orbiting, drive gears 220a-b can drive driven gears 232a-c. Moreover, as disclosed herein, as the linear velocity of engagement points 235 on drive gears 220a-b increases or decreases, based at least partially on the length of levers 219a-b, the corresponding linear velocity at engagement points 235 on driven gears 232a-c also increases. As driven gears 232a-c may be of a fixed size, and can, in some embodiments, always rotate around axes aligned with the centers of driven gears 232a-c, the increased linear velocity creates an increased angular velocity of driven gears 232a-c. Thus, gear ratio changes may be made by varying the length and/or diameter of orbital path of drive gears 220a-b and/or by varying the size of virtual gear 234, and without changing engagement between differently sized physical gears.

As noted herein, a drive gear may be located at the end of each actual or effective lever. Such a drive gear may, in some embodiments, act as a moon gear which has any of a number of aspects. For example, drive gears 220a-b may maintain substantially constant engagement with a driven gear, such as driven gears 232a-b, so as to drive the driven gears to obtain a various outputs corresponding to a variety of gear ratios. In addition, and as disclosed herein, drive gears 220a-b may rotate about their respective central axes and further orbit around an external axis such as an axis passing through the center of the intersection between levers 219a-b. For example, as disclosed herein, drive gears 220a-b may thus rotate in a controlled and predetermined manner that ensures that as a drive gear is about to enter into engagement with a driven output gear, the gear teeth of the drive and driven gears are synchronized. Additionally, drive gears 220a-b can translate radially. As disclosed above, the radial motion of the moon gear enables the transmission to move along a range of ratios, in very small, possibly infinitely small, increments, in either a sliding or stepped fashion. Accordingly, drive gears may translate radially to create a variable output and/or rotate to attain synchronized engagement with the corresponding driven gears. Moreover, inasmuch as the drive gears can translate radially and cause the transmission to slide or step between gear ratios in substantially non-discrete or in discrete gear ratios, the transmission can change gear ratios without producing a torque spike, or by producing only an insignificant torque spike, which does not damage the transmission and/or a drive train coupled to the transmission.

Various possible motions of an exemplary drive gear 320a and a driven gear 332 are illustrated in FIG. 4. In particular, FIG. 4 illustrates two drive gears 320a-b which are synchronized with driven gear 332 which may be implemented, for example, as a ring gear. More or fewer drive and/or driven gears may be used, however, as necessary or desired for a particular application. Thus, the two drive gears 320*a-b* and one driven gear 332 are depicted merely for illustrative purposes.

As shown in FIG. 4, at any given lever length, drive gear 320*a* can orbit around an axis passing through point 320', or around any other axis that is offset from the center 320" of drive gear 320*a*. Accordingly, drive gear 320*a* can orbit and move along an orbital path 325, for example. In some embodiments, a shaft and/or carrier (not shown) aligned with point 320' may directly or indirectly cause drive gear 320*a* to orbit in a clockwise direction about an axis passing through point 320'. As drive gear 320*a* orbits, it may also be configured to rotate about its center 320". For example, as disclosed previously, a power transfer system may be implemented which receives a power input and translates a power input into, for example, rotational and orbital motions of various drive gears.

The rotation of drive gears 320*a* can be in a counter-clockwise direction such that the rotation is opposite the orbital direction of drive gear 320*a*. Moreover, this rotation can be implemented to synchronize drive gears 320*a-b* with driven gear 332 such that as drive gears 320*a-b* prepare for engagement with driven gear 332, the teeth of drive gears 320*a-b* are properly aligned with the teeth of driven gear 332. As drive gear 320*a* then enters into engagement with driven gear 332, this engagement and the rotational and orbital motions of drive gear 320*a* then cause driven gear 332 to rotate about its center 332'.

As can further be seen in FIG. 4, drive gears 320*a-b* may further be configured to translate in a radial direction that increases or decreases the length of the orbital path the drive gears follow while engaged with the driven gears in the transmission. While in the illustrated embodiment, drive gear 320*a* is illustrated as being able to translate inward and outward along a vertical path 331, it should be appreciated that such motions are exemplary only. In particular, inasmuch as drive gear 320*a* has an orbital motion, it will be appreciated in light of the disclosure herein that regardless of its orientation or position along the orbital path, drive gear 320*a* can translate radially inward, towards center 320', or radially outward, away from center 320', along a path that is offset at any angular interval from vertical. In addition, the driven gears, such as driven gear 332, may translate radially in a predetermined direction. For instance, in the illustrated embodiment, driven gear 332 translates inward and/or outward, for example, along a translation path 333 that is offset about one hundred twenty degrees from the vertical, and which passes through center 320'. As disclosed herein, when multiple driven gears are used, each driven gear can travel in a predetermined direction along a translation path and, in some embodiments, the predetermined directions can each be offset with respect to each other in substantially equal angular increments.

It should be appreciated in light of the disclosure herein that the net sum of the rotation and orbit of drive gear 320*a* controls the angular velocity at which drive gear 320*a* is rotated. In particular, and as previously disclosed herein, drive gears 320*a-b* can orbit in a first direction, e.g., clockwise, while they rotate about their respective centers in a second, opposite direction, e.g., counterclockwise. In such an arrangement, the net sum of the clockwise, orbital motion and the counter-clockwise, rotational motion of drive gear 320*a* about the point of engagement with driven gear 332 will determine the velocity of driven gear 320*a*. In particular, each of the rotational and orbital motions of drive gear 320*a* will contribute to the linear velocity at an engagement point of drive gear 320*a* to driven gear 332 and, accordingly, also contribute to the linear velocity of driven gear 332 at that engagement point and the corresponding angular velocity of driven gear 332 which produces such a linear velocity. Thus, the net sum of the orbital and rotational motions of drive gear 320*a* will also determine the rotational speed of driven gear 332.

In light of the disclosure herein, it can further be appreciated that for a particular rotational speed at the transmission input, and at a particular lever length and drive gear size, the rotation of drive gear 320*a* about its axis may contribute to the linear velocity at an engagement point in an amount that is about equal and opposite to the contribution of the orbital motion of drive gear 320*a* to the linear velocity at the engagement point. In such an arrangement, the rotation of drive gear 320*a* may thus offset the orbital motion of drive gear 320*a*, thereby providing a negligible, possibly zero, net linear velocity. Thus, the net sum of the rotation and orbit of drive gear 320 can produce zero output.

Inasmuch as the linear velocity of drive gear 320*a* at the engagement points determines the angular velocity at which driven gear 332 rotates—and thus the output of the transmission—a zero net linear velocity at the engagement points will result in the driven gear having no material rotation. In particular, the rotation of drive gears 320*a* and the counter orbit of drive gears 320*a* can neutralize each other. As a result, drive gear 320*a* can be engaged with driven gear 332, and can maintain its orbital and rotational motion, but will not provide any output to driven gear 332, even without the continuous application of clutches or bands to stop the motion of driven gear 332. Consequently, the transmission will be in neutral.

Thus, at least some embodiments of a transmission according to the present invention can provide an engaged neutral in which the rotating and orbiting drive gears are engaged with the driven gears, such that the drive and driven gears are each connected to the power source, while no output is provided. Moreover, in some embodiments, each gear in the system maintains engagement during the engaged neutral while zero output is provided by the transmission. Thus, unlike some automatic transmissions, the drive and driven gears of the present invention maintain engagement during a gear ratio change and while in neutral, without necessitating use of devices which apply an external force to restrict the gears from moving.

To remove the transmission from the engaged neutral state, the gear ratio can be changed. For example, the gear ratio can be decreased by increasing the lever length, thereby also increasing the linear velocity associated with an orbit of the drive gear over the linear velocity associated with a rotation of a given drive gear or gears, and which may be constant, thereby shifting the transmission into a forward gear ratio where it can then change between a large, and possibly infinite, number of forward gear ratios, including, potentially, an overdrive ratio in which the output speed is faster than the input speed. Conversely, if the lever is decreased such that the orbital velocity is less than the rotational velocity, the transmission moves into a reverse gear ratio, and may change between any number of reverse gear ratios.

2. Synchronizing Movement of Drive Gears and Driven Gears

Figure 5:
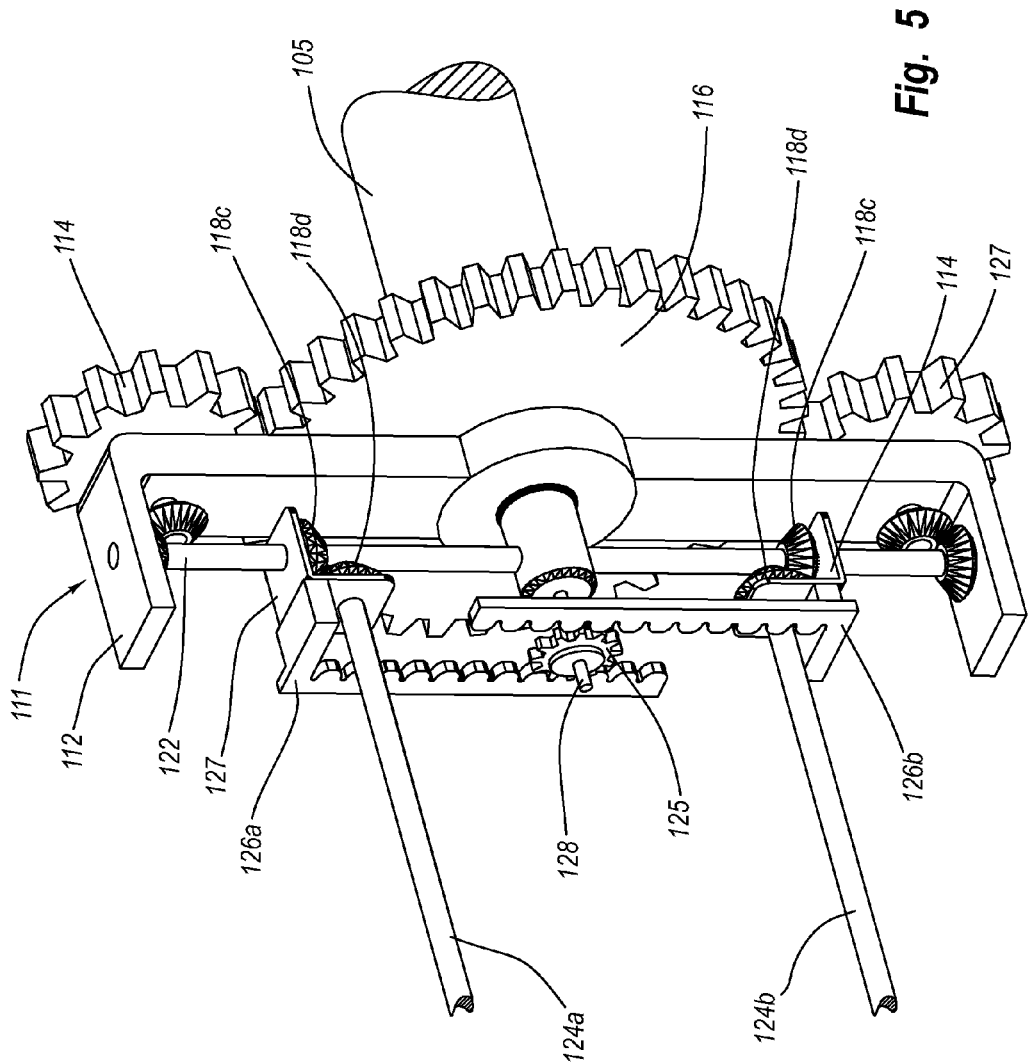
FIG. 5 is a perspective view of a carriage for use with the positive displacement variable speed transmission of FIGS. 1A and 1B, in which the carriage is adapted to radially move drive rods so as to radially move drive gears mounted on the drive rods.

Now referring to FIGS. 5 and 6, a description of exemplary mechanisms for moving input drive gears and output driven gears are disclosed. In particular, FIG. 5 illustrates an exemplary mechanism for moving drive gears 121*a-f* radially while they maintain engagement with one or more driven gears. FIG. 6 illustrates an exemplary embodiment of a mechanism for moving driven gears 132*a-c* in predetermined directions such that they can maintain engagement with the one or more drive gears.

In FIG. 5, a carrier 111 is illustrated which includes a carrier arm 112 connected to a transmission input interface 105 and to two ratio reference gears 114. As disclosed with respect to FIG. 1A, as transmission input interface 105 rotates, carrier arm 112 can also rotate. Moreover, the rotation of carrier arm 112 may further cause ratio reference gears 114 to rotate around a reference gear 116 which, in turn, can cause one or more sets of drive gears to rotate and/or have an orbital motion.

In some embodiments, carrier 111 is configured to facilitate movement of drive gears 121*a-f* (FIGS. 1A-B) in a radial direction. As illustrated in FIG. 5, for example, carrier 111 may include transfer gears 118*d* which are connected to drive rods 124*a-b* which rotate drive gear sets 120*a-b* (FIG. 1A). Transfer gear 118*d* mates with transfer gear 18*c*, which may be movable along a transfer shaft 122. As transfer gears 118*c* and transfer 118*d* collectively move along transfer shaft 122, it can be seen that the distance between drive rods 124*a-b* and the center of transmission input interface 105 can increase or decrease. In embodiments in which the drive gears orbit around an axis aligned with the center of transmission input interface 105, for example, as drive rods 124*a-b* and transfer gears 118*c-d* move outward along transfer shaft 122, and get closer to transfer gears 118*a-b*, the length and diameter of the orbital path traveled by drive rods 124*a-b*, and the corresponding orbital path of the drive gears attached to drive rods 124*a-b*, increases. Additionally, transfer gears 118*c* can, in some example embodiments, move to any position along each half of transfer shaft 122, thereby allowing the length of the orbital path traveled by drive rods 124*a-b* to be varied in very small, and possibly infinitely small, increments. Accordingly, transfer gears 118*c* can move along transfer shaft 122 to effect gear ratio changes in a transmission which slides or steps between gear ratios.

To cause movement of drive rods 124*a-b* and the attached drive gears, and thereby change the lever distance of the drive gears, carrier 111 may include, in some embodiments, a pinion 125 which is engaged with gear racks 126*a-b*. Pinion 125 may be axially fixed with respect to carrier arm 112, while gear racks 126*a-b* may be configured to move with respect to carrier arm 112. For example, as pinion 125 rotates about its center, the teeth on pinion 125 can engage the teeth on gear racks 126*a-b*, thereby causing gear racks 126*a-b* to move, in this embodiment, axially with respect to gear racks 126*a-b* and radially with respect to the center of pinion 125. In particular, as pinion gear 125 rotates in a first direction, each of gear racks 126*a-b* may move radially outward with respect to the center of pinion 125, while rotating pinion 125 in a second, opposite direction may cause gear racks 126*a-b* to each move radially inward with respect to pinion 125.

Gear racks 126*a-b* may also be coupled to transfer gears 118*c-d* such that as gear racks 126*a-b* move, transfer gears 118*c-d* move a corresponding distance and/or in a corresponding direction. For example, in the illustrated embodiment, transfer gears 118*c-d* are each connected to brackets 127, while brackets 127 are each connected to one of gear racks 126*a-b*. In this manner, as gear racks 126*a-b* move, gear racks 126*a-b* cause brackets 127 and transfer gears 118*c-d* to move correspondingly. In some embodiments, drive rods 124*a-b* can be directly connected to brackets 127. For example, drive rods 124*a-b* may be directly connected to brackets 127 such that as pinion gear 125 moves racks 126*a-b* in one direction, rack 126*a* causes drive rod 124*a* to move outward or inward with respect to the center of pinion 125 in a corresponding direction, and rack 126*b* causes drive rod 124*b* to move outward or inward in a direction corresponding to the direction of movement of rack 126*b*, thereby allowing any drive gears on drive rods 124*a-b* to move radially inward or outward with respect to the centers of drive rods 124*a-b* so as to maintain synchronization with output driven gears that are moving radially a corresponding distance. Accordingly, carrier 111, including pinion 125, gear racks 126*a-b*, brackets 127, transfer gears 118*c-d* and transfer shaft 122, is an example of a structural implementation of means for synchronizing movement of the drive and driven gears such that substantially constant engagement is maintained between drive and driven gears over a range of gear ratios.

While, in the illustrated embodiment drive rods 124*a-b* are connected to brackets 127 and racks 126*a-b*, it should be appreciated that in other embodiments, drive rods 124*a-b* may not be directly connected to brackets 127 or racks 126*a-b*. For example, drive rods 124*a-b* may be connected directly to transfer gears 118*d* such that as transfer gears 118*d* move inward or outward, drive rods 124*a-b* move in a corresponding outward or inward direction. Thus, in embodiments in which collinear drive gears are mounted on drive rods 124*a-b*, such as in the manner illustrated in the examples of FIGS. 1A-B, the outward or inward movement of drive rods 124*a-b* thus causes the drive gears to move radially with respect to the axis about which drive gears orbit, such that the orbital path of the drive gears is correspondingly increased or decreased.

As noted previously, pinion 125 can cause gear racks 126*a-b* to move as pinion 125 rotates. Rotation can be supplied to pinion 125 in any of a variety of manners. For example, in the illustrated embodiment, a shaft 128 is connected to pinion 125 so as to rotate pinion 125. In some embodiments, shaft 128 extends through transmission input interface 105 although and other any suitable manner of controlling the rotation of pinion 125 or causing the radial movement of drive gears 121*a-f* (FIGS. 1A-B) may be employed.

FIG. 6 illustrates an exemplary mechanism for moving a driven gear in accordance with some embodiments of the present invention. In the illustrated embodiment, a mechanism for moving a driven gear 132*a*, such as a ring gear, for example, in a predetermined direction is illustrated. The illustration of a single driven gear 132*a* is presented for clarity as it will be appreciated that similar devices and mechanisms can be employed for causing the movement of other driven gears in other predetermined directions as may be desired.

As shown in FIG. 6, a driven gear 132*a* within a transmission may engage a linkage system 136 that includes an output moon gear 138 connected to an output sun gear 140. To enable rotation of driven gear 132*a*, driven gear 132*a* can include an internal gear profile which is selectively engaged by one or more drive gears. In addition, and as disclosed herein, driven gear 132*a* may include a gear profile on its outer surface which is configured to mate with the gear profile of output moon gear 138. Output moon gear 138 may further be connected to an output sun gear 140 which is connected to a linkage shaft 142 for linking the rotation of driven gear 132*a* with other driven gears and/or with a transmission output interface.

In some embodiments, output sun gear 140 can be fixed at its center, such that while it rotates, it does not translate in a radial direction. In addition, in some embodiments, output moon gear 138 can configured to at least partially orbit around output sun gear 140. In the illustrated embodiment, for example, a linkage 147 is connected to each of output moon gear 138 and output sun gear 140, such that if output moon gear 138 is rotated around output sun gear 140, it maintains a fixed distance from output sun gear 140, thereby maintaining substantially constant engagement between output moon gear 138 and output sun gear 140.

As will be appreciated in light of the teachings herein, if output moon gear 138 is rotated around output sun gear 140, driven gear 132a can also move to maintain its engagement with output moon gear 138. In some embodiments, as linkage 147 is rotated, thereby causing output moon gear 138 to roll around output sun gear 140, the teeth of output moon gear 138 engage the teeth of driven gear 132a and thereby push or pull against driven gear 132a to thereby move driven gear 132a. In other embodiments, driven gear 132a may be at least partially enclosed within a casing which is connected to linkage 147. In this example, as linkage 147 is rotated, it causes the casing around driven gear 132a to push or pull the casing and driven gear 132a along gear track 143. In yet another alternative, one or more grooves may be formed around the circumference of driven gear 132a and linkage 147 is connected to the groove such that as linkage 147 rotates, linkage 147 engages the groove and thereby pushes or pulls driven gear 132a in a predetermined path to maintain engagement with a drive gear. As will be appreciated in view of the disclosure herein, such engagement may be maintained during changes in gear ratio or only at discrete gear ratios.

In some embodiments, driven gear 132a is further enclosed within a gear track 143 which defines a line of motion, in a predetermined direction, along which driven gear 132a can move. Thus, as linkage 147 causes driven gear 132a to move, gear track 143 defines that translation path. In some embodiments, such as the example disclosed in FIG. 6, gear track 143 defines a substantially linear translation path along which driven gear 132a moves. In other embodiments, however, gear track 143 may define a curved or other type of path along which driven gear 132a moves. As will be appreciated in light of the disclosure herein, gear track 143, in some embodiments restrains the movement of driven gear 132a such that while driven gear 132a moves radially, driven gear 132a does not substantially move axially. Thus, driven gears 132a-c can move along a gear track such as gear track 143 without substantially moving axially along drive rods 124a, b (FIGS. 1A-B). Moreover, it will be appreciated in light of the disclosure herein that in embodiments in which driven gears 132a-c move radially but not axially, drive gears 121a-f may also be configured to move radially but not axially so as to maintain substantially constant engagement with driven gears 132a-c.

As further disclosed herein, the transmission may include a support 148 defining a curved path 149. In some example embodiments, curved path 149 is a half-circle or other portion of a circular path having a radius about equal to the combined radii of output moon gear 138 and output sun gear 140, although other curved or non-curved paths are contemplated. Where output moon gear 138 orbits around output sun gear 140, curved path 149 may generally correspond to the partial orbital path followed by output moon gear 138. In some embodiments, a shaft (not shown) extends through curved path 149 in support 148, and through the center of output moon gear 138 where the shaft connects with linkage 147. In this manner, the shaft can be moved along curved path 149 to thereby move linkage 147 and cause driven gear 132a to move along the path defined by gear track 143. Linkage 147 may, however, also be moved in other manners. For example, in some embodiments, a corresponding linkage 147 is formed on the opposing side of output moon gear 138 and connected to a rotating shaft that is aligned coaxially with the center of output sun gear 140. As the rotating shaft rotates, it can thereby cause linkage 147 to rotate and cause output moon gear 138 to orbit along a path such as curved path 149.

As disclosed herein, the movement of input drive gears and output driven gears in a transmission according to at least some example embodiments of the present invention can be synchronized so as to maintain substantially constant engagement between input drive gears, which can move in any radial direction, and output driven gears which also move radially along one or more predetermined paths. Any number of synchronization systems can be used. For example, in one embodiment, shaft 128 (FIG. 5) which rotates pinion gear 125 (FIG. 5), and a shaft rotating linkage 147 may be separately controlled. For example, a transmission according to the present invention may employ, in one example embodiment, an electromechanical control device, such as a servo motor, to control each rotating shaft individually. In embodiments in which a transmission includes multiple driven gears which translate radially, it can be appreciated in light of the teachings herein that each driven gear may have a separate linkage and/or gear track for controlling the radial movement of the various driven gears. In such cases, each driven gear may also be controlled separately or as an integral unit.

In yet another example embodiment, pinion 125 and linkage 147 can be mechanically synchronized. For example, as disclosed herein, each of pinion 125 and linkage 147 may be partially rotated in both a clockwise and counterclockwise direction so as to cause corresponding radial movements of drive gears and driven gears, respectively. As a rotating shaft may control each of pinion and linkage 147, appropriate gearing may be used to relate the rotation of pinion gear 125 with the rotation of linkage 142, thereby obtaining a synchronized radial movement of the drive gears and the driven gears.

3. Example Transmission Control Systems

As should also be appreciated in light of the disclosure herein, the operation of the transmission, such as by the radial movement of driven gears 132a-c and moon drive gears 121a-f for example, can be performed manually, by using an automatic control system, or a combination of manual and automatic control systems to preserve engagement only at desired gear ratios, and/or optionally to preserve engagement between drive and driven gears through a gear ratio change. For example, a shift lever or other mechanism can be mechanically connected to both pinion 125 and linkages 147, such as in the manner described above, so as to allow an operator to manually adjust the gear ratio. In other embodiments, however, an automatic control system, which may be electronic, is used to control a mechanism connected to pinion 125 and linkages 147, or which controls pinion 125 and linkages 147 separately.

An automatic control system may be programmed to help implement the efficient use of the power supply and power input into transmission 100 or 100'. For example, an automatic control system can include an artificial intelligence system which substantially maintains a desired torque or range of torques during a gear ratio change and which runs a connected engine at a desired, possibly optimum, efficiency. For example, as a vehicle begins to move uphill and a lower gear ratio is desirable, the artificial intelligence system can identify to the automatic control system the position to which drive gears 121a-f and driven gears 132a-c should be radially moved to improve or maximize torque, angular velocity, or efficiency. In such an embodiment, for example, the automatic control system may then transmit instructions that rotate pinion 125 to change the lever length associated with moon drive gears 121a-f while, at the same time or at about the same time, moving linkages 147 to thereby move driven gears 132a-c along their respective tracks 143 in a manner that causes driven gears 132a-f to be in engagement with moon gears 121a-f at the location providing the desired gear ratio. As noted previously, as a transmission according to the present invention can change between gear ratio changes with very small, and possibly infinitely small, movements between drive and driven gears, any time required to shift from one gear ratio to the next can be negligible, such that it appears that the transmission maintains constant engagement through a gear ratio change.

It should be appreciated in light of the disclosure herein that a variety of automatic control systems may thus be designed and suitable for use with embodiments of the present invention. For example, in FIG. 7, one example embodiment of a suitable electronic control system 180 is schematically illustrated and includes one or more input interfaces 162a-c which receive inputs 165a-c from monitoring devices 172, 182 and 192, which are, for example, sensors, and concerning parameters associated with a transmission 180, a power source 171, and/or a load 190. For instance, one or more transmission monitoring devices 182 can be connected to transmission 180 to determine and send to input interface 162a information such as the current position of the drive and/or driven gears, the torque and/or angular velocity of power input into transmission 180, the torque and/or angular velocity of power output from transmission 180, or any other desired information concerning parameters associated with transmission 180. Similarly, one or more load monitoring devices 192 can be connected to load 190 to determine and send to input interface 162c the load and/or any other information concerning load parameters.

Additionally, a power source monitoring device 172 may be connected to power source 171 to obtain engine RPMs or any other information concerning power source parameters such as, but not limited to, an engine manifold pressure. For example, power source monitoring device 172 may, in one example embodiment, be connected to an engine manifold and/or other portions of the power source to determine the manifold pressure or other such parameters. In general, the manifold pressure measurement is indicative of the load placed on an engine. Accordingly, gear ratio changes can be made to reduce the load on the engine and, thus, change the manifold pressure.

In general, the manufacturer of an engine manifold can specify maximum and/or minimum manifold pressures at which the manifold should be operated. Thus, using inputs 165a-c, which transmit information from monitoring devices 172, 182 and/or 192 to automatic control system 160, automatic control system 160 can determine, based on the supplied information, what changes need to be made to maintain the manifold pressure within the necessary tolerances.

In other embodiments, however, changes are made within transmission 180 to adjust the gear ratio without approaching or exceeding the maximum or minimum manifold pressure. For example, for any particular RPM output by power source 171, the operating engine or other power source may operate at optimum efficiency only at a particular load or within a narrow range of loads. Accordingly, an automatic control system 160 according to the present invention can use inputs 168a-c to determine the current operating parameters of transmission 170, load 190 and/or power source 171, and, in some example embodiments, include an artificial intelligence system 164 and/or processor 166 to determine what changes can be made to the parameters of transmission 180, power source 171, and/or load 190 to maintain power source 171 operating at a desired efficiency. For example, when automatic control system 160 is provided with the current engine RPMs and manifold pressure by input 165b, if the manifold pressure is not within a range of efficient pressures determined by the artificial intelligence system, automatic control system 160 can send electronic signals through one or more outputs 168a-c to cause changes which will adjust the manifold pressure, RPMs, torque or other parameters.

For example, through interfaces 162a-c, automatic control system 160 can send control output signals along control lines 168a-c that carry control output signals to power source 171, transmission 180, and/or load 190 which are then interpreted by control interfaces 174, 184, and 194 and used to change operating parameters within one or more of power source 171, transmission 180, and/or load 190 to effect a desired change. For example, in one example embodiment, automatic control system 160 may transmit an output 168a to transmission control interface 184 instructing transmission control interface 184 to change the radial position of drive and/or driven gears within transmission 180. Transmission control interface 184 may thus include electrical, mechanical, or electromechanical control devices, or a combination of electrical, mechanical and/or electromechanical control devices, which then cause the desired change. For example, in one embodiment, transmission control interface 184 includes servo motors which rotate one or more shafts which in turn adjust the radial position of one or more drive gears and/or one or more driven gears in transmission 180. Adjusting the radial positions in this manner may, for example, change the manifold pressure within power source 171 to be within a desired, possibly optimum, range.

While manifold pressure is indicative of the load placed on the power source, in some embodiments, an input such as input 165 may be connected directly to a load measurement device 192 and to automatic control system 160, such that automatic control system 160 can receive information about the load directly, rather than inferentially through the manifold pressure. For example, in an elevator system, an electric motor may move the elevator such that an input into the automatic control system may comprise the load, in pounds for example, of the elevator carriage and passengers. In such an embodiment, the automatic control system may also determine at what speed the transmission output should be in order to have optimum output efficiency for a given input power. In this example, the automatic control system may, for example through artificial intelligence system 164, include or have access to memory or another storage medium which contains a table, algorithm, or other information which allows automatic control system 160 to identify the gear ratio or positioning of drive and driven gears which achieves an efficient use of the engine. A processor 166 within the automatic control system may, accordingly, access artificial intelligence system 164, and may, accordingly, retrieve and process the information in the memory or storage within automatic control system 160, to thereby retrieve the desired positioning or the changes necessary to the positioning of the drive gears and driven gears. An electronic control signal can then be sent, as output 168a, for example, to be received in transmission control interface 184 which then effects such a change within transmission 180 to obtain a different gear ratio and/or output speed.

While the disclosure herein concerns an automatic control system and refers in part to maximizing efficiency of the power source, it should be appreciated that the automatic control system may operate in other manners. For example, in some embodiments, the automatic control system is programmed to maximize or minimize power and/or torque output. In still other embodiments, the automatic control system is further programmed to control the power source to obtain various output speeds. In yet other embodiments, the automatic control system is selectably changeable between various modes of operation. For example, an operator may choose whether to maximize efficiency or power while the control system is programmed to operate in either manner.

In addition, while the example embodiment disclosed in FIG. 7 illustrates a centralized automatic control system 160 which monitors and/or controls one or more of power source 171, transmission 180, and load 190, it should be appreciated that this is exemplary only and not limiting of the present invention. For example, in some embodiments monitoring devices 172, 182, 192 and/or control interfaces 174, 184, 194 contain circuitry or programming which allows them to act independent of a centralized control system. In one example embodiment, for instance, a feedback loop 191 connects power source 171, transmission 180, and/or load 190 to thereby allow monitoring devices 172, 182, 192 or control interfaces 174, 184, 194 to obtain information from, and/or control, the other elements of the system. For example, transmission control interface 184 may, in one example embodiment, receive through feedback loop 191 an indication of the manifold pressure in power source 171 from monitoring device 172 or of the load from load monitoring device 192. Using dedicated or programmed logic, transmission control interface 184 may then generate control signals or otherwise control transmission 180 so as to modify the gear ratio of transmission 180 in order to, for example, maximize the efficiency, power, torque, or other parameters of power source 171.

By using control signals or otherwise controlling the motion and parameters of transmission 180, the drive and driven gears can be synchronized. For example, as the motion of the drive and driven gears is synchronized to allow engagement between the drive and driven gears along at a large, possibly infinite, number of different orbital paths of the drive gears, the teeth of the drive gears should also be synchronized with the teeth of the driven gears to maintain engagement for efficiently driving the drive gears, and to ensure that when engagement is to occur, a tooth of the drive gear properly mates in or near the root of a driven gear tooth. Now referring to FIG. 8, a description of one exemplary manner in which the gear teeth of drive gears can be synchronized with the gear teeth of driven output gears is described.

Figure 8:
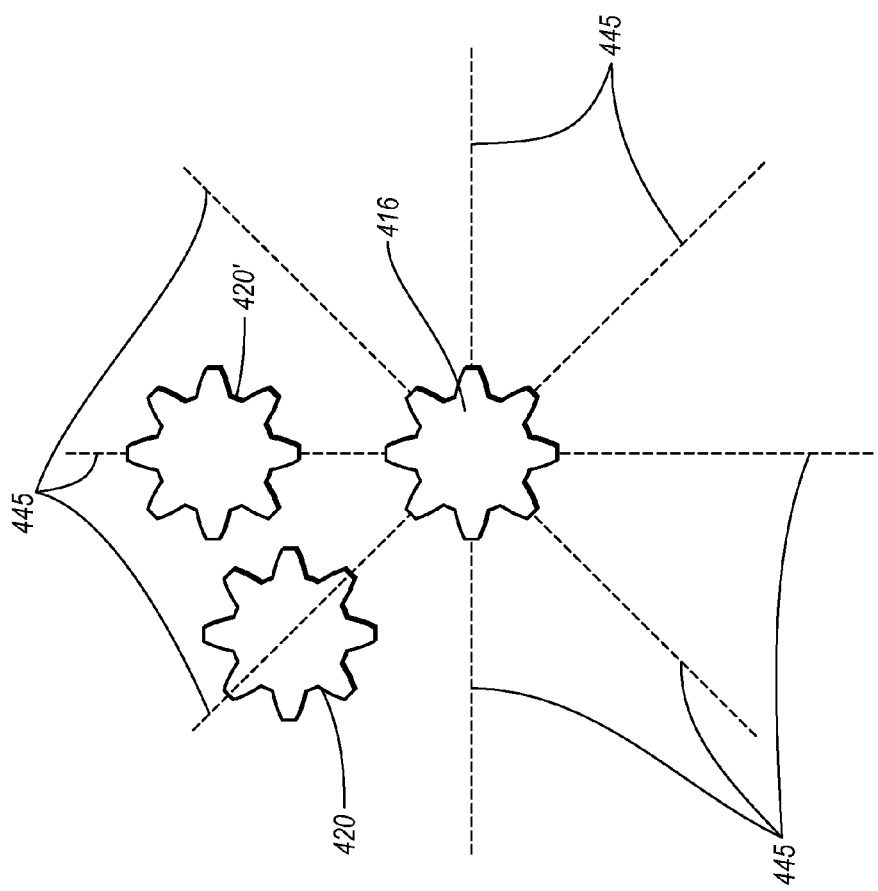
FIG. 8 discloses a reference gear and a drive gear which can be used to synchronize the motions of drive gears such that the drive gears can properly align with driven gears for engagement at a large number of gear ratios and at various lever lengths which can change in very small, and possibly infinitely small, increments.

As disclosed in FIG. 8, for example, a transmission may include a reference gear 416. Reference gear 416 may, but need not necessarily, correspond to reference gear 116 illustrated in FIG. 1A. In some embodiments, reference gear 416 is fixed such that it does not translate or rotate, and thus provides a stationary reference point for synchronizing drive and driven gears. In other embodiments, however, reference gear 416 may be movable to synchronize drive and driven gears.

Reference gear 416 may be used to synchronize the engagement of teeth of moon drive gears with the teeth of driven ring or spur gears. As illustrated, for example, imaginary reference degree lines 445 can extend an infinite length from each tooth of reference gear 416. Degree lines 445 are, accordingly, spaced at substantially equal angular intervals and represent the number of degrees by which the teeth of reference gear 416 are separated. Accordingly, even if the arc distance between degree lines 445 are increased, such as when the lever increases and drive gears 420 moves radially outward, the degrees of radial separation remain constant.

A corresponding drive gear 420 is coupled, in this embodiment, in a one-to-one ratio with reference gear 416. As a result, the rotation and orbit of drive gear 420 are controlled such that when drive gear 420 orbits around reference gear 416, the gear teeth of drive gear 420 are always in alignment with the gear teeth of reference gear 416. For example, as shown in FIG. 8, when drive gear 420 is centered on a reference degree line 445, a tooth of drive gear 420 is directly aligned with the reference degree line 445. Moreover, as drive gear 420 rotates and orbits to the position of drive gear 420', it can be seen that the orbit and rotation have been controlled such that the tooth of drive gear 420' is also aligned with a degree line 445.

Further, controlling the rotation of drive gear 420 in this manner can result in alignment of drive gear 420 with reference gear 416, regardless of radial position of drive gear 420. In particular, drive gear 420 may translate in-and-out in a radial direction. However, no matter what the radial distance between reference gear 416 and drive gear 420, a gear tooth of drive gear 420 remains in alignment with a corresponding tooth of reference gear 416 along degree line 445. Consequently, reference gear 416 is used to provide synchronization of gear teeth according to degrees of rotation rather than by arc distance and is, accordingly, an example structural implementation of means for synchronizing the drive and driven gears such that substantially constant engagement is maintained between one or more drive and driven gears over a range of gear ratios. Additional examples of means for synchronizing the drive and driven gears are elsewhere disclosed herein, such as, for example, with respect to FIGS. 1A-B, 6 and 11A-B.

Although FIG. 8 discloses drive gear 420 and reference gear 416 each having the same number of teeth, such that the teeth are in a one-to-one relationship, it should be appreciated that this arrangement is not necessary, and that other relationships may be used. For example, in some other embodiments, a reference gear has a different number of gear teeth as compared to the drive gear. In such embodiments, the reference gear and drive gears may, for example, have numbers of teeth that are related by a common divisor. For instance, the common divisor may be the number of driven gears or driven gear positions within the system. In one exemplary embodiment, a reference gear, such as reference gear 116 (FIG. 1A), for example, has ninety teeth and a drive gear has six gear teeth. In such a case, it can be seen that the number of teeth of each gear is divisible by three and six. In embodiments in which the number of driven gears is the divisor for the gear teeth, such an embodiment may, accordingly, have three or six driven gears.

In some embodiments, such as that disclosed in FIGS. 1A-B, for example, the numbers of teeth on a ratio reference gear 114 and/or on a driven gear can also be related by the same or a different common factor. For instance, ratio reference gears 114 may have thirty teeth and driven gears 132a-c may have thirty-six teeth on the internal gear profile, such that the numbers of teeth on ratio reference gears 114 and driven gears 132a-c are also divisible by three and six. It should be appreciated that the arrangements and numbers of teeth disclosed herein are exemplary only and that other numbers of teeth and/or common divisors may be used. For example, in some embodiments, reference gear 116, ratio reference gear 114, drive gears 121a-f, and driven gears 132a-c may have different numbers of teeth that are divisible by three, six, or some other common divisor. For example, in one embodiment, a reference gear and ratio reference gear can each have ninety-six teeth, while each drive gear has eighteen teeth, and each driven gear has seventy-two teeth. Thus, it can be seen that the number of teeth on the reference gear, ratio reference gears, drive gears, and driven gears is each divisible by three and six. Moreover, in example embodiments in which there are three or six driven gears, the number of teeth on the reference gear, ratio reference gears, drive gears, and driven gears is each also divisible by the number of driven gears.

In still other embodiments, the numbers of teeth of the various gears are divisible by other divisors such as, for example, two, four, five, seven, eight, and so on which may or may not be the same as the number of driven gears or driven gear positions. In still other embodiments, the number of teeth may be divisible only by a common divisor of one, and the teeth can be maintained in synchronization by constant engagement between the drive and driven gears. For example, in one example embodiment, a reference gear can have sixty teeth, a reference gear fifteen teeth, a drive gear twenty teeth, and a driven gear sixteen teeth. Accordingly, it can be seen that the only divisor common to each gear is one.

In addition, as further illustrated in FIGS. 1A-B, drive gears 121a-f may be connected to reference gear 116 by elements that includes ratio reference gears 114 which can have thirty teeth, or some other number of teeth that are also divisible by the same or a different divisor. As noted previously, ratio reference gears 114 can engage and rotate around reference gear 116, and thereby impart to drive gears 121a-f a rotational and/or orbital motion. In particular, due to their connection with reference gear 116, by way of ratio reference gears 114, drive gears 121a-f each rotate around their respective central axes and orbit as a group around an external axis which is, in the illustrated embodiment, aligned with the center of reference gear 116. In this manner, the combination of ratio reference gears 114 and reference gear 116 causes drive gears 121a-f to rotate a predictable angular amount, regardless of the radial position and lever length associated with drive gears 121a-f, such that a gear tooth of a drive gear 121a-f can always be aligned with a gear tooth of a driven gear 132a-c when they enter into engagement. Accordingly, ratio reference gears 114 and reference gear 116 are, collectively and individually, examples of structural implementations of means for synchronizing one or more drive and driven gears such that substantially constant engagement is maintained between one or more drive and one or more driven gears over a range of gear ratios. Moreover, inasmuch as carrier 111 (FIG. 5) can be configured to move drive rods 124a-b radially, thereby causing drive gears 121a-f to move radially inward or outward and maintain engagement with output gears 132a-c, which also move radially inward and outward, thereby changing the ratio between transmission input interface 105 and transmission output interface 170, carrier 111 is also an example of a structural implementation of means for synchronizing drive and driven gears such that substantially constant engagement is maintained between one or more drive and driven gears during gear ratio changes and over a range of gear ratios.

To maintain constant synchronization between the teeth of drive and driven gears, the drive gears and driven output gears may have involute gear teeth of substantially the same diametrical pitch. As a result of this configuration, the teeth of the drive gears properly mate with the teeth of the driven gears when in dead center engagement as well as in any other phase of engagement, and provide a constant output to the drive gears regardless of the phase of engagement. As well, the teeth of the drive and driven gears also wear less rapidly than gear teeth which do not align in all phases of engagement. Moreover, as disclosed previously, the drive gears and the reference gear can have an equal number of teeth, or any other compatible number of teeth such that when a drive gear is aligned on a degree reference line of the reference gear, a tooth of the drive gear is also centered on the line of the reference gear at top dead center. In some embodiments, for example, the numbers of teeth on the reference gear, ratio reference gears, drive gear and/or driven gears may be divisible by a number that is greater or less than the number of driven gears. In other embodiments, the divisor may be equal to the number of driven gears, although this feature is not limiting of the present invention.

The use of the number of drive gears as the common divisor may be useful for a variety of reasons. For example, this approach can be used to ensure that the center of each drive gear falls upon a reference line. Moreover, as noted previously, the number of teeth of the drive gear may be divisible by the same divisor. This approach can also be useful in that when a tooth of one drive gear engages a driven gear at top dead center, all of the driven gears will have grooves that are lined up, at top dead center, with the radial degree lines of the reference gear. In some embodiments, the combination of these ratios and features link the rotation of the drive gear teeth with the rotation and position of the teeth and grooves on the driven gear such that regardless of the lever length and radial position of the drive and driven gears, the gear teeth of the drive and driven gears will be synchronized as the drive and driven gears come into and out of engagement. Accordingly, the drive gears may translate radially outward to create a variable output in small increments and/or rotate to synchronize engagement with the driven gears.

As noted above, if the teeth of all of the drive gears become disengaged from all of the teeth of the driven gears, such that there is no engagement between input drive gears and output driven gears, or if the driven gears are otherwise not connected to the transmission input interface, the load driven by the transmission is effectively disconnected from the power source and the load coasts until the transmission re-engages the drive and driven gears and/or the driven gears with the transmission input interface. In environments and applications in which it is desirable to maintain a constant connection to the power source, and thereby preserve a constant flow of power from the engine to the load, it is desirable therefore to ensure that there is constant engagement, or at least substantially constant engagement which provides essentially the same desirable results as constant engagement, between the teeth of the drive gears and driven gears that determine the gear ratio of the transmission. As described previously, this can be accomplished by, for example, moving the drive gears in an orbital path around an external axis that is centered on a reference gear. As engagement is maintained, the driven gears collectively rotate about their respective centers and provide power output. In addition, when the driven output gears are offset from the orbital axis of the drive gears, the drive gears can alternately engage the output gears such that a disengaged drive gear will always be preparing to line up for synchronous engagement as it approaches and intersects a line of the reference gear. Additionally, substantially constant engagement which provides the desirable results of constant engagement can also be maintained by providing many gear ratios such that very short translational movements, which can each be performed in very little time, can change gear ratios.

While the example disclosed embodiments generally relate to embodiments of a transmission in which two sets of drive gears engage, and drive, three driven gears, it should be appreciated that this arrangement is illustrative only and not limiting of the present invention, and that a variety of other arrangements having different numbers of drive gears, drive gear sets, and driven gears can be used. Moreover, it is not necessary that the drive gears be moon or spur gears or that the driven gears be ring gears. In fact, because the transmission components operate synchronously, whether in a reverse, forward or neutral mode, the power can also flow through the transmission in reverse. For example, the torque flow path can be reversed through the transmission to create a different torque flow path that is desirable for some applications. For example, the reverse torque flow path of some embodiments may allow the transmission to operate at higher speeds with less torque.

Figure 9:
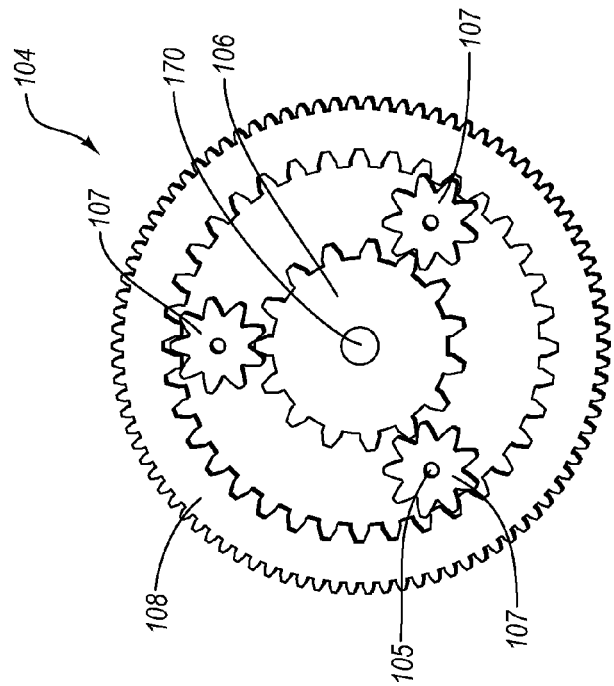
FIG. 9 discloses an exemplary planetary gear set that may be used to obtain an engaged neutral if the torque flow path is reversed through the transmissions of FIGS. 1A and 1B.

Moreover, a reversed torque flow path may allow the ring gears to operate as drive gears and the moon or spur gears to act as driven gears. In such an embodiment, it will also be appreciated that the driven gears thus can have orbital and rotational movements while the drive gears then translate radially in-and-out along predetermined paths which are offset from each other at angular intervals. In an example embodiment in which the power flow is reversed, however, the reverse power flow may eliminate the engaged neutral feature of the transmission and/or the easy transition between forward, neutral and reverse. In this example embodiment, the engaged neutral and transition between forward, reverse and optionally neutral can be implemented by using an output planetary gear set such as planetary gear set 104 of FIG. 9. Although planetary gear set 104 illustrates a ring gear 108 driven by a single sun gear 106 rotating against three planet gears 107, this is but one example of a planetary gear set that may be used in connection with some embodiments of the present invention. For example, in other embodiments, more or fewer planet gears 107 can rotate around sun gear 106 and engage ring gear 108.

In an example embodiment in which a transmission, such as, for example, transmission 100 of FIG. 1A or transmission 100' of FIG. 1B, is in a configuration which reverses the torque flow path, transmission input interface 105 acts as the transmission output interface while transmission output interface 170 acts as the transmission input interface. In such a case, and as disclosed in FIG. 9, transmission input interface 170 can be extended through transmission 100 and connected to input sun gear 106 of planetary gear set 104, while transmission output interface 105 can be connected to planet gears 107 which rotate against sun gear 106. The transmission output interface 105 may be connected to each of planet gears 107 by using a planet carrier (not shown) which can cause each of planet gears 107 to have an identical rotation.

Each of planet gears 107 also engages ring gear 108. Further, sun gear 106 and planet gears 107 can also be in constant engagement with each other, and thus place the input RPMs from new transmission input interface 170 in conflict with the output RPMs of new transmission output interface 105. Thus, when transmission 100 is run with a reversed torque flow and sun gear 106 and planet gears 107 are of equal sizes, it can be seen that when the input RPMs of sun gear 106 are of an equal magnitude as the output RPMs of planet gears 107, sun gear 106 and planet gears 107 have a negligible, and possibly zero, net output that is provided to ring gear 108, thereby placing the transmission in a neutral state while maintaining engagement between sun gear 106 and planet gears 107 of planetary gear set 104, and between drive gears 121*a-f* and driven gears 132*a-c*. To then shift the transmission out of a neutral output state, the drive and/or driven gear positions may be adjusted to vary the input and output RPMs. In this manner, the angular velocity of transmission output interface 105 and planet gears 106 can change, to shift the transmission into either a forward or reverse gear.

For example, if transmission input interface 170 is maintained at a constant angular velocity, by increasing the angular velocity of planet gears 107, the angular velocity of planet gears 107 becomes greater than the angular velocity of sun gear 106, thereby causing ring gear 108 to rotate in a first direction, clockwise for example, such that transmission shifts into a forward gear. Conversely, if the angular velocity of planet gears 106 is decreased, the angular velocity of planet gears 107 becomes less than the angular velocity of sun gear 106, such that ring gear 108 then rotates in a second direction, counterclockwise for example, such that the transmission shifts into a reverse gear. Thus, by merely adjusting the rotational speed of planet gears 107 and/or sun gears 106, planetary gear set 106 can provide a neutral, forward, or reverse state without the application of an external force, e.g. with clutch plates or bands, for example, to constrain the rotation of one or more of ring gear 108, planet gears 107, or sun gear 106.

While the illustrated example embodiment discloses that transmission input interface 170 is coupled to sun gear 106 and transmission output interface 105 is coupled to planet gears 107, it will be appreciated that in other embodiments, the relationship may be changed such that the input interface is coupled to sun gear 106 and the output interface is coupled to the planet gears 107. Further, while example embodiments may include a sun gear 106 and planet gears 107 which are of the same size, in other embodiments, sun gear 106 and planet gears 107 may have different respective sizes. For example, sun gear 106 may be larger than the one or more planet gears 107, although in other example embodiments, sun gear 106 may be smaller than planet gears 107. It will also be appreciated that even where the sun gear 106 and planet gears 107 differ in size, planet gears set 104 can produce a neutral output state as disclosed herein, inasmuch as the angular velocities of sun gear 106 and planet gears 107 have associated linear velocities at the point of engagement between sun gear 106 and planet gears 107 which may be of equal but opposite magnitudes.

While the example disclosed embodiments depict drive and driven gears as spur and ring gears, respectively, it should be appreciated that in other embodiments, the drive and/or the driven gears are not necessarily spur or ring gears. For example, in one embodiment, the driven gears are spur gears rather than ring gears. In such an embodiment, the driven spur gears may be radially moveable to maintain engagement with radially movable drive spur gears, and are optionally movable along predetermined axes that are offset at substantially equal angular intervals around a common central axis. For example, three driven spur gears may each be offset at, and translate radially along translation paths that are offset with respect to the translation paths of other driven spur gears at about one hundred twenty degree angular intervals. Moreover, in such an example embodiment in which the drive and driven gears are each spur or helical gears, the drive gears may orbit around the external perimeter of the driven gears such that the perimeter of the driven gears defines a virtual gear which is maintained in substantially constant engagement with the drive gears. In other example embodiments, the drive gears orbit inside the periphery formed by the driven gears, such that the internal perimeter of the driven gears defines a virtual gear which is maintained in substantially constant engagement with the drive gears.

Figure 10A:
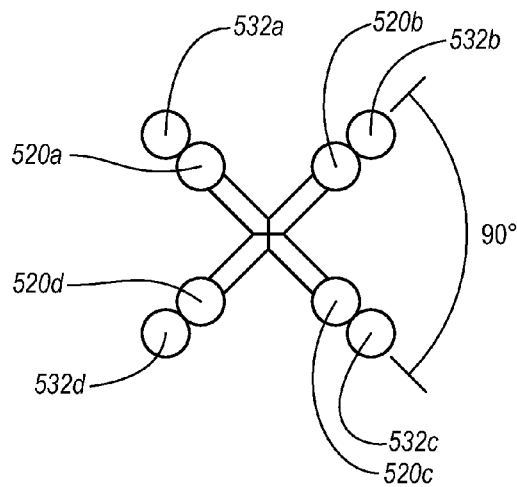
FIGS. 10A-B disclose various drive and driven gears in alternative embodiments of exemplary transmission systems where the radially expandable drive gears orbit and alternately engage driven gears which are from each other offset at equal angular intervals around a circle.

A schematic illustration of an example embodiment in which drive gears engage multiple driven gears, which may comprise spur or helical gears, for example, is provided in FIG. 10A. In the illustrated embodiment, four driven gears 532*a-d* are offset at equal ninety degree angular intervals. In addition, the illustrated embodiment discloses four drive gears 520*a-d*, also offset at equal angular intervals, which are in dead center engagement with driven gears 532*a-d*. In this embodiment, therefore, drive gears 520*a-d* engage driven gears 532*a-d* at top dead center every ninety degrees. In some embodiments, and as disclosed herein, drive gears 520*a-d* and driven gears 532*a-d* may be configured to move radially inward and/or outward. For example, drive gears 520*a-d* may move inward or outward along such that the lever lengths associated with drive gears 520a-d can increase or decrease, and such that the orbital path drive gears 520a-d follow as they orbit around the intersection of their levers correspondingly increases or decreases. Similarly, driven gears 532a-d may move inward and/or outward along translation paths which pass through the intersection of the levers and the center of each driven gear 532a-d. Accordingly, in the illustrated embodiment, driven gears 532a-d can translate along translation paths offset from each other at ninety degree intervals. In this manner, driven gears 532a-d may translate radially to maintain engagement with drive gears 520a-d as drive gears 520a-d also translate radially. Notably, in some embodiments, only drive gears 520a-d orbit and translate, while driven gears 532a-d translate but do not orbit about an external central axis.

4. Vernier Relationship

As noted above, where four drive gears 520a-d engage four driven gears 532a-d, dead center engagement occurs every ninety degrees as each drive gear 520a-d enters into engagement with one of the respective driven gears 532a-d. In the embodiment illustrated in FIGS. 2A-G, it can be seen that in an embodiment with three driven gears and two drive gears, top dead center engagement can occur every sixty degrees rather than every ninety degrees. Thus, with about thirty-seven percent fewer gears, the frequency of dead center engagement is increased by one hundred and fifty percent.

Figure 10B:
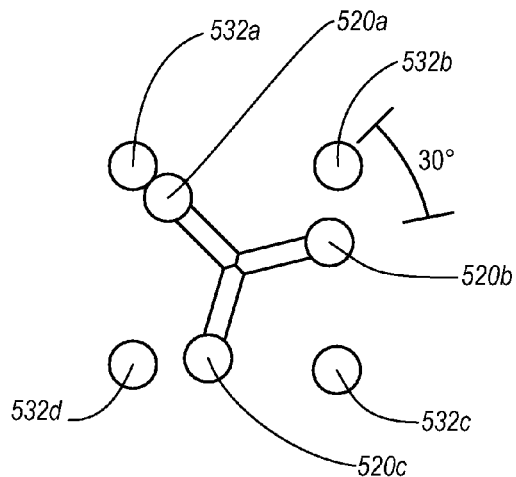

A similar illustration is shown in FIG. 10B, in which three drive gears 520a-c are used to drive four driven gears 532a-d. As shown in the illustrated embodiment, by removing one drive gear from the embodiment illustrated in FIG. 10A, and thus reducing the total number of gears by about twelve percent and the number of drive gears by twenty-five percent, engagement frequency can be increased to every thirty degrees, for an increase of three hundred percent over the embodiment illustrated in FIG. 10A.

The resulting change in engagement frequency caused by changing the numbers of drive and driven gears can also be explained by a variation of the Vernier principle used for measurement devices such as calipers. In the case of calipers, the Vernier principle is a basic measurement principle which takes an equal distance, such as one-tenth of an inch, and divides it into an odd number of increments, e.g., twenty-five, and an even number of increments, e.g., twenty-four. Based on the alignment of the increments, a distance can be measured. For example, the lines of twenty-four increments line-up with the lines of twenty-five increments every thousandth of an inch.

In a similar manner, example embodiments of the present invention can be employed to vary the number of parts needed to maintain a substantially constant engagement of drive and driven gears by offsetting input drive members and the output driven members at different angular intervals and/or by using different numbers of drive and driven members. No single ratio of drive-to-driven members is, however, required and a particular ratio will be a matter of design choice depending on the demands of any particular application. Nevertheless, it can be seen that the number of drive and driven members can affect the engagement frequency between drive and driven members.

For example, Table 1 provides an exemplary indication of the manner in which the numbers of drive and driven members can affect engagement frequency. In particular, Table 1 provides the frequency of dead center engagement for varying numbers of drive and driven members that are each offset at equal intervals. While Table 1 references the frequency of dead center engagement in terms of numbers of drive and driven gears, it will be appreciated in view of the disclosure herein that the frequency of engagement can be determined by the number of different positions of drive and driven gears, and not merely by the total number of gears. For instance, as noted above with reference to FIGS. 1A-B, a transmission, e.g., transmission 100 or 100', includes three driven gears and six drive gears, although the drive gears are positioned on two axes, such that there are only two different angular positions of the drive gears around a circle. As discussed above, dead center engagement occurs in such an example every sixty degrees. As shown in Table 1, this result is consistent with a transmission which has three driven gears and two drive gears or a transmission which has three driven gears and six drive gears.

In another example, as shown in Table 1 and as disclosed herein, three drive gears can engage with four driven gears every thirty degrees. This engagement can be increased, however, by changing the number of drive and driven members. For instance, if five drive gears are used to engage six driven gears, one drive gear will enter into dead center engagement with a driven gear every twelve degrees. During this time, other drive gears will also be in various other stages of engagement and disengagement with other driven gears. In addition, and as shown in Table 1, adding just one more drive member can actually decrease engagement frequency such that it occurs only once every sixty degrees.

As further shown in Table 1, the most frequent engagement between drive and driven gears tends to occur, in general, when there is an odd-and-even ratio between drive and driven gears, or when the ratio can be factored down to an odd-and-even ratio. For example, for the numbers provided in Table 1, eight driven gears are engaged at top dead center most frequently when there are nine drive gears, i.e., every five degrees, and almost as frequently, i.e., every six and a half degrees, when there are seven drive gears. The most frequent engagement for an even number of drive gears with eight driven gears is, however, every fifteen degrees, which happens when there are six drive gears. However, the same frequency can be obtained with only three drive gears, or half the number of drive members.

TABLE 1

| | | Driven Gears | | | | | | | | |
|---|---|---|---|---|---|---|---|---|---|---|
| | | 1 | 2 | 3 | 4 | 5 | 6 | 7 | 8 | 9 |
| Drive Gears | 1 | 360° | 180° | 120° | 90° | 72° | 60° | 51.43° | 45° | 40° |
| | 2 | 180° | 180° | 60° | 90° | 36° | 60° | 25.71° | 45° | 40° |
| | 3 | 120° | 60° | 120° | 30° | 24° | 60° | 17.14° | 15° | 20° |
| | 4 | 90° | 90° | 30° | 90° | 18° | 30° | 12.86° | 45° | 40° |
| | 5 | 72° | 36° | 24° | 18° | 72° | 12° | 10.29° | 9° | 8° |
| | 6 | 60° | 60° | 60° | 30° | 12° | 60° | 8.57° | 15° | 20° |
| | 7 | 51.43° | 25.71° | 17.14° | 12.86° | 10.29° | 8.57° | 51.43° | 6.43° | 5.71° |
| | 8 | 45° | 45° | 15° | 45° | 9° | 15° | 6.43° | 45° | 5° |

TABLE 1-continued

| | Driven Gears | | | | | | | | |
|---|---|---|---|---|---|---|---|---|---|
| | 1 | 2 | 3 | 4 | 5 | 6 | 7 | 8 | 9 |
| 9 | 40° | 20° | 40° | 10° | 8° | 20° | 5.71° | 5° | 40° |

5. Example Sun Gear Embodiments

Figure 11A:
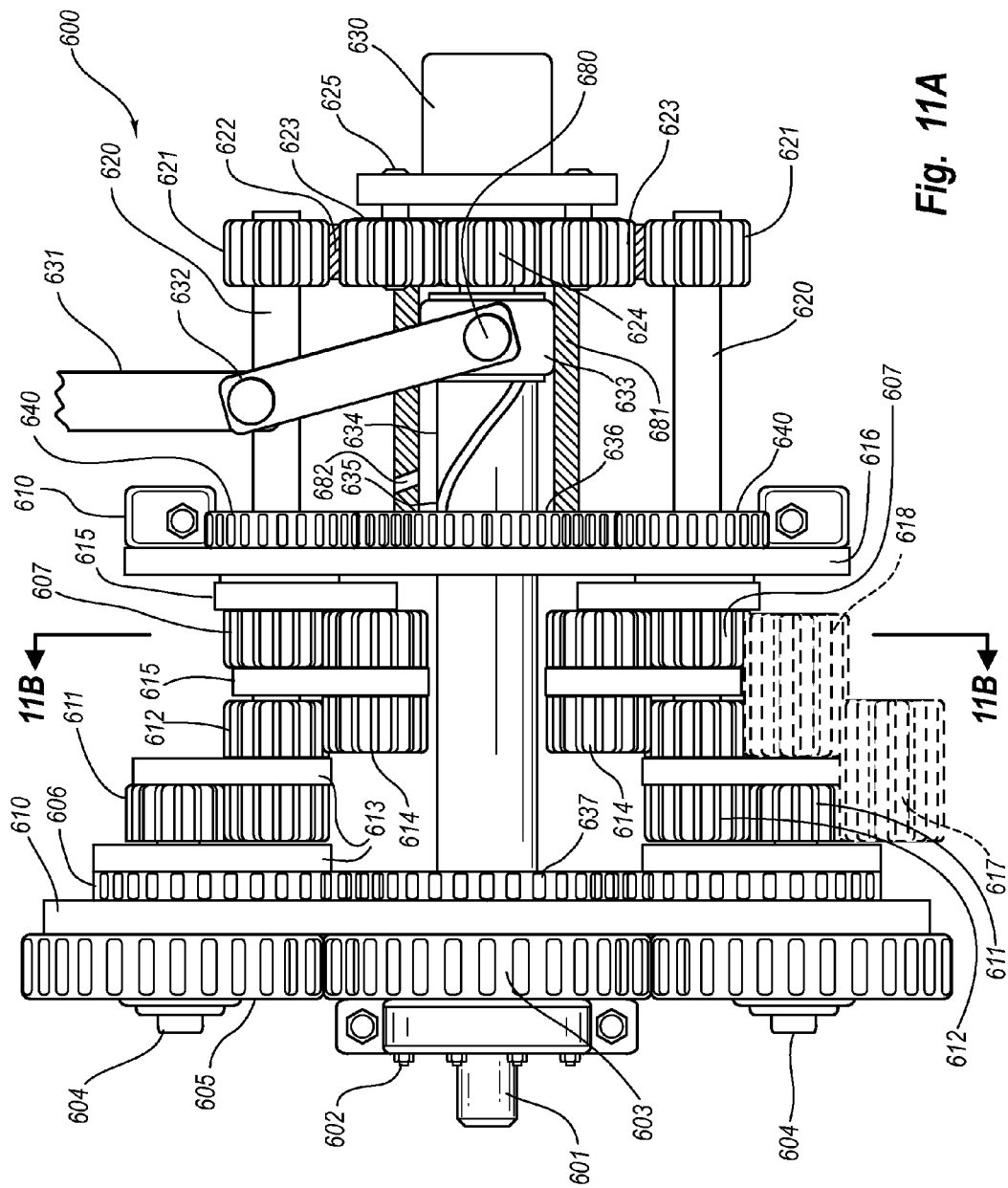
FIG. 11A is a plan view of an alternative embodiment of a positive displacement variable speed transmission in which multiple drive and driven gears are maintained in constant engagement over a range of very small, and possibly infinitely small, gear ratio changes.
Figure 11B:
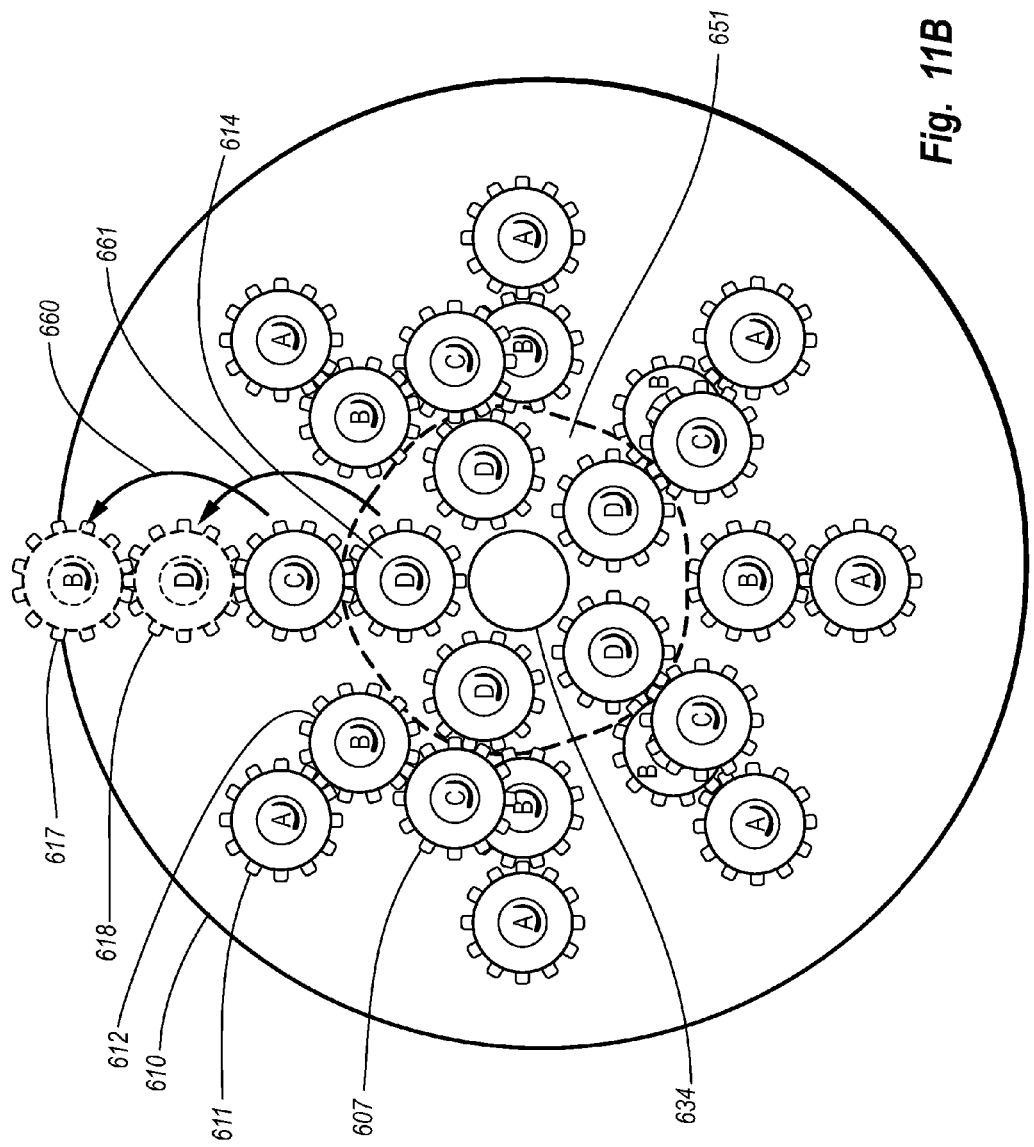
FIG. 11B is a partial cross-sectional view of the transmission of FIG. 11A in which eight orbiting and rotating drive gears are maintained in constant engagement with five driven gears.

Referring now to FIGS. 11A-B, various aspects of another exemplary embodiment of a transmission 600 are disclosed. As with other embodiments disclosed herein, the embodiment disclosed in FIGS. 11A-B can include gears or other members which are arranged to maintain substantially constant engagement between drive and driven gears that determine and cause changes to the gear ratios of transmission 600. Moreover, by maintaining substantially constant engagement between drive and driven gears, transmission 600 can allow a substantially constant connection between the drive and driven gears, between the driven gears and the power source, and between the power source. In some embodiments, the substantially constant connection may be maintained even without an external source suppressing the rotation of the gears, while some embodiments can include a clutch or other mechanism for suppressing the rotation of the drive and/or driven gears. In either example, however, the transmission can employ the general principles of operation and synchronization as disclosed herein.

In the illustrated embodiment, transmission 600 includes an input shaft 601 which is connected to a power source, and thus acts as an interface between the power source and transmission 600. For example, the power source may be an engine or motor. Such engine or motor may be associated with a motor vehicle, an elevator, conveyor system, exercise equipment, a lathe, or virtually any other system or device that operates in connection with some type of engine or motor. Accordingly, it should be appreciated that transmission 600 is not limited to use with a moving vehicle, or any other particular type of power source, but may instead be any type of power source from a wide variety of applications. More specifically, transmission 600 may be used in any application where multiple gear ratios are desired.

In the illustrated embodiment, as input shaft 601 receives power from a power source, it rotates about its own axis. To facilitate such rotation, input shaft 601 can be journaled for rotation by using input bearing 602. Input bearing 602 may, in some embodiments, be fixed in place by, for example, being secured to a transmission housing and/or other structure(s).

Adjacent to input bearing 602, transmission 600 may include a reference ring 603 which can include an opening through which input shaft 601 extends. Reference ring 603 is, in some embodiments, a reference gear as described herein and which is fixed such that it does not rotate as input shaft 601 is rotated. Reference ring 603 may also be secured to the transmission housing (not shown), an input housing 610, or otherwise supported. For instance reference ring 603 may be directly secured to the transmission housing. In other embodiments, reference ring 603 may be indirectly secured to the transmission housing by, for example, being connected to input bearing 602 which is in turn secured to the transmission housing.

Optionally, an input housing 610 may be provided. In some example embodiments, input housing 610 is fixed to input shaft 601 and is adapted to rotate and also cause the drive gears in transmission 600 to rotate. Input housing 610 may be fixed to input shaft 601 by, for example, welding, mechanical fasteners, or some other suitable attachment means. Accordingly, as input shaft 601 rotates, the attached power supply also causes input housing 610 to rotate. In the illustrated embodiment, input housing 610 may further include multiple openings near the outer perimeter which have bearings inserted therein and which receive one or more drive shafts 604 which rotate therein. The openings may be provided in input housing 610 in any suitable manner. For instance, the holes may be drilled or reamed, cast or molded, or formed in any other suitable manner.

As further disclosed by FIG. 11A, timing gears 605 can be affixed to drive shafts 604 and may also mate with reference ring 603. Timing gears 605 may comprise spur or helical gears, for example, which engage reference ring 603, and may include involute gear teeth which mate with involute gear teeth on reference ring 603. Consequently, as input housing 610 is rotated, for example by rotating input shaft 601, input housing 610 can cause timing gears 605 to rotate and orbit around reference ring 603 and thus rotate drive shafts 604. In this regard, at least, timing gears 605 can operate similar to the manner in which ratio reference gears 114 of FIG. 1A operate.

Pivot drive gears 611 (collectively illustrated as "A" gears in the example embodiment of FIG. 1B) may also be fixed to drive shafts 604. Accordingly, when drive shafts 604 rotate, pivot drive gears 611 also rotate. To facilitate rotation of drive shafts 604, input control links 613 may be positioned on each side of pivot drive gears 611 and can include openings and corresponding bearings to allow for support and/or rotation of drive shafts 604. Further, pivot drive gears 611 can mate with drive gears 612 (collectively illustrated as "B" gears in the example embodiment of FIG. 11B) which are rotated as pivot drive gears 611 rotate. Input control links 613 may further include openings and corresponding bearings that receive a moon shaft (not shown) which rotates about an internal axis.

In the illustrated embodiment, input link control gears 606 can be mounted on respective drive shafts 604 and positioned between input housing 610 and a first input control link 613. Input link control gears 606 can thus engage, and rotate around, a first tube gear 637 by, for example, using mating gear teeth, which may be involute in some embodiments. As disclosed herein, tube gear 637 may rotate when a connected control tube 634 rotates, thereby causing input link control gears 606 to rotate. In some example embodiments input control links 613 are coupled to a shaft (not shown) which rotates as input link control gears 606 rotate, such that as a result of input link control gears 606 rotating, input control links 613 rotate, further causing cause drive gears 612 to at least partially orbit around pivot drive gears 611. Accordingly, drive gears 612 may be moved such that they translate around pivot drive gears 611. Thus, drive gears 612 translate inward and/or outward along a curved path around pivot drive gears 611, thereby moving radially with respect to an axis aligned with the center of input housing 610. This inward or outward movement of drive gears 612 around pivot drive gears 611 can also change the orbital path followed by drive gears 612 as timing gears 605 cause drive gears 612 to orbit. Consequently, the lever length between drive gears 612 and the axis about which drive gears 612 orbit, and the length of the orbital path of drive gears 612, also increases or decreases.

As disclosed herein, input control links 613 can be coupled to a shaft (not shown) which rotates input control links 613. In some example embodiments the shaft is offset from the center of input control links 613 such that when input control links 613 rotate about the shaft, the position of drive gears 612 which are connected to input control links 613 changes. In the example arrangement illustrated in FIG. 11A, for example, input control links 613 are arranged in an inward configuration such that drive gears 612 are in an inner position in which the radial position of drive gears 612 is inside the radial position of pivot drive gears 611. More particularly, the distance between the drive gears 612 and the axis about which drive gears 612 orbit, i.e. the lever length, is less than the distance between that same axis and pivot drive gears 611. As drive gears 612 translate around respective pivot drive gears 611, the position of drive gears 612 can change. For instance, drive gears 612 may translate, in one embodiment, radially such that the lever length changes while translating along a curved path around pivot drive gears 611 to an outer position, such that the radial position of drive gears 612 is outside the radial position of pivot drive gears 611. More particularly, in an outer position, the distance between drive gears 612 and the axis about which drive gears 612 orbit, i.e. the lever length, is greater than the distance between that same axis and pivot drive gears 611. For example, in the example arrangement of FIGS. 11A-B, upon causing drive gears 612 to translate around pivot drive gears 611, they can move from an inner position to an outer position. An example outer position of a moon drive gear 612 is shown as moon drive gear 617, illustrated in phantom lines, in FIGS. 11A-B.

Although a single outer position of moon drive gear 617 is illustrated, each moon drive gear 612 in transmission 600 can move to a corresponding outer position, such that moon drive gear 617 is illustrative of an outer position of each of drive gears 612. Moreover, while FIGS. 11A-B illustrate only two positions of drive gears 612, this arrangement is illustrative only. In fact, drive gears 612 can, in some example embodiments, move to any position around pivot drive gears 611, such that the length of the orbital path followed by drive gears 612 as they orbit around an axis aligned with input shaft 601 can be varied between a very large, possibly infinite, number of lengths. As discussed herein, in some embodiments, engagement with driven gears 614 can be maintained throughout changes in the orbital path of drive gears 612. In other embodiments, engagement of drive gears 612 and driven gears 614 occurs only at discrete orbital paths, thereby providing discrete gear ratios within transmission 600. As noted previously, however, embodiments of the present invention allow discrete gear ratios to be maintained with very little corresponding change in the orbital path. For example, each gear ratio may be maintained at a whole tooth increment. Consequently, very little translational movement is required to effect a gear ratio change. As a result, the translation of driven gears 614 around pivot drive gears 611 may provide, for example, ten, twenty, thirty, or even more different discrete gear ratios.

Drive gears 612 can also mate with and engage driven, output moon gears 614 (collectively illustrated as "D" gears in FIG. 1B). As a result, when moon gears 612 rotate, e.g. as a result of the rotation of pivot drive gears 611, output moon gears 614 can, in the illustrated example embodiment, also be rotated. Where input, drive gears 612 and output driven gears 614 have the same radius, rotating drive gears 612 may thus rotate driven gears 614 at the same angular velocity at which input moon gears 612 rotate, although it is not necessary that drive gears 612 and driven gears 614 have the same radii. In either case, when drive gears 612 engage driven, output moon gears 614, output moon gears 614 also rotate about their respective central axes. In some embodiments, engagement between drive gears 612 and driven gears 614 occurs on an alternating basis as drive gears 612 follow an orbital path. For example, driven gears 614 may be adapted such that they do not collectively orbit around an external axis, while drive gears 612 do have an orbit around an external axis. In such an example, as drive gears 612 orbit around the external axis, each of drive gears 612 can enter into and out of engagement with each moon driven gear 614. Consequently, each driven gear 614 is being alternately engaged by the various drive gears 612. Moreover, in some examples, drive gears 612 and driven gears 614 are arranged such that at any stage of the orbital motion of drive gears 612, at least one of drive gears 612 is engaged with at least one of driven gears 614. In this manner, drive gears 612 can maintain substantially constant engagement with driven gears 614.

In this example embodiment, driven gears 614 are also connected to output control links 615. Output link control links 615 can further be connected to output link control gears 640 which rotate around a second tube gear 636 whose rotation is controlled by a control tube 681. Accordingly, as second tube gear 636 rotates, output link control gears 640 may be rotated by tube gear 636. Further, output link control gears 640 can be coupled with output control links 615, such that as output control link gears 640 rotate, output control links 615 are also rotated. Output gears 614 may further be coupled to output control links 615, by a shaft offset from the center of output control links 615, for example. In one example, as output control links 615 rotate, output control links 615 thereby cause driven gears 614 to translate along a curved path around output pivot gears 607 (collectively illustrated as "C" gears in FIG. 1B).

In some embodiments, and as disclosed herein, rotation of control tube 634 causes first tube gear 637 to rotate relative to the rotation of input shaft 601, while rotation of control tube 681 causes second tube gear 636 to rotate. As a result, as control tubes 634, 681 rotate, each of drive gears 612 and driven gears 614 can rotate at least partially around respective pivot gears 607, 611. Thus, drive gears 612 and/or driven gears 614 can move radially inward and outward with respect to an axis about which drive gears 612 orbit, such as an axis aligned with input shaft 601, such that the lever length between drive gears 612 and input shaft 601 increases or decreases. If the rotations of control tubes 634, 681 are synchronized, such that they occur at the same time or at about the same time, the rotation of control links 613, 615 can also thus be synchronized, thereby also synchronizing the radial translation of drive gears 612 and driven gears 614. In particular, output control link gears 640 and input control link gears 606 can be rotated by second tube gear 636 and first tube gear 637, respectively such that the radial positioning of driven gears 614 is controlled at about the same time as the radial positioning of drive gears 612. Consequently, drive gears 612 and driven gears 614 can maintain alignment for substantially constant engagement as the distance between the central axis of input shaft 601 and drive gears 612 and driven gears 614 changes. Stated another way, as the lever length of drive gears 612 changes and the length of the orbital path of drive gears 612, e.g. around input shaft 601, changes, drive gears 612 rotate, e.g. around their respective central axes, and maintain substantially constant engagement with driven gears 614 which also move a corresponding radial distance. As discussed previously with respect to example transmissions 100 and 100', such engagement can be maintained throughout a gear ratio change, e.g., in transmission with sliding gear ratio changes, or at discrete gear ratios, e.g., in a transmission with stepped gear ratio changes. With respect to transmission 600 of FIGS. 11A-B, in either case, the outermost portions of driven gears 614, i.e. the portions of driven gears 614 which are the greatest distance from the center of control tube 634, define a virtual gear 651, illustrated in phantom lines in FIG. 11B.

As best illustrated in the example embodiment of FIG. 11B, when input housing 610 rotates, drive gears 612 may also orbit around the center of input housing 610, which in some examples is aligned with the center of input shaft 601 and/or control tubes 634, 681. Accordingly, drive gears 612 follow an orbital path which extends around the outer perimeter of driven gears 614, along the edges of driven gears which are the furthest distance from the center of input housing 610, although in other embodiments, drive gears may follow an orbital path around the interior of the driven gears, for example, along the edges of driven gears 614 which are closest to the center of input housing 610. Accordingly, driven gears 614 move radially outward, thereby increasing the distance between their outer edges and the center of input housing 610, drive moon gears 612 can be synchronously, or about synchronously, moved radially, so that a substantially constant engagement between drive gears 612 and driven gears 614 is thus maintained. Stated another way, as driven gears 614 translate radially outward, the size of virtual gear 651 increases, and drive gears 612 can correspondingly translate radially outward at about the same time to maintain substantially constant engagement with virtual gear 651. Such engagement may be maintained throughout a gear ratio change, such as in a transmission which maintains constant engagement between drive gears 612 and driven gears 614 as drive gears 612 and driven gears 614 slide radially inward or outward. Alternatively, engagement between drive gears 612 and driven gears 614 may be temporarily interrupted when gear ratio changes are made, such as in a transmission which steps between gear ratios defined at discrete locations of the drive gears 612 and driven gears 614.

As disclosed herein, whether a transmission slides or steps between gear ratios, the transmission can provide essentially the same results. For example, losses in momentum or torque spikes may be negligible in either a sliding or stepped transmission that creates gear ratio changes by changing the radial distance between drive gears 612 and the axis about which drive gears 612 orbit. In the illustrated embodiment, for example, drive gears 612 rotate and orbit around an axis aligned with the center of input housing 610, for example. Consequently, control links 613, 615 and pivot gears 607, 611 are collectively and individually examples of structural implementations of means for synchronizing drive and driven gears to maintain substantially constant engagement between drive and driven gears as they move radially to produce any of a very large number, possibly infinite number, of gear ratios.

In the example arrangement which includes five driven gears 614 virtual gear 651 is generally pentagonal in shape, with rounded corners which are aligned with driven gears 614. In light of the disclosure herein, it will be appreciated, however, that the shape of virtual gear 651 can vary. In general, for example, as more driven gears are added, virtual gear 651 will more closely resemble a circle. In another embodiment, virtual gear can always be considered as being circular, with the driven gears positioned at the vertexes of a polygon circumscribed by the circular virtual gear. For example, in the illustrated embodiment, virtual gear 651 may be circular with each of drive gears 618 positioned at a vertex of a regular pentagon circumscribed by virtual gear 651. Moreover, as driven gears 614 move radially outward or inward, the size of virtual gear 651 correspondingly increases or decreases. Accordingly, drive gears 614 can be positioned in any of a variety of radial positions so as to define a large, possibly infinite, number of different sizes of virtual gear 651.

As disclosed previously, when drive gears 612 are moved to an outward position, such as the position of drive moon gear 617, the length of the orbital path taken by the drive gears 612 increases. In this manner, a constant rotational input, which causes drive gears 612 to orbit around an external axis, such as an axis aligned with the center of input housing 610, for example, at a constant angular velocity, will thus cause drive gears 617 to have a greater linear velocity than drive gears 612, at the positions illustrated in FIGS. 11A-B. This is because drive gears 617 follow a longer orbital path than drive gears 612 and, accordingly, must travel a greater arc length per rotation. As drive gears 612 mate with, and thereby drive, driven gears 614, this increased linear velocity is shared by driven gears 614 at the point of engagement. As a result, driven gears 614, which may rotate about their centers but not orbit, experience increased linear and angular velocity. Consequently, an increase in gear ratio is realized. It will also be appreciated that a gear ratio change can be realized by translating drive gears 612 between any two positions on the path along which drive gears 612 move radially outward. For example, moving drive gears 612 between any two points on path 660 can cause a corresponding increase or decrease in gear ratio. Moreover, inasmuch as path 660 can have any number of discrete or non-discrete points at which drive gears 612 can be rotated, drive gears 612 can follow any of a large, and possibly infinite, number of different orbital paths such that a large, and possibly infinite, number of gear ratios can be realized.

The relation of the number of drive gears to the number of driven gears may be varied in any suitable manner. For instance, in one embodiment, there are the same number of drive and driven gears. In other embodiments, there are different numbers of drive and driven gears. As a further example, it is contemplated that an even number of input moons be used with an odd number of output moons, or vice versa. For instance, as described previously, three output, driven gears may be used with two drive gears. In another embodiment, such as that disclosed in FIG. 11B, five driven gears are used in connection with eight drive gears.

More specifically, FIG. 11B illustrates a partial cross-section of the transmission 600 illustrated in FIG. 11A in which eight drive gears 612 (collectively labeled as "B" gears) engage five driven gears 614 (collectively labeled as "D" gears). In the illustrated embodiment, drive moons 612 and driven moons 614 are positioned at equally spaced angular intervals of forty-five degrees and seventy-two degrees, respectively, although any other particular number of drive gears and/or driven gears can be used, and the respective moon drive and driven gear spacings can be varied as well. Drive gears 612 have various rotations, including rotations about axes passing through their respective centers and a collective orbit about an axis passing through the center of input housing 610. As a result of the orbital movement of drive gears 612, drive gears 612 are constantly entering into and out of various degrees of engagement with driven gears 614 during the various stages of the orbital movement of drive gears 612. For example, in the illustrated embodiment, and as reflected in Table 1, one of the eight drive gears 612 will come into dead center engagement with one of the five driven gears 614 every nine degrees of rotation of input shaft 601. As disclosed in FIG. 11B, while one or more of drive gears 612 engages one or more of driven gears 614, other drive gears 612 and driven gears 614 may also be in various stages of engagement.

In the embodiment illustrated in FIG. 11A, driven gears 614 also engage output pivot gears 607 (collectively labeled as "C" gears in FIG. 11B). Consequently, when driven gears 614 are engaged and rotated by drive gears 612, driven gears 614 cause output pivot gears 607 to rotate about their respective axes. Each pivot driven gear 607 and be further coupled to a pivot shaft 620. Optionally, pivot shafts 620 pass from output pivot gears 607 through an output housing 616, e.g. by using holes and bearings provided in output housing 616. Output housing 616 may, in some embodiments, also be connected to the transmission housing (not shown).

As illustrated in FIG. 11A, pivot shafts 620 can extend to, and connect with, output gears 621, which are, in this example embodiment, star gears. Consequently, as any of output pivot gears 607 is rotated by a moon driven gear 614, pivot shaft 620 causes a corresponding output gear 621 to rotate. Output gears 621 may, in turn, engage an output planetary ring gear 622. As each output gear 621 can engage output planetary ring gear 622, the rotation of each output gear 621 is linked such that each output gear 621 maintains an identical rotation about its respective center. Linking output gears 621 thereby also links the rotation of pivot shafts 620, pivot gears 607, and moon driven gear 614, such that each moon driven gear 614 maintains the same rotation about its respective central axis, regardless of whether and to what degree the moon driven gear 614 is being engaged by a moon drive gear 612.

In this embodiment, planetary ring gear 622 includes an internal gear profile which engages planet gears 623. As a result, the rotation of output star gear 621 can cause planetary ring gear 622 to rotate and thereby engage and rotate planet gears 623. Planet gears 623 may further be connected to a rotatable output yoke 630, for example by using extensions 625. As extensions 625 are rotated by planet gears 623, output yoke 630 is also rotated. This arrangement enables output of the power from transmission 600. Moreover, transmission 600 can be connected to a load or power sink in any suitable manner, such that output yoke 630 can also act as an interface for providing the power output of transmission 600.

Optionally, an input gear 624, which can be a sun gear, for example, may be affixed to input shaft 601 and can engage each of planet gears 623. The output planetary ring gear 622 can, in this arrangement, relate the power input into transmission 600 to the rotation of output star gears 621, which is an intermediate output of transmission 600. In particular, when planet gears 623 and input sun gears 624 are of the same size and planet gears 623 are rotated about their respective central axes by ring gear 622 at the same angular velocity as the rotation of input sun gear 624, planet gears 623 are in direct conflict with input sun gear 624, thereby resulting in negligible, possibly zero, output at output yoke 630. In other words, transmission 600 is in a neutral output state although drive gears 612 remain engaged with driven gears 614. In this way, an engaged neutral state is implemented, notwithstanding that the drive and driven gears remain engaged and continue their respective rotations and orbits. Thus, transmission 600 may be in a neutral output state without necessitating disconnection of the power source from the load, and without necessitating disconnection of the drive and driven gears, and without requiring a mechanism to slow or stop the rotation any drive or driven gear within transmission 600. To the extent output gears 621 cause planet gears 623 rotate faster than input sun gears 624, output yoke 630 produces a forward output for transmission 600, while a slower rotation of planet gears 623 as compared to the rotation of input sun gear 624 results in a reverse output. Although input star gear 621 and output planet gears 623 are, in an example embodiment, each of the same size, this feature is not necessary. In other example embodiments, for example, the respective sizes of input star gear 621 and output planet gears 623 can be varied. Where input star gear 621 and output planet gears 623 are of different sizes, transmission 600 may be placed in a neutral output state notwithstanding different angular velocities of output planet gears 623 and input star gear 621.

As discussed herein, transmission 600 can further include a mechanism for changing between gear ratios in either discrete or in substantially non-discrete, possibly infinitely small, increments. Consequently, transmission 600 can step or slide between gear ratios, thereby providing a variable speed transmission that does not rely on the use of only a small group of discrete gear ratios and which changes gear ratios without a torque spike, or without a torque spike large enough to damage the transmission or an associated drive train. In the illustrated embodiment, a shift lever 631 is hinged at pivot 632. As shift lever 631 is rotated about pivot 632, the rotation of shift lever 631 displaces shift control bearing 633 which is positioned around a control tube 634 that is, in this embodiment, coaxial with input shaft 601.

In an example embodiment, control tube 634 is adapted to generally maintain a rotation which is identical to the rotation of input shaft 601. A pilot bearing (not shown) may thus be fixed into the inner portion of shift control bearing 633 and to control tube 634 and input shaft 601 such that the pilot bearing rotates with the control tube 634 and the input shaft 601. The pilot bearing may be adapted to travel along a control groove 635 formed in control tube 634, and fixed within a groove (not shown) within input shaft 601. Control groove 635 and the groove in input shaft 601 may, in one example embodiment, have different paths. As a result, the forward-and-back movement of shift control bearing 633 follows the path outlined by control groove 635 and causes control tube 634 to have a rotation which is different than the rotation of input shaft 601. Consequently, control tube 634 rotates relative to the rotation of input shaft 601. Control groove 635 may comprise any suitable path(s). For instance, in the illustrated embodiment, control groove 635 has a spiral, stretched "S" configuration, although this is but one possible configuration. The groove in input shaft 601 may also have any suitable path(s). For instance, in one example, the groove in input shaft 601 is straight.

In one example embodiment, shift lever 631 may be coupled to the exterior of shift control bearing 630 at a second pivot 680. Thus, as shift lever 631 is rotated about pivot 632 and shift control bearing 633 is displaced, the rotation of shift lever 631 causes second pivot 680 to also move axially with respect to control tube 634. Second control tube 681 may, in some example embodiments, also be positioned around shift control bearing 633 and, optionally, around control tube 634. Second pivot 680 may be positioned within a second control groove 682 formed in second control tube 681 such that as second pivot 680 follows along second control groove 682 as second pivot 680 moves axially with respect to control tube 634. As a result, the forward-and-back movement of shift control bearing 633 also causes second pivot 680 to follow the path defined by second control groove 682. Second control groove 682 may also comprise any suitable path(s). For instance, in one embodiment, second control groove 682 has a configuration which is similar to that of control groove 635. By way of example, if control groove 635 has a helical configuration, second control groove 682 can also have a helical configuration which is positioned directly over, or offset from, control groove 635.

Shift control bearing 633 and second pivot 680 can further be linked to input link control gears 606 and output link control gears 640, respectively. Consequently, the forward-and-back movement of shift control bearing 633 and second pivot 680 may cause control tubes 634, 681 to rotate, or to rotate relative to input shaft 601, thereby causing input link control gears 606 and output link control gears 640 to rotate. In particular, as control bearing 633 moves axially along control tube 634, such that control tube 634 rotates relative to input shaft 601, control tube 634 rotates. Similarly, as second pivot 680 moves axially along second control tube 681, second control tube 681 rotates. Control tube 634 can also be coupled to tube gears 636, 637. As a result, when control tube 634 rotates relative to input shaft 601, tube gears 636, 637 can also rotate, thereby also causing input link control gears 606 and output link control gears 640, to rotate. As input link control gears 606 rotate, input control links 613 rotate simultaneously therewith, also causing drive gears 612, which are mounted thereto, to synchronously translate around pivot drive gears 611, for example along translation path 660, thereby changing the lever associated with drive gears 612. In a similar manner, second control tube 681 can be coupled to tube gear 636 such that as second control tube 681 rotates, tube gear 636 can also rotate, thereby causing output link control gears 640 to rotate. As output link control gears 640 rotate, output control links 615 are also thereby rotated. Output control links 615 may further be coupled to driven gears 614 which then are also caused to translate around output pivot gears 657, for example, along translation path 661. Consequently, control tubes 634, 681, tube gears 636, 637, link control gears 606, 640, and control links 613, 615, are collectively and individually examples of structural implementations of means for synchronizing drive and driven gears to maintain substantially constant engagement between drive and driven gears as they move radially to produce any of a large number of non-discrete gear ratios.

By using control tubes 634, 681, tube gears 636, 637, control links 613, 615, and/or link control gears 606, 640, or any other equivalent structure, drive gears 612 and driven gears 614 can thus be synchronously moved in one or more radial directions with respect to the axis about which drive gears 612 orbit, although it will be appreciated that in other embodiments control tubes 634 and 681 are rotated independently of each other. This relation may further increase or decrease the arc length which drive gears 612 must travel as they orbit. As disclosed herein, this increased or decreased arc length increases or decreases a linear velocity associated with of drive gears 612, thereby also increasing or decreasing the output of driven gears 614 which have a corresponding linear velocity at a point of engagement and thereby also rotate at a corresponding angular velocity. Moreover, as drive gears 612 may move to any location around pivot drive gears 611, they can alternately be located in a large number of discrete locations, or possibly at any of an infinite number of non-discrete locations, thereby also providing a large number, and possibly an infinite number, of orbital arc lengths and gear ratios as disclosed herein.

In addition, the synchronous movement of input link control gears 606 and output link control gears 640, by shift lever 631, pivot 632, second pivot 680, and control bearing 633, maintains input moon gears 612 in engagement with output moon gears 614, thereby maintains substantially constant engagement as the arc length of the orbit of input moon gears 612 changes. In particular, substantially constant engagement is maintained as the lever length changes, so that the arc distance increases as the lever increases, and thereby causes output moon gears 614 to rotate at a greater angular velocity. Similarly, if the lever length changes such that the lever length decreases, the arc length of the orbital path also decreases, thereby causing output moon gears 614 to rotate at a lesser angular velocity.

According to one embodiment, transmission 600 maintains a connection between drive gears 612 and input shaft 601 during changes in gear ratio. According to an alternative embodiment, however, the rotation and/or orbital motion of drive gears 612 may be decoupled from the rotation of input shaft 601 for at least a short time while a gear ratio change is made. For instance, similar to transmission 100' of FIG. 1B, transmission 600 may include one or more clutches (not shown) which, when engaged, cause the orbital and/or rotational motions of drive gears 612 to cease. For instance, a clutch may be positioned between input shaft 601 and input housing 610. Consequently, as input shaft 601 rotates, input housing 610 does not rotate when the clutch is engaged. As a result, when input housing 610 does not rotate, drive gears 612 also do not rotate or orbit.

In view of the disclosure herein, it will be appreciated that such a positioning of a clutch is merely exemplary only. In other embodiments, for instance, a clutch (not shown) may be additionally, or alternatively, placed between input housing 610 and drive gear 612. In such an embodiment, engagement of the clutch may therefore stop rotation of drive gear 612 as input housing 610 rotates, while continuing to allow drive gears 612 to collectively orbit.

As disclosed previously with respect to transmission 100 of FIG. 1A, it may also be desirable, in some applications, to reverse the torque flow through transmission 600. For example, in one embodiment, when transmission 600 enters into a forward gear out of the engaged neutral, it may be desirable to have a low torque output. Accordingly, in other embodiments, the torque flow through transmission 700 is reversed so that low torque out of neutral or other desirable torque flow characteristics are implemented. For example, in such an embodiment, power is input through yoke 630 which then acts as the transmission input interface. The torque flow is reversed such that output moon gears 614 then act as the driving gears and engage and drive input moon gears 612, which become the driven gears. As moon gears 614 then rotate, they also orbit and thereby cause input shaft 601 to rotate and act as an interface for providing a power output.

In some cases, reversing the torque flow through transmission 600 may require adjustments to facilitate the optional engaged neutral feature. Accordingly, as disclosed previously with respect to FIG. 9, an engaged neutral can be implemented by using a planetary gear set. In particular, the input at yoke 630 can be carried through transmission 600 and connected to a sun gear which rotates against various moon gears which are connected to the power output of shaft 601. In this manner, the input and output RPMs are placed in conflict. As a result, when the linear velocities of the sun gear and planet gear are, at the engagement point, of an equal magnitude, the sun gear and planet gear collectively provide no output to a ring gear. Thus, transmission 600 is placed in an engaged neutral state. If, however, the input or output RPMs are increased over the other, a forward output can be obtained, possibly operating at low torque, or a reverse output can be obtained.

It can thus be seen that any of a variety of different types and numbers of drive and driven gears and gear sets can be used to vary the engagement frequency and number of gears as necessary for a variety of applications. In fact, it is contemplated that each application can have a different set of demands and the benefits and features of the various types and numbers of gears will have to be weighed to determine which and how many drive and driven gears to use. For example, in some embodiments, and as disclosed above with respect to FIG. 1A-B, the driven gears may be ring gears which are driven by input spur gears. In other embodiments, a torque flow may be reversed through the transmission such that the driven gears become drive gears. In such embodiments, the ring gears each have an internal arch which favors the orbit of the spur gears, and which thereby allows the drive and driven gears to maintain engagement over a respectively longer arc path than allowed by a spur or helical gear. Thus, ring gears may be desirable to maintain a more constant engagement with fewer total components.

Ring gears may, however, be larger than the external, driven spur gears illustrated in FIGS. 11A-B. In contrast to the ring gears, the curvature of the external driven gears can contrast with the curved orbit of the drive gears, such that engagement is maintained over a shorter respective arc path than is maintained by a ring gear. Thus, if driven spur gears are used, in one example, more driven gears may be used to increase the total engagement between the drive and driven gears.

Moreover, in applications where transmission size and/or weight are critical design parameters, it may be desirable to minimize the number and/or size of the gears in the transmission. In contrast, if the power source is supporting a large load, it may be desirable to have more gears. By way of example, where the number of drive and driven gears are increased to eight and five, respectively, it is possible to have dead center engagement occur between a drive and driven gear about every nine degrees of along the orbit of the drive gears. In such an arrangement in which the orbit of the drive gears and the rotation of the input shaft are at the same angular velocity, the drive and driven gears accordingly enter into dead center engagement about every nine degrees of input shaft rotation. In such an embodiment, at dead center engagement of one drive gear and one driven gear, the other drive and driven gears can be in varying stages of engagement and disengagement. For example, five of the drive gears may be in some degree of engagement while only three drive gears are not engaged with a driven gear. (See FIG. 1B). Thus, five drive gears can share the load among their gear teeth. In contrast, in the embodiment illustrated in FIGS. 2A-G, in which two drive gear sets engage three driven gears, at dead center engagement, only one drive gear is engaged with any driven gear, such that the single engaged drive gear must then support the full load.

Figure 12:
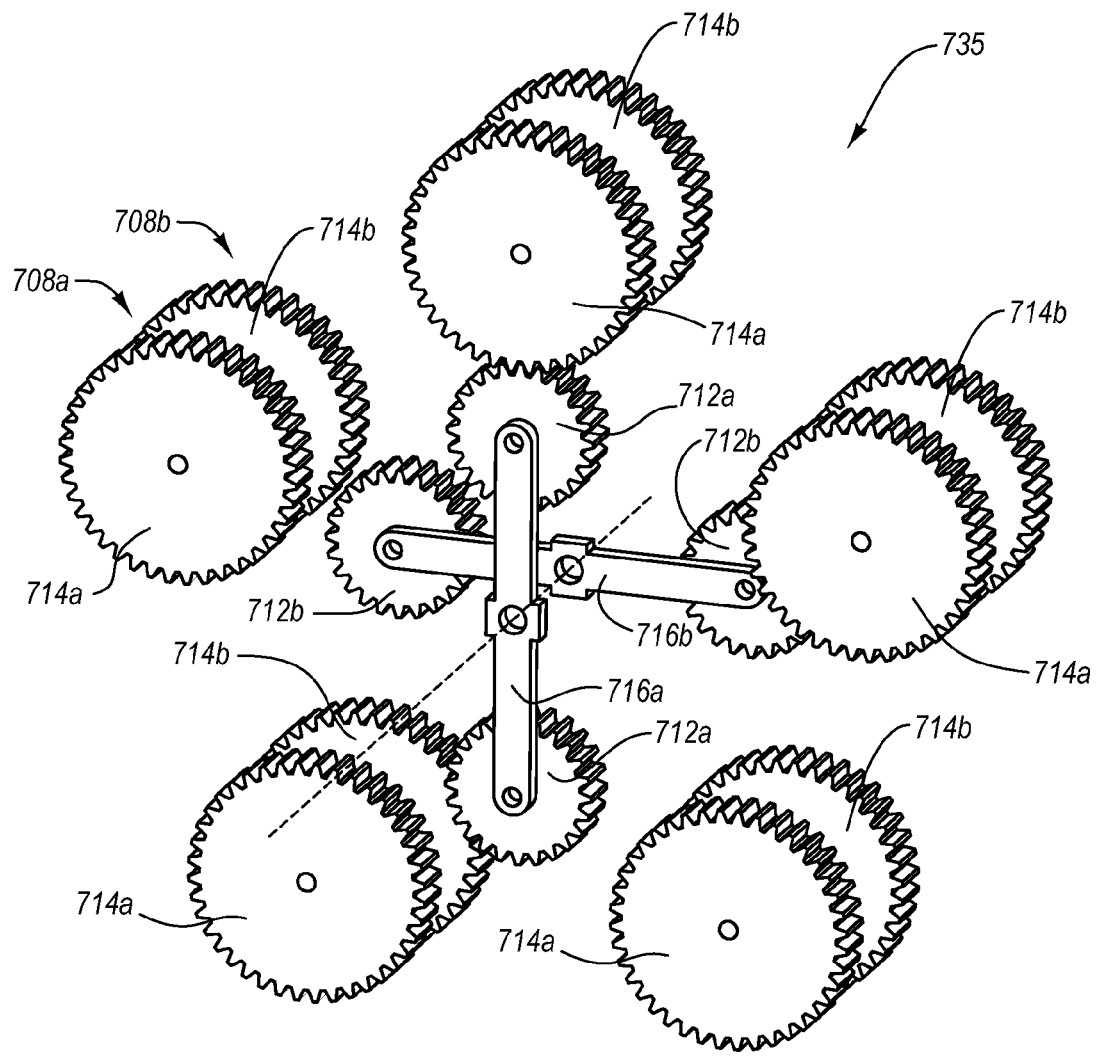
FIG. 12 discloses a set of drive and driven gears in an alternative embodiment of exemplary transmission systems, in which the drive and driven gears are positioned in a dual-plane configuration.

Now turning to FIG. 12, a schematic illustration of still another embodiment of a power transform system 735 which can be used in a transmission as described herein, is illustrated. Power transform system 735 includes multiple drive gears 712 and driven gears 714 which can operate as discussed with respect to FIGS. 1A-B and FIGS. 11A-B. In the illustrated embodiment, drive gears 712 are connected to respective lever arms 716a-b. It will be appreciated, however, that lever arms 716 may be physical levers or virtual levers as discussed herein. For example, among other things, drive gears 712 may be connected via virtual arms and, for example, can be connected to a carrier or other mechanism that allows them to move radially inward and/or outward. Similarly, driven gears 714 may be configured to translate radially. As also disclosed above, drive gears 712 and/or driven gears 714 can be configured to rotate about their respective centers and can optionally be configured to orbit around a central, external axis. For instance, in the illustrated embodiment, drive gears 712 can be angularly offset around the perimeter of a circle and can orbit around an axis passing through the center of that circle.

As discussed above with respect to transmission 600 (FIGS. 11A-B), a transmission according to some aspects of the present invention can include a plurality of drive gears 612 and driven gears 614 which are aligned in a single plane, i.e., at a single axial location. In view of the disclosure herein, it will be appreciated that this is exemplary only. For instance, FIG. 12 illustrates an example power transform system 735 in which multiple driving moon gears 712 can engage and rotate multiple driven sun gears 714, where the drive gears 712 and driven gears 714 are located in multiple, axially spaced planes.

In the particular embodiment illustrated in FIG. 12, power transform system 735 has a stacked configuration in which drive gears 712 and driven gears 714 are arranged in two respective planes 708a-b. It will be appreciated that this embodiment is presented by way of illustration only, and not limitation, and that other arrangements are possible and contemplated. For instance, in some embodiments, drive gears 712 and driven gears 714 may be stacked so as to have drive gears 712 and driven gears 714 aligned in three, four, five or more planes, as desirable or suitable for a particular application.

A stacked arrangement, can be particularly beneficial for a variety of different applications. For instance, in a retrofit application, a transmission may be required to fit within a particular envelope. In some cases, the envelope may allow the transmission to have a relatively long axial length while allowing for only a limited width. In such a case, additional stacks of drive and driven gears can add to the length of the transmission, which may easily fit within the length of the available footprint, while the width requirement can easily be satisfied.

As also disclosed herein, it can be desirable for some applications to increase the frequency of dead-center engagement between drive gears 712 and driven gears 714. As noted previously, one manner for increasing such engagement is to use a Vernier relationship. As reflected in Table 1, not all Vernier relationships are equal, and engagement frequency can be further increased by further varying the number of drive and driven gears. For instance, one of four drive gears which alternately engage three driven gears will encounter dead center engagement every thirty degrees along an orbital path. This engagement can be increased, however, by increasing the number of drive and/or driven gears. For instance, one of four drive gears will directly engage one of five driven gears every eighteen degrees. Further still, one of nine drive gears will directly engage one of eight driven gears every five degrees.

As the number of gears increases, possibly while maintaining a Vernier relationship, size and performance characteristics of the transmission can be affected. For example, consider a simple example in which it has been determined that to obtain the desired performance, the transmission can utilize four driving gears that are each two inches in diameter. Additionally, to fit the width constraints and obtain a desired range of gear ratios, the diameter of the orbital path should be varied between four-and-a-half inches and ten inches.

In a single plane embodiment with driving gears which are located within the interior of driven gears, it will be appreciated that four driving gears may be unable to operate at the smaller end of the desired orbital paths. For instance, when the driving gears translate inward, thereby defining a virtual gear and orbital path each having a diameter of about five inches, the four driving gears within the interior of the orbital path begin to collide. The driving gears begin to engage against each other, thereby interfering with each other's motions. Consequently, the transmission may not be able to utilize the driving gears at orbital paths between four and a half and five inches in diameter. Consequently, the transmission may be unable to provide the desired range of gear ratios.

One possible solution to this problem involves decreasing the number of driving gears or using smaller driving gears, thereby increasing the space available within the inside of the orbital path. Each alternative solution may be useful and viable in some applications. However, as noted previously, reducing the number of driving gears may affect the frequency of dead center engagement, while reducing the size of the driving gears may make them more prone to failure when transferring torque. Accordingly, in some applications, other solutions may be required. Another possible solution is to adjust the drive train so that the driving gears can provide the desired gear ratio at larger orbital paths.

The embodiment illustrated in FIG. 12 illustrates another alternative solution which takes account of such situations. For example, as shown in the illustrated embodiment, power transport system 735 can use four drive gears 712 of the desired size, even where the diameter of the orbital path is decreased. This is implemented by separating drive gears 712 into multiple stacks. In the illustrated embodiment, for example, drive gears 712 are separated into two stacks. Specifically, two of drive gears 712*a*-*b* reside in a first plane 708*a*, while the remaining two drive gears 712*c*-*d* are axially offset from each other and reside within a second plane 708*b*.

In the first plane 708*a*, drive gears 712*a* are spaced around a circle. In the illustrated embodiment, drive gears 712*a* are separated from each other at one-hundred eighty degree intervals. Additionally, drive gears 712*b* are similarly spaced in second plane 708*b*. In the illustrated embodiment, the sets of drive gears 712 are further rotated relative to each other. In particular, drive gears 712*b* are rotated ninety degrees with respect to drive gears 712*a*. As a result, and as illustrated in FIG. 12, the four drive gears 712 are spaced around a circle and separated from each other drive at equal ninety degree intervals, such that there are four angular locations for drive gears 712.

To maintain engagement between drive gears 712 and driven gears 714, driven gears 714 can also be placed in a stacked configuration. In the illustrated embodiment, for instance, five driven gears are aligned in each of the first plane 708*a* and the second plane 708*b* for engagement with drive gears 712, such that the five driven gears 714*a* of the first plane 708*a* can be axially offset from the five driven gears 714*b* of the second plane 708*b*.

As further illustrated, in some embodiments of a dual stack or multi-stack transmission, the driven gears 714 in each stack may be aligned along common axes. For instance, each of the five driven gears 714 in each plane 708*a*-*b* can be spaced about a circle at seventy-two degree intervals. The driven gears 714 of each stack may also be rotated relative to the driven gears of the other one or more stacks. In other embodiments, however, the driven gears 714 of one or more stacks may not be rotated relative to each other stack. In the embodiment illustrated in FIG. 12, for instance, each of the five driven gears 714*a* in the first plane 708*a* is coaxially aligned with a mating driven gear 714*b* of the second plane 708*b*. Thus, in such an embodiment, there may be only five angular locations for the ten driven gears 714.

As will be appreciated in view of the disclosure herein, due to the use of the dual stacks of drive gears 712 and driven gears 714, the diameter of the orbital path of drive gears 712, as well as the diameter of the virtual gear defined by the interior perimeter of driven gears 714, can be decreased, thereby allowing a transmission to have reduced width or diameter. Specifically, inasmuch as fewer driven gears are in each plane, crowding, interference, and raking of drive gears 712 within the orbital path is reduced or eliminated, thereby allowing more driving gears 712 to be placed within the same area when compared with a single plane transmission.

Furthermore, the illustrated embodiment maintains a Vernier relationship between drive gears 712 and driven gears 714. Specifically, the illustrated embodiment utilizes four driving gears and ten driven gears, for a four-to-ten ratio. However, because the driven gears 714 are coaxial in each plane, such that there are only five angular locations for driven gears 714, the Vernier relationship between the driving and driven gears can also be expressed as a four-to-five ratio, and dead center engagement will occur between one drive gear 712 and one driven gear 714 every eighteen degrees.

As will be appreciated, the rotations and orbits of drive gears 712*a* and 712*b* can be linked together, as can the rotations of driven gears 714*a* and 714*b*. Such linkages can be maintained in any suitable manner, including those disclosed herein, particularly with reference to FIGS. 1A-B and 11A-B. In some embodiments, the drive gears 712 in each plane can therefore rotate and orbit in the same direction. For instance, by way of example only, drive gears 712 in each plane can rotate in a clockwise direction and orbit in a counterclockwise direction. Accordingly, drive gears 712 may therefore also cause driven gears 714 to rotate in the same direction, e.g., counterclockwise, in both planes 708*a*-*b*.

Accordingly, both the magnitude and direction of the orbital and rotation motions of drive gears 712, and the magnitude and direction of the rotation motions of driven gears 714, can be constant, irrespective of the plane in which a drive gear 712 or driven gear 714 is located. It will be appreciated, however, that this is exemplary only. In other embodiments, for instance, drive gears 712*a* may rotate and orbit in a direction opposite that of drive gears 712*b*, and driven gears 714*a* may rotate in a direction opposite that of driven gears 714*b*. For instance, a differential may connect the drive and driven gears in each plane, thereby causing the drive gears and driven gears in one plane to have an equal but opposite motion relative to the drive gears and driven gears located in a second plane. Specifically, drive gears 712 in each of planes 708*a*-*b* may have rotational and orbital motions of the same size and magnitude, but in opposite directions. Similarly, driven gears 714 in each plane may therefore also have rotational motions which are of equal magnitude but opposite in direction.

It should be appreciated in view of the disclosure herein that the embodiment illustrated in FIG. 12 is exemplary only and that any of a variety of different numbers of planes, stacks, or gears may be implemented according to the present invention. Additionally, in some embodiments it may not be necessary to use drive gears 712 which rotate. In particular, according to one embodiment, drive gears 712 may be fixed such that they orbit but do not rotate. As a result, the velocity transferred to driven gears 714 is a function of only the orbital motion of drive gears 712 and not a function of both orbital and rotational motions. Moreover, inasmuch as it is not necessary that drive gears 712 rotate, they may also be replaced by other driving members. For instance, according to one embodiment, drive gears 712 may be replaced with driving forks which do not rotate. In particular, a driving fork may have teeth only on the outer perimeter where the driving fork will engage driven gear 714, thereby causing driven gear 714 to rotate.

Accordingly, a transmission according to the principles of the present invention can be adapted for use in any of a variety of applications, and the present invention is not limited to any particular configuration or application. For example, a constant engagement, variable speed transmission according to the present invention can be used in motor vehicles, in other applications using variable speed transmissions, or even in still other applications which have previously not taken advantage of variable speed transmissions.

6. Example Power Transmission Systems

Figure 13:
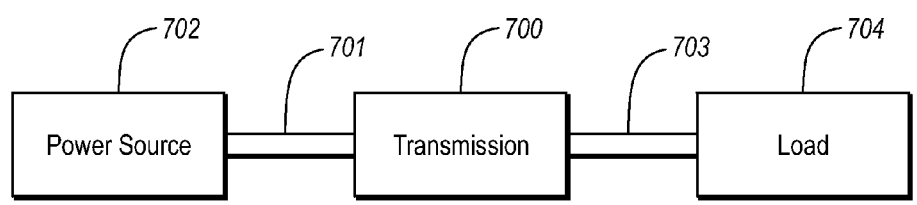
FIG. 13 discloses an exemplary drive system representative of a variety of applications in which a transmission according to the present invention can be utilized to transfer power from a power source to a load.

FIG. 13 provides a schematic illustration of one manner in which a transmission according to the present invention can be implemented. In particular, in the illustrated embodiment, a transmission 700 is disposed between a power source 702 and a load 704. In this manner, transmission 700 is configured to transfer the power provided by power source 702 to drive load 704. Moreover, where transmission 700 is a variable speed transmission according to example embodiments of the present invention, it can provide a large, and possibly infinite, number of gear ratios over a range of gear ratios and/or provide an engaged neutral for load 704.

In addition, and as further illustrated in FIG. 13, a drive train may be used to operably connect power source 702 to load 704 through transmission 700. As illustrated, for example, an exemplary drive train includes a first drive member 701 which operably connects power source 702 to transmission 700. In one embodiment, for example, drive member 701 may be a rotary input shaft which transfers torque output from power source 702 to an input interface of transmission 700. In some embodiments, the torque input shaft is a single shaft directly connecting power source 702 to transmission 700 although it should be appreciated, particularly in light of the disclosure herein, that in other embodiments drive member 701 may also include more than one interconnected shaft, gears, belts, chains, or other members which transfer power between power source 702 and transmission 700.

Additionally, as noted herein, transmission 700 may receive the power or torque provided by power source 702 and provide a variable speed output. For example, where power source 702 is connected to transmission 700 by one or more torque input shafts, power source 702 may provide a power supply to transmission 700, and transmission 700 then changes the speed of the input to provide any of a variety of output speeds and/or output directions. As disclosed herein, transmission 700 may be a variable speed transmission which provides, over a range of gear ratios, a large, and possibly infinite, number of gear ratios for providing different output speeds. Moreover, transmission 700 may, in some embodiments, be configured to change between a forward and reverse output. In some embodiments, a change between a forward and reverse output can be made without substantial disengagement of power source 702 from load 704 and/or without substantial disengagement between one or more sets of drive and driven gears in transmission 700. Further, in some embodiments, transmission 700 further defines a neutral output state where no, or negligible, power is output by transmission 700. In one embodiment, however, the neutral output state is preserved by nevertheless substantially maintaining a connection between power source 702 and load 704 by, for example, maintaining an engaged neutral in transmission 700.

As power is output from transmission 700, the power may then be transferred to the load by at least one second drive member 703. Drive member 703 may be, for example, an output shaft which rotates as transmission 700 provides the output. It will be appreciated that as drive member 703 receives output torque, a torque flow path is defined between the torque input into transmission 700 and the torque output of transmission 700.

In some embodiments, transmission 700 includes a single transmission or multiple transmissions. For example, it is contemplated that a single transmission be used to provide a large range of gear ratios. In other embodiments, multiple transmissions can be used to obtain a final gear ratio change.

In an embodiment in which multiple transmissions are stacked, each transmission may provide a smaller range of variable gear ratios but when combined, a larger range of gear ratios is possible. For example, power input into a first transmission can be output at a first gear ratio where it is then input into a second transmission where a second gear ratio is applied. As a result, the final gear ratio between the input to the first transmission and the output of the second transmission can be greater than may be provided by either transmission alone.

Accordingly, one aspect of using multiple transmissions that are stacked in this manner is that each transmission may be smaller than would otherwise be necessary to obtain the final gear ratio within a single transmission. As a result, in an application which has a small outside diameter into which the transmission can be placed, but a greater length available, multiple transmissions can be "stacked" end-to-end to provide the larger range of gear ratios. This can be particularly useful where a traditional transmission is removed and retrofit with a transmission according to the present invention. For example, where a traditional transmission is removed, the new transmission must fit within the envelope left by the removed transmission. If that transmission has a large length and a smaller width, transmissions can be stacked to provide a range of gear ratios. It should be appreciated, however, that it is not necessary that multiple transmissions be stacked to obtain the range of gear ratios of a traditional transmission. In fact, in some embodiments of the present invention, changing the lever length by less than three inches can provide a full range of gear ratios commonly used by a traditional transmission, and possibly many more discrete or non-discrete gear ratios within that range. Accordingly, a transmission according to an embodiment of the present invention may be constructed which fits within the envelope of a traditional transmission and which provides the same or a greater range of gear ratios.

As disclosed herein, a transmission according to the present invention can be implemented in any of a variety of applications. In that regard, power source 702 is then representative of any of a variety of different power sources, used in any of a variety of applications, and load 704 is representative of any of a variety of different loads which are moved by or operated in connection with power source 702. In one embodiment, power source 702 may be, by way of example and not limitation, an electric and/or internal combustion engine, although any other suitable power source is contemplated. Such an engine may be used, for example, in a passenger or other type of motor-powered vehicle, e.g. a passenger vehicle, tractor/trailer, a military vehicle, marine vehicle, airplanes, helicopters, all-terrain vehicle, construction equipment, and the like. In any such case, load 704 can include the vehicle itself, as well as any weight supported by or contained within the vehicle. For example, such a vehicle may include a plurality of wheels which are used to move the load. In such an embodiment, transmission 700 can be connected to the wheels by means of a drive train, represented by drive member 701. Accordingly, power output from transmission 700 is passed from drive member 701 to the wheels which then carry and transport the other weight in the vehicle, as represented by load 704.

A particular aspect of a transmission according to the present invention is the ability to use the transmission in a variety of applications which have low or high torque requirements. For example, vehicles such as snowmobiles may have relatively low torque requirements which allow the snowmobile to operate with a friction-based CVT or IVT transmission. However, a semi tractor-trailer or any application which has a large associated load will have a larger torque requirement that makes such a transmission impractical. A transmission according to the present invention, however, because it does not rely on friction, is not prone to the burn-ups or frictional heating problems associated with such friction based systems. Moreover, because small gear ratio increments can be obtained beginning at neutral and extending in forward and reverse directions, a load in such an application can be started without feathering the clutch or otherwise creating friction that causes burn-ups in even steel-on-steel systems. In fact, as disclosed above, transmission according to some embodiments of the present invention can be implemented without a clutch or clutch plates, thereby also reducing heat generated through frictional clutching. Further still, because the need for such clutch plates can is eliminated, the hydraulic controlling systems that control the associated clutches can be reduced or eliminated, thereby lightening the load which must be driven by power source 702, and allowing a smaller, more efficient power source to be used.

While motorized vehicles are one application in which a transmission according to the present invention can be used, it will be appreciated that transmission 700 can be used in connection with a power source 702 and load 704 representative of any of a variety of other applications. For example, in one embodiment, power source 702 and load 704 are representative of a conveyor system. In such an embodiment, an electric or other motor may drive a conveyor belt which carries raw materials, assembled products, or any other substance or product along a conveyor track. Accordingly, the track and conveyed substances contribute to load 704 while the engine is represented by power source 702.

In a conveyor system embodiment as described herein, when a conveyor system uses a transmission 700 according to embodiments of the present invention, a substantial benefit can be seen. For example, transmission 700 may operate at any of a large number of gear ratios which are changeable in very small, and possibly infinitely small, increments. Accordingly, when a conveyor system is to be started, a low gear ratio can be used to transfer power from power source 702 to the conveyor belt which then starts up at a low speed. As the belt system builds momentum, transmission 700 can be controlled to increase the gear ratio, thereby changing the gear ratio. Moreover, when it is necessary to stop the conveyor system, transmission 700 can be controlled to provide a neutral while maintaining power source 702 in connection with load 702. As a result, when the conveyor is to be started back up, power does not need to be reengaged, and transmission 700 can be controlled to ramp back up to operating speed. Further still, in some embodiments, power source 702 can operate at a constant speed and transmission 700 can provide a large number of gear ratios along a slideable or steppable range of ratios. As a result, a single engine used to operate over multiple speeds can be produced which is smaller than conventional systems, thereby also increasing the efficiency of the system.

In another aspect, transmission 700 can be used in an elevator, ski lift, gondola, or other people-mover system. For example, in such an embodiment, transmission 700 may be connected to an electric engine, combustion engine, or some other type of engine which acts as a power source 702 to drive the load 704, which can include the elevator carriage, lift chairs, gondolas, the people and equipment being transported, and the like. In such applications, variable speed transmissions have typically not been used as it presents a safety concern to disconnect the power source from the load which carries the people. However, if a transmission according to the present invention is used, it will be appreciated that transmission 700 can provide a constant connection between the load and the power source, while also providing for a variety of gear ratios. Moreover, in such a system, as the load increases, instead of requiring more power out of the engine, transmission 700 can be controlled to change the gear ratio, thereby allowing the same, smaller engine to move a larger load.

In yet another aspect, a transmission 700 according to the present invention can be implemented in a power generation system. For example, in one embodiment, power source 702 includes or is obtained from a wind or hydraulic power source. Accordingly, and by way of example only, transmission 700 may be employed in a windmill application or in a hydroelectric dam. For example, wind and moving water possess kinetic energy which can be captured by turbine blades and transferred to transmission 700 by drive member 701. For example, drive member 701 may be a shaft which is rotated as the kinetic energy of the wind or water is captured. In addition, drive member 701 may include the turbine blades such that a kinetic power source is input into drive member 701, and drive member 701 then converts it to a rotary power source for input into transmission 700.

As the rotating shaft inputs power into transmission 700, the supplied torque can flow through transmission 700 where it is output at any of a variety of speeds and connected by means of second drive member 703 to a generator represented by load 704, which turns the rotational energy into electricity. Some generators may, however, require a threshold amount of rotational energy before power generation can occur. Accordingly, in such an embodiment, transmission 700 can be employed between the generator and the turbine blades such that with very little wind or water flow, a larger rotational speed of drive member 703 can be obtained. Moreover, as the flow is increased, and more torque is being provided, the variable ratios of transmission 700 can be used to increase the power generation, thereby obtaining a greater power output of the generator. In this manner, a larger range of wind and water flows can be used to produce power and greater advantage can be taken of large flows.

In still other embodiments, transmission 700 may also be employed in a human or animal powered system such that the human or animal provides the power and acts as power source 702. For instance, according to one example embodiment, transmission 700 may be implemented in a bicycle in which a human user provides the power input and in which the bicycle and the load on the bicycle act as load 704. In this manner, as the human operator of the bicycle provides power to transmission 700, through drive member 703, for example, transmission 700 can implement any of a variety of gear ratios as necessary to provide power transmission to load 704.

As will be appreciated in light of the disclosure herein, one aspect of a transmission according to the principles of the present invention is the variety of applications with which the transmission may be used. Although various exemplary applications are described herein, it will be appreciated that a transmission of the present invention is not so limited. In fact, it is contemplated that a transmission according to the present invention may be used in any application in which a variable speed transmission is desirable, regardless of whether such an application currently uses a variable speed transmission. Moreover, the type of power source usable with a transmission according to the present invention is not limited to any particular type of power source. For instance, as disclosed previously, the power source may be an engine, a human operator, or a natural source, or any combination of these or any other type of power source.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A transmission, comprising:
   a transmission input interface comprising a rotatable input shaft;
   one or more drive members coupled at least indirectly to said transmission input interface, each of said one or more drive members being configured for rotational motion about a respective internal axis of the drive member and for orbital motion about a common external axis, wherein said rotational motion and said orbital motion correspond to rotation of said rotatable input shaft;
   a driven member configured to engage said one or more drive members, such that said one or more drive members are adapted to cause movement of said driven member; and
   a transmission output interface coupled at least indirectly to said driven member,
   wherein a first drive member of said one or more drive members is configured to be selectively re-oriented, relative to said driven member, during a time period that said first drive member is disengaged from said driven member.

2. A transmission as recited in claim 1, wherein said orbital path is selectively changeable such that a length of an orbital path can be selectively increased or decreased between a plurality of discrete orbital paths at which said one or more drive members engage with said driven member.

3. A transmission as recited in claim 2, wherein said plurality of discrete orbital paths are each sized to have a respective length that is a whole tooth integer.

4. A transmission as recited in claim 1, wherein said one or more drive members comprises a plurality of drive gears, and wherein said plurality of drive gears are spaced around a circle at fixed angular intervals.

5. A transmission as recited in claim 1, wherein said one or more drive members comprise a plurality of drive gears, and wherein said one or more drive gears are arranged to orbit along an orbital path that causes said plurality of drive gears to alternately engage said driven member.

6. A transmission as recited in claim 1, wherein said one or more drive members each comprise a moon gear.

7. A transmission as recited in claim 1, wherein said time period is a defined window of time.

8. The vehicle as recited in claim 7, further comprising:
   a power source at least indirectly coupled to said transmission input interface;
   a power train at least indirectly coupled to said transmission output interface; and
   a transmission control system operably connected to the transmission.

9. A transmission as recited in claim 1, wherein said one or more drive members are configured and arranged such that said rotational motion at least partially offsets said orbital motion.

10. A transmission as recited in claim 9, wherein said one or more drive members are configured and arranged to maintain a neutral radial position in which said rotational motion is substantially equal and opposite to said orbital motion, such that at said neutral radial position, said one or more drive members are arranged to cause substantially no rotation of said driven member.

11. A transmission as recited in claim 1, wherein each of said one or more drive members is configured for movement between a respective first radial location and a second radial location, said second radial location corresponding to a different gear ratio than said first radial location.

12. A transmission as recited in claim 1, wherein the driven member interconnects the one or more drive members with another gear.

13. A vehicle including the transmission of claim 1.

14. A transmission, comprising:
   a transmission input interface comprising a rotatable input shaft;
   one or more drive gears coupled at least indirectly to said transmission input interface, each of said one or more drive gears being configured for rotational motion about a respective internal axis of the drive gear and for orbital motion about a common external axis, wherein said rotational motion and said orbital motion correspond to rotation of said rotatable input shaft;
   one or more driven gears configured to engage said one or more drive gears, such that said one or more drive gears are adapted to cause rotation of said one or more driven gears;
   a transmission output interface coupled at least indirectly to said one or more driven gears;
   one or more synchronization gears linked to said rotatable input shaft, such that said one or more synchronization gears are arranged to rotate as said rotating input shaft rotates; and
   a reference gear engaged with said one or more synchronization gears, wherein said one or more synchronization gears are configured to orbit around said reference gear as an input torque is received by said transmission input interface, and wherein said one or more synchronization gears are configured to cause said rotational motion and said orbital motion of said one or more drive gears.

15. A transmission as recited in claim 14, wherein said one or more drive gears comprise one or more drive gears residing in a first plane and one or more drive gears residing in a second plane, said second plane being offset from said first plane, and wherein said one or more driven gears comprise one or more driven gears residing in said first plane and one or more driven gears residing in said second plane.

16. A transmission as recited in claim 15, wherein a plurality of drive gears reside in each of said first plane and said second plane.

17. A transmission as recited in claim 16, wherein said plurality of drive gears residing in each of said first plane and said second plane is configured and arranged to orbit along a respective orbital path, said respective orbital paths of each of said plurality of drive gears residing in each of said first plane and said second plane being substantially equally sized and substantially coaxial.

18. A transmission as recited in claim 15, wherein a driven gear in said first plane is configured and arranged to remain substantially coaxially aligned with a driven gear in said second plane at each of a plurality of gear ratios within the transmission.

19. A transmission as recited in claim 18, wherein each of said one or more drive gears in said first plane is configured to remain substantially coaxially aligned with one of said one or more drive gears in said second plane, at each of a plurality of gear ratios within the transmission.

20. A transmission as recited in claim 15, wherein said one or more drive gears and said one or more driven gears residing in said first plane, and said one or more drive gears and said one or more driven gears residing in said second plane are each configured to translate radially to change a gear ratio of the transmission.

21. A transmission, comprising:

a transmission input interface comprising a rotatable input shaft;

one or more drive gears coupled at least indirectly to said transmission input interface, each of said one or more drive gears being configured for rotational motion about a respective internal axis of the drive gear and for orbital motion about a common external axis, wherein said rotational motion and said orbital motion correspond to rotation of said rotatable input shaft;

one or more driven gears configured to engage said one or more drive gears, such that said one or more drive gears are adapted to cause rotation of said one or more driven gears, wherein said one or more drive gears are configured and arranged:

such that said rotational motion at least partially offsets said orbital motion; and to maintain a neutral radial position in which said rotational motion is substantially equal and opposite to said orbital motion, such that at said neutral radial position, said one or more drive gears are arranged to cause substantially no rotation of said one or more driven gears; and a transmission output interface coupled at least indirectly to said one or more driven gears.

22. A power transform system, comprising:

a first set of three or more power transmission members, each of which is configured to accept a torque and, in response, rotate about its central axis and travel along a selectively changeable orbital path about an external axis; and another power transmission member configured to engage said first set of power transmission members, so as to enable torque to be transferred therebetween, wherein said first set of power transmission members and said another power transmission member are adapted to collectively define a plurality of different gear ratios responsive to one or more changes to said orbital path of said first set of power transmission members.

23. A power transform system as recited in claim 22, wherein a length of said selectively changeable orbital path of said first set of power transmission members can be selectively changed.

24. A power transform system as recited in claim 22, wherein said first set of one or more power transmission members are driving members and said another power transmission members is a driven member.

\* \* \* \* \*